US012574946B2

(12) United States Patent
Xiong

(10) Patent No.: US 12,574,946 B2
(45) Date of Patent: Mar. 10, 2026

(54) METHOD, APPARATUS, MEDIUM AND ELECTRONIC DEVICE FOR MULTICAST BROADCAST SERVICE

(71) Applicant: Tencent Technology (Shenzhen) Company Limited, Shenzhen (CN)

(72) Inventor: Chunshan Xiong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 517 days.

(21) Appl. No.: 17/954,088

(22) Filed: Sep. 27, 2022

(65) Prior Publication Data

US 2023/0025793 A1 Jan. 26, 2023

Related U.S. Application Data

(63) Continuation of application No. PCT/CN2021/100085, filed on Jun. 15, 2021.

(30) Foreign Application Priority Data

Jul. 17, 2020 (CN) .......................... 202010694105.7

(51) Int. Cl.
*H04W 72/30* (2023.01)
*H04W 76/12* (2018.01)
(52) U.S. Cl.
CPC ........... *H04W 72/30* (2023.01); *H04W 76/12* (2018.02)
(58) Field of Classification Search
None
See application file for complete search history.

(56) References Cited

U.S. PATENT DOCUMENTS

2017/0164161 A1* 6/2017 Gupta ..................... H04W 4/06
2019/0090298 A1* 3/2019 Abraham .............. H04W 76/27
2019/0239032 A1* 8/2019 Balasubramanian ........................
H04L 65/611

(Continued)

FOREIGN PATENT DOCUMENTS

CN 108476142 A 8/2018
CN 110167190 A 8/2019

(Continued)

OTHER PUBLICATIONS

Supplementary European Search Report issued Aug. 10, 2023 in Application No. 21841515.6 (20 pages).

(Continued)

*Primary Examiner* — Khaled M Kassim
*Assistant Examiner* — Ahmed Saifuddin
(74) *Attorney, Agent, or Firm* — ArentFox Schiff LLP

(57) ABSTRACT

Embodiments of this disclosure provide methods, apparatuses, non-transitory computer-readable storage medium, and electronic devices for a multicast broadcast service. A method includes: receiving a first multicast broadcast service (MBS) session start request, selecting an intermediate user plane node, transmitting a first user plane MBS session establishment request to the intermediate user plane node, receiving a first user plane MBS session establishment response fed back by the intermediate user plane node and transmitting a second MBS session start request to a son control plane node to instruct the son control plane node to allocate son user plane nodes to the intermediate user plane node.

20 Claims, 20 Drawing Sheets

(56) References Cited

U.S. PATENT DOCUMENTS

| | | | | |
|---|---|---|---|---|
| 2020/0260233 A1* | 8/2020 | Yang | ..................... | H04W 76/11 |
| 2021/0014152 A1* | 1/2021 | Li | ......................... | H04L 12/185 |
| 2022/0174119 A1* | 6/2022 | Ge | ........................ | H04W 76/11 |
| 2022/0312311 A1* | 9/2022 | Vangala | ................ | H04W 48/20 |
| 2022/0369074 A1* | 11/2022 | Yang | ..................... | H04W 76/40 |

FOREIGN PATENT DOCUMENTS

| | | | |
|---|---|---|---|
| CN | 111866755 A | 10/2020 |
| CN | 111866756 A | 10/2020 |
| CN | 111866757 A | 10/2020 |
| CN | 111866758 A | 10/2020 |
| EP | 2083534 A1 | 7/2009 |
| WO | 2019192445 A1 | 10/2019 |
| WO | 2020002374 A1 | 1/2020 |

OTHER PUBLICATIONS

International Search Report and Written Opinion issued Sep. 13, 2021 in International Application No. PCT/CN2021/100085 with English Translation (9 pages).

Juniper Networks et al. "Alignment on the use of terminologies for delivery methods" SA WG2 Meeting #S2-139e 2-2004162, Jun. 12, 2020.

"3GPP TR 23.757", 3rd Generation Partnership Project, Technical Report, Release 17, Jun. 2020, 154 pages.

"3GPP TS 23.246", 3rd Generation Partnership Project, Technical Specification, Release 16, Sep. 2019, 77 pages.

Office Action received for Korean Patent Application No. 10-2022-7035155, mailed on May 26, 2025, 21 pages (12 pages of English Translation and 9 pages of Original OA).

* cited by examiner

Unicast source

Multicast source

IGMPv1 protocol header format
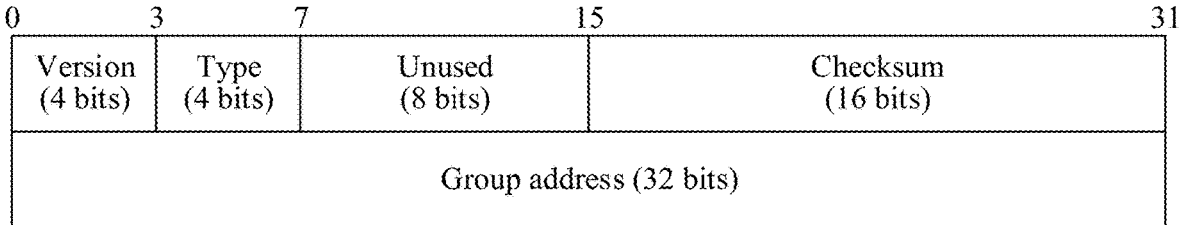
IGMPv2 protocol header format
IGMPv3 membership report message format
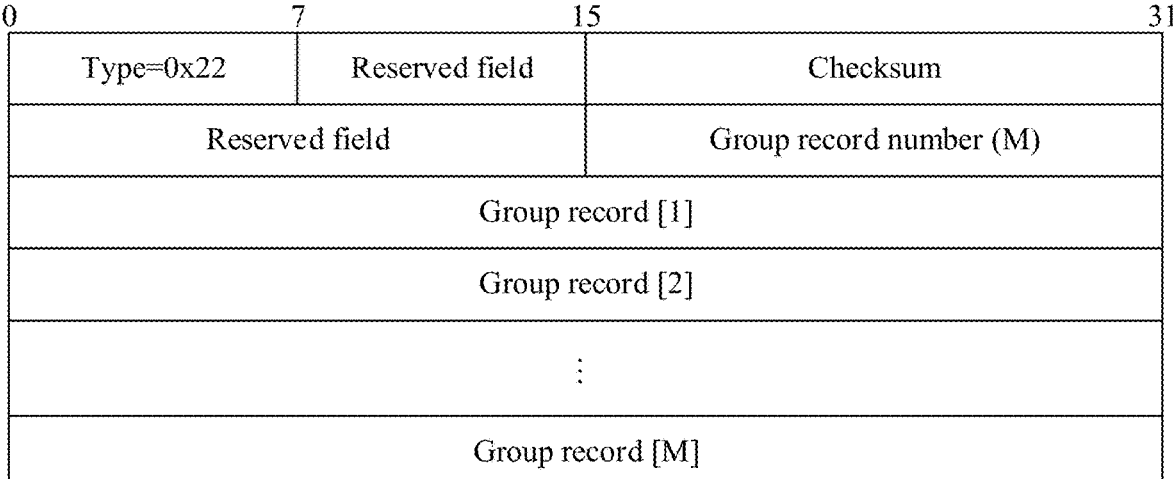
FIG. 7

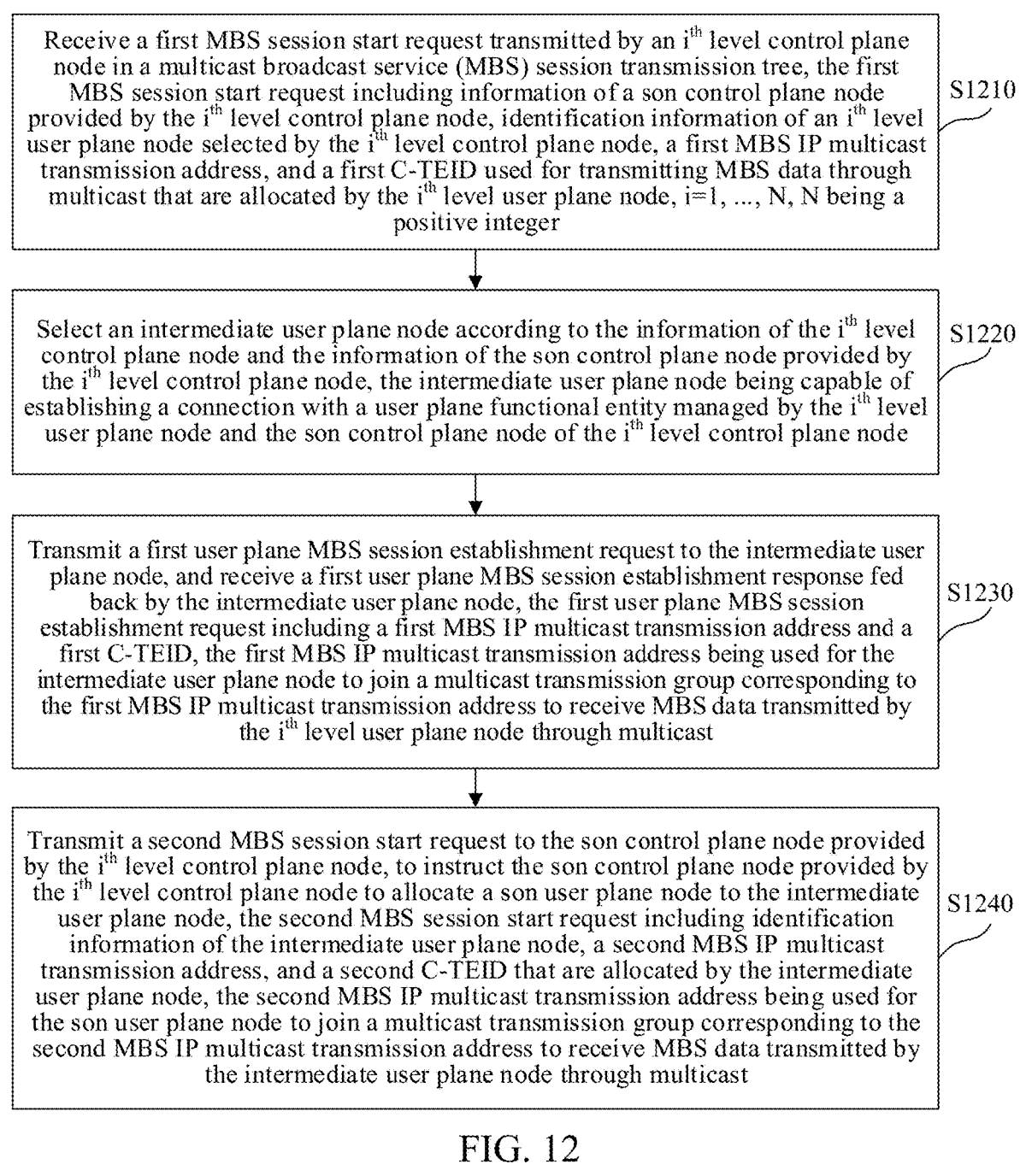

Receive a first MBS session start request transmitted by an $i^{th}$ level control plane node in a multicast broadcast service (MBS) session transmission tree, the first MBS session start request including information of a son control plane node provided by the $i^{th}$ level control plane node, identification information of an $i^{th}$ level user plane node selected by the $i^{th}$ level control plane node, a first MBS IP multicast transmission address, and a first C-TEID used for transmitting MBS data through multicast that are allocated by the $i^{th}$ level user plane node, i=1, ..., N, N being a positive integer    S1210

Select an intermediate user plane node according to the information of the $i^{th}$ level control plane node and the information of the son control plane node provided by the $i^{th}$ level control plane node, the intermediate user plane node being capable of establishing a connection with a user plane functional entity managed by the $i^{th}$ level user plane node and the son control plane node of the $i^{th}$ level control plane node    S1220

Transmit a first user plane MBS session establishment request to the intermediate user plane node, and receive a first user plane MBS session establishment response fed back by the intermediate user plane node, the first user plane MBS session establishment request including a first MBS IP multicast transmission address and a first C-TEID, the first MBS IP multicast transmission address being used for the intermediate user plane node to join a multicast transmission group corresponding to the first MBS IP multicast transmission address to receive MBS data transmitted by the $i^{th}$ level user plane node through multicast    S1230

Transmit a second MBS session start request to the son control plane node provided by the $i^{th}$ level control plane node, to instruct the son control plane node provided by the $i^{th}$ level control plane node to allocate a son user plane node to the intermediate user plane node, the second MBS session start request including identification information of the intermediate user plane node, a second MBS IP multicast transmission address, and a second C-TEID that are allocated by the intermediate user plane node, the second MBS IP multicast transmission address being used for the son user plane node to join a multicast transmission group corresponding to the second MBS IP multicast transmission address to receive MBS data transmitted by the intermediate user plane node through multicast    S1240

FIG. 12

Figures 13, 14:
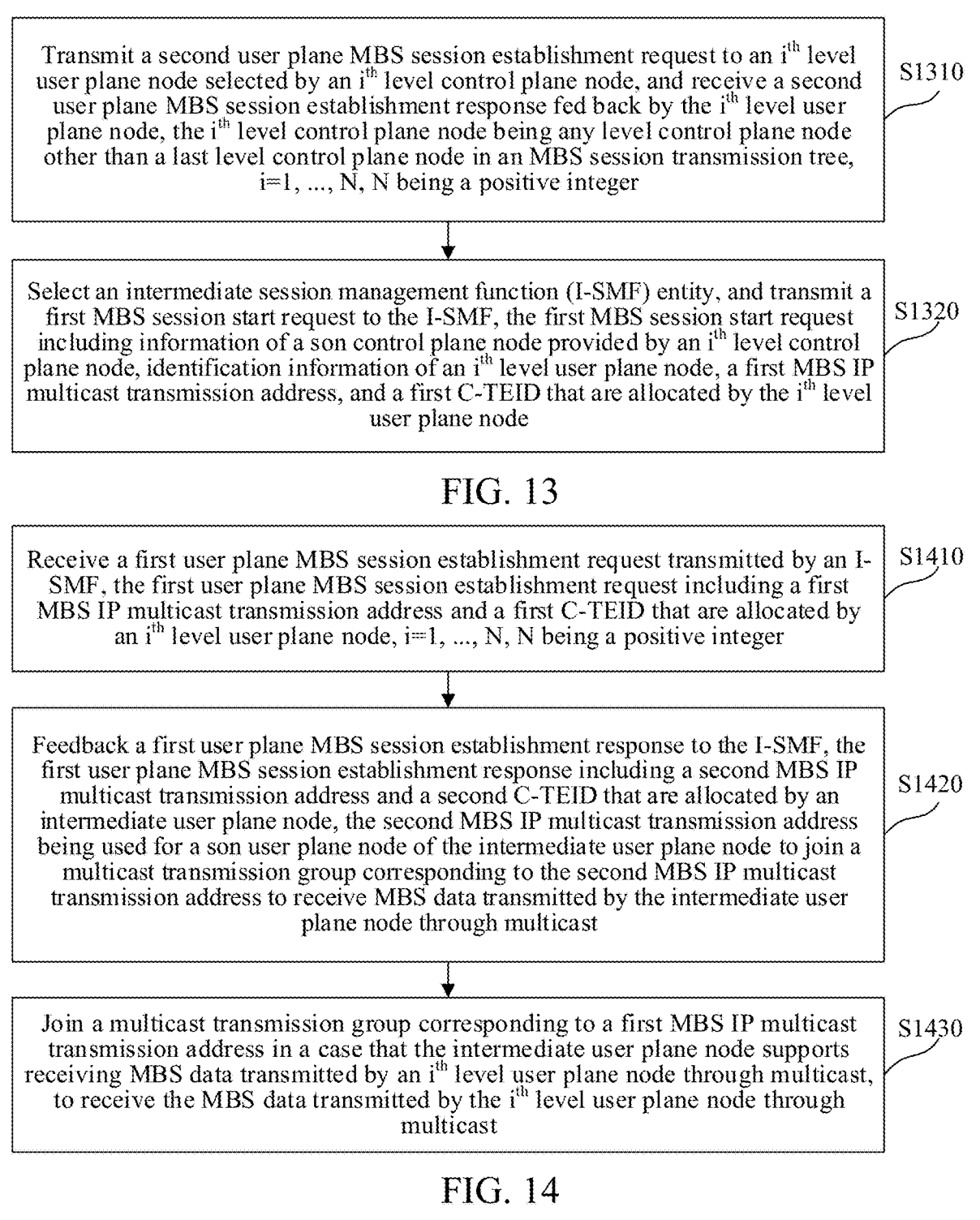

Transmit a second user plane MBS session establishment request to an $i^{th}$ level user plane node selected by an $i^{th}$ level control plane node, and receive a second user plane MBS session establishment response fed back by the $i^{th}$ level user plane node, the $i^{th}$ level control plane node being any level control plane node other than a last level control plane node in an MBS session transmission tree, $i=1, ..., N$, N being a positive integer

S1310

Select an intermediate session management function (I-SMF) entity, and transmit a first MBS session start request to the I-SMF, the first MBS session start request including information of a son control plane node provided by an $i^{th}$ level control plane node, identification information of an $i^{th}$ level user plane node, a first MBS IP multicast transmission address, and a first C-TEID that are allocated by the $i^{th}$ level user plane node

Receive a first user plane MBS session establishment request transmitted by an I-SMF, the first user plane MBS session establishment request including a first MBS IP multicast transmission address and a first C-TEID that are allocated by an $i^{th}$ level user plane node, $i=1, ..., N$, N being a positive integer

S1410

Feedback a first user plane MBS session establishment response to the I-SMF, the first user plane MBS session establishment response including a second MBS IP multicast transmission address and a second C-TEID that are allocated by an intermediate user plane node, the second MBS IP multicast transmission address being used for a son user plane node of the intermediate user plane node to join a multicast transmission group corresponding to the second MBS IP multicast transmission address to receive MBS data transmitted by the intermediate user plane node through multicast

S1420

Join a multicast transmission group corresponding to a first MBS IP multicast transmission address in a case that the intermediate user plane node supports receiving MBS data transmitted by an $i^{th}$ level user plane node through multicast, to receive the MBS data transmitted by the $i^{th}$ level user plane node through multicast

METHOD, APPARATUS, MEDIUM AND ELECTRONIC DEVICE FOR MULTICAST BROADCAST SERVICE

RELATED APPLICATIONS

The present application is a continuation of International Application No. PCT/CN2021/100085, entitled "COMMUNICATION METHOD AND APPARATUS FOR MULTICAST BROADCAST SERVICE, MEDIUM, AND ELECTRONIC DEVICE" and filed on Jun. 15, 2021, which claims priority to Chinese Patent Application No. 202010694105.7, entitled "COMMUNICATION METHOD AND APPARATUS FOR MULTICAST BROADCAST SERVICE, MEDIUM, AND ELECTRONIC DEVICE" and filed on Jul. 17, 2020. The entire disclosures of the prior applications are hereby incorporated by reference in their entirety.

FIELD OF THE TECHNOLOGY

This application relates to the field of computer and communication technologies, including multicast service and broadcast service.

BACKGROUND OF THE DISCLOSURE

In 5G multicast broadcast service (MB S) systems, the control plane is separated from the user plane, that is, the control plane node and the user plane node are no longer the same network node. In this case, many problems will be encountered during the establishment of a user plane MBS session transmission tree.

SUMMARY

Embodiments of this disclosure provide a method, an apparatus, a medium, and an electronic device for a multimedia broadcast service, in the scenarios for at least establishing a user plane MBS session transmission tree under a communication system architecture in which a control plane is separated from a user plane to a certain extent and also improving transmission efficiency of MBS data.

One aspect of the embodiments of this disclosure provides a method and an apparatus (e.g., for intermediate session management function (I-SMF)) for a multicast broadcast service. The apparatus includes processing circuitry. The processing circuitry receives a first multicast broadcast service (MB S) session start request transmitted by an ith level control plane node in a MBS session transmission tree. The first MBS session start request includes information of a son control plane node, identification information of an ith level user plane node, and first MB S Internet Protocol (IP) multicast distribution information. The first MBS IP multicast distribution information includes at least a first MBS IP multicast transmission address that is allocated by the ith level user plane node for a first multicast transmission group, i being a positive integer. The processing circuitry selects an intermediate user plane node according to information of the ith level control plane node and the information of the son control plane node. The intermediate user plane node is capable of establishing a connection with a user plane function entity managed by the ith level user plane node and with a user plane function entity managed by the son control plane node. The processing circuitry transmits a first user plane MBS session establishment request to the intermediate user plane node. The first user plane MBS session establishment request includes the first MBS IP multicast distribution information for the intermediate user plane node to join the first multicast transmission group to receive MBS data transmitted by the ith level user plane node. The processing circuitry receives a first user plane MBS session establishment response fed back by the intermediate user plane node and transmits a second MBS session start request to the son control plane node to instruct the son control plane node to allocate son user plane nodes to the intermediate user plane node. The second MBS session start request includes identification information of the intermediate user plane node, and second MBS IP multicast distribution information. The second MBS IP multicast distribution information includes at least a second MBS IP multicast transmission address for the son user plane nodes to join a second multicast transmission group associated with the second MBS IP multicast transmission address to receive MBS data transmitted by the intermediate user plane node through multicast.

According to an aspect of an embodiment of this disclosure, a computer-readable medium is provided, storing a computer program, the computer program, when executed by a processor, implementing the communication method for a multicast broadcast service according to the foregoing embodiments.

One aspect of the embodiments of this disclosure provides an electronic device, including: one or more processors; and a storage apparatus, configured to store one or more programs, the one or more programs, when executed by the one or more processors, causing the one or more processors to implement the communication method for a multicast broadcast service according to the foregoing embodiments.

According to an aspect of an embodiment of this disclosure, a computer program product or a computer program is provided, the computer program product or the computer program including computer instructions, the computer instructions being stored in a computer-readable storage medium. A processor of the computer device reads the computer instructions from the computer-readable storage medium and executes the computer instructions to cause the computer device to perform the communication method for a multicast broadcast service provided in the foregoing embodiments.

In the technical solution provided by some embodiments of this disclosure, an $i^{th}$ level control plane node selects an I-SMF, and then transmits a first MBS session start request to the I-SMF, to instruct the I-SMF to establish a user plane MBS session with an intermediate user plane node. The intermediate user plane node may join a multicast transmission group corresponding to a first MBS IP multicast transmission address allocated by an $i^{th}$ level user plane node to receive MBS data transmitted by the $i^{th}$ level user plane node through multicast. In addition, the I-SMF may transmit a second MBS session start request to a son control plane node provided by the $i^{th}$ level control plane node, to instruct the son control plane node to allocate son user plane nodes to the intermediate user plane node. The son user plane nodes allocated to the intermediate user plane node may join a multicast transmission group corresponding to a second MBS IP multicast transmission address allocated by the intermediate user plane node to receive MBS data transmitted by the intermediate user plane node. It can be learned that in the technical solution of the embodiments of this disclosure, under a communication system architecture in which a control plane is separated from a user plane, a user plane MBS session transmission tree is established, and because the intermediate user plane node may join the multicast transmission group corresponding to the first MBS IP multicast transmission address allocated by the $i^{th}$ level user plane node to receive the MBS data transmitted by the $i^{th}$ level user plane node through multicast, and the son user plane nodes of the intermediate user plane node may join the multicast transmission group corresponding to the second MBS IP multicast transmission address allocated by the intermediate user plane node to receive the MBS data transmitted by the intermediate user plane node through multicast, the transmission efficiency of the MBS data may be improved.

It is to be understood that, the foregoing general descriptions and the following detailed descriptions are merely for illustration and explanation purposes and are not intended to limit this disclosure.

BRIEF DESCRIPTION OF THE DRAWINGS

Accompanying drawings herein are incorporated into the specification and constitute a part of this specification, show embodiments that conform to this disclosure, and are used for describing a principle of this disclosure together with this specification. The accompanying drawings described below are some embodiments of this disclosure. In the accompanying drawings:

FIG. 7 is a schematic diagram of a protocol header format of IGMPv1, a protocol header format of IGMPv2, and a format of a membership report message in IGMPv3.

FIG. 12 is a flowchart of a communication method for a multicast broadcast service according to an embodiment of this disclosure.

FIG. 13 is a flowchart of a communication method for a multicast broadcast service according to an embodiment of this disclosure.

FIG. 14 is a flowchart of a communication method for a multicast broadcast service according to an embodiment of this disclosure.

DESCRIPTION OF EMBODIMENTS

The exemplary implementations are now described with reference to the accompanying drawings. However, the examples of implementations may be implemented in multiple forms, and it is not to be understood as being limited to the examples of implementations described herein. Conversely, the implementations are provided to make this disclosure more clear, and convey the idea of the examples of the implementations to a person skilled in the art.

In addition, the described features, structures, or characteristics may be combined in one or more embodiments in any appropriate manner. In the following descriptions, a lot of specific details are provided to give an understanding of the embodiments of this disclosure. However, a person skilled in the art is to be aware that, the technical solutions in this disclosure may be implemented without one or more of the particular details, or another method, unit, apparatus, or step may be used. In other cases, well-known methods, apparatuses, implementations, or operations are not shown or described in detail, to avoid obscuring the aspects of this disclosure.

The block diagrams shown in the accompanying drawings are merely function entities and do not necessarily correspond to physically independent entities. That is, the function entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

The term "plurality of" mentioned herein means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

2G (2nd generation mobile communications), 3G (3rd generation mobile communications), and 4G (4th generation mobile communications) wireless communication systems support multimedia broadcast multicast services (MBMS), which includes broadcast and multicast services. However, only the 2G and 3G systems support the multicast service, the 4G system does not support the multicast service in standards, and all the 2G, 3G, and 4G systems support the broadcast service.

Figure 1:
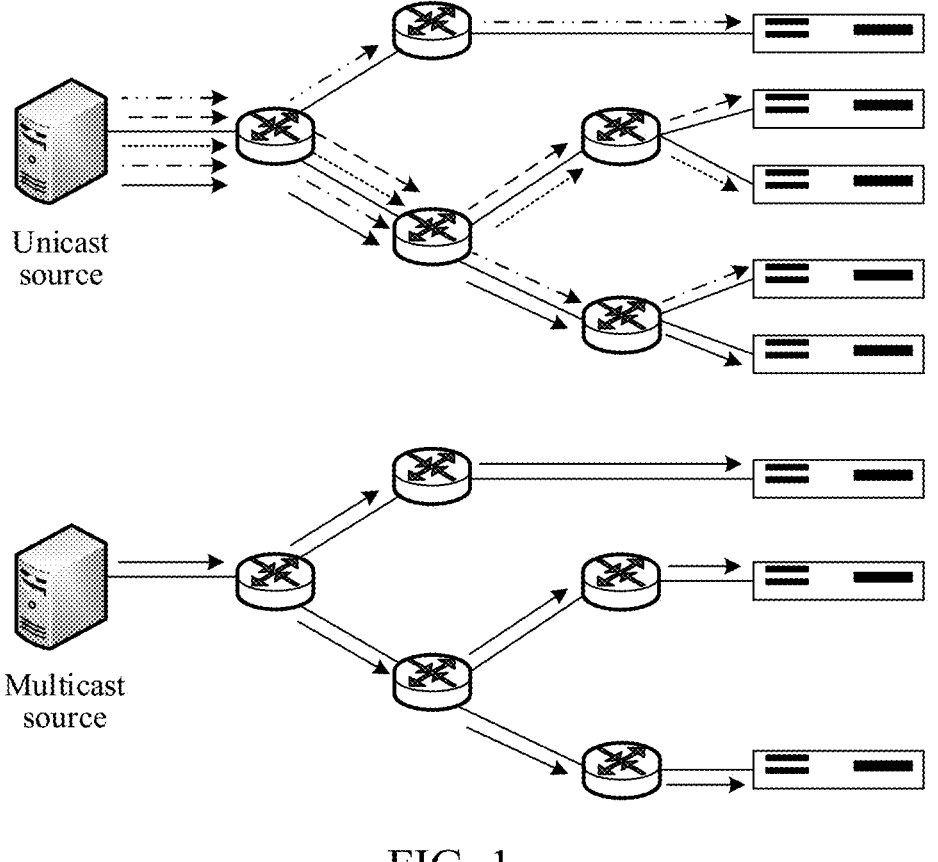
FIG. 1 is a schematic flowchart showing data transmission in a unicast communication system and a multicast communication system.

In addition to the broadcast and multicast services, communication between network nodes also includes unicast. "Unicast" is one-to-one communication, and is advantageous in that a transmitter may transmit different content to different recipients. However, if the transmitter needs to transmit the same content to a plurality of recipients, the transmitter needs to transmit a plurality of copies of the same data to the plurality of recipients in an end-to-end manner, which is inefficient. Specifically, as shown in FIG. 1, when a unicast source transmits data to a plurality of recipients in a unicast mode, the unicast source needs to transmit a plurality of copies of the same data in an end-to-end manner (where different line types in FIG. 1 represent different data flows).

"Multicast" means that a transmitter transmits the same content to a plurality of recipients. Multicast is especially suitable for online video conferencing and online video-on-demand. This is because that if the unicast mode is used, there will be as many transmissions as there are recipients, which is obviously very inefficient, If the broadcast mode that does not distinguish targets but transmits data to all the targets is adopted, although the data may be transmitted at a time, the purpose of distinguishing specific data recipients cannot be achieved. As can be seen, using the multicast mode not only can realize the transmission of the same data to a plurality of recipients at a time, but also can achieve the purpose of transmitting data to only a specific object. Specifically, as shown in FIG. 1, a multicast source may transmit the same data to a plurality of recipients at a time.

"Broadcasting" also transmits the same content to a plurality of recipients, but does not allow for selection of recipients during transmission. Therefore, the data may be unnecessarily transmitted to some devices, resulting in a waste of network resources. In addition, some recipients may not be "interested" in the broadcast content, so after receiving the broadcast content, these recipients have to discard the received data packets, which also results in a waste of terminal resources.

The fundamental difference between the broadcast service and the multicast service lies in that all user equipments (UEs) in a system may participate in the broadcast service without subscription, but cannot participate in the multicast service without subscription and authentication. There are many types of multicast services and broadcast services. For a multicast service, a UE joins a multicast group of a corresponding service based on an IP multicast address. A broadcast service corresponding to a broadcast group has a specific service area.

Figure 2:
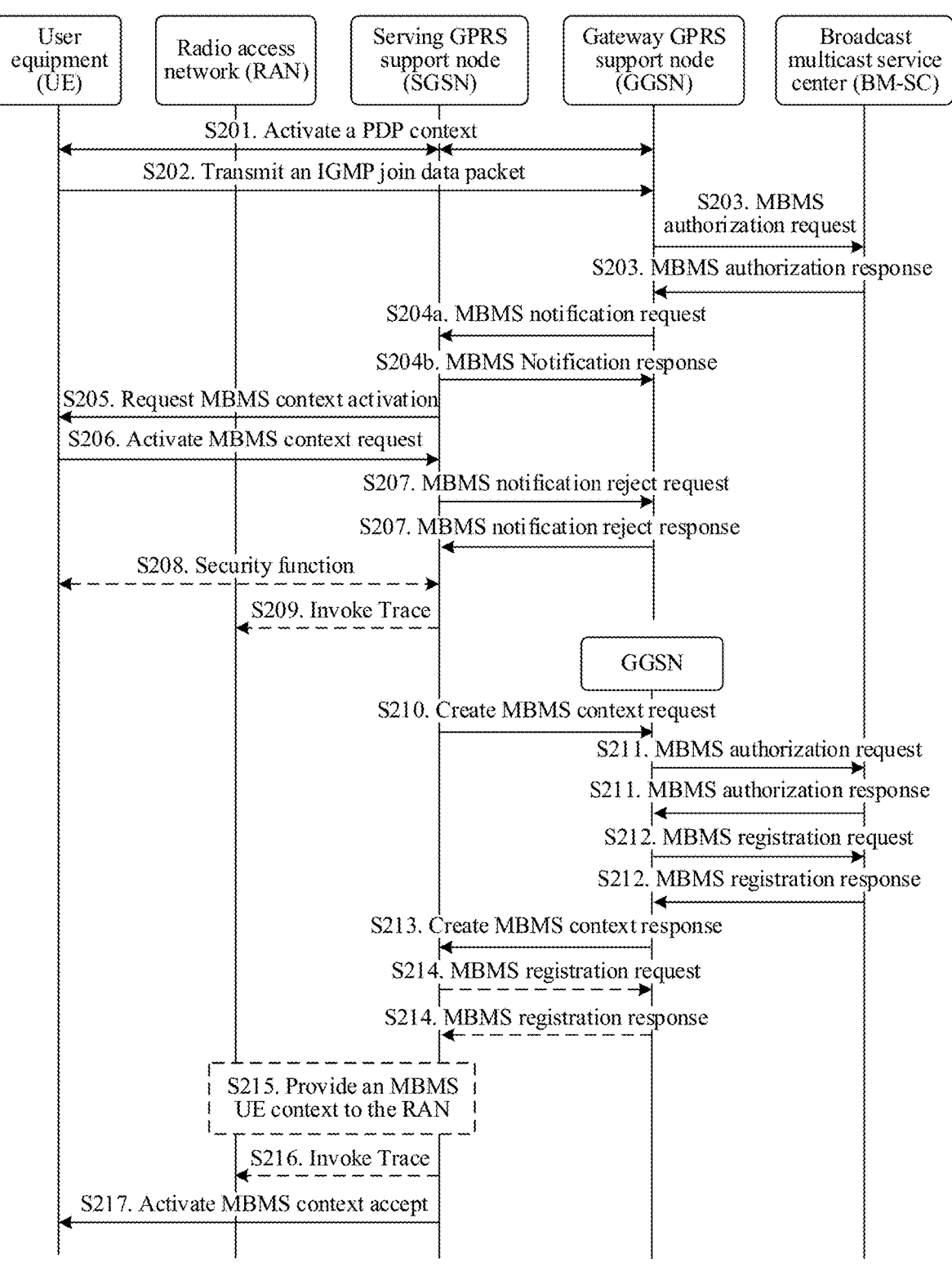
FIG. 2 is a schematic diagram of a multicast context activation process of MBMS.

An MBMS multicast context activation process is defined in clause 8.2 in 3rd Generation Partnership Project (3GPP) TS 23.246, which, as shown in FIG. 2, includes the following steps:

In step S201, a UE selects an access point name (APN) to establish a packet data protocol (PDP) context, and then an Internet protocol (IP) address is allocated to the UE. For the convenience of subsequent description, the APN selected by the UE in this step is identified by APN0.

In step S202, the UE selects an IP multicast address (where the IP multicast address is used for identifying a multicast service), and then transmits an IGMP join data packet to a gateway GPRS support node (GGSN) to indicate that the UE wants to join this multicast group.

In step S203, the GGSN transmits an MBMS authorization request to a broadcast multicast service center (BM-SC), and receives an MBMS authorization response fed back by the BM-SC. The BM-SC verifies whether the UE may join the multicast group according to subscription data of the UE, and if determining that the UE may join the multicast group, the BM-SC adds an APN to be used by the UE to join the multicast group to the MBMS authorization response (where the APN is identified by APN1), and then transmits the APN1 to be used by the UE to the UE in steps S204a, S204b, and S205.

In step S206, the UE initiates a new MBMS session according to the APN1 provided by the BM-SC, that is, transmits an activate MBMS context request, the activate MBMS context request including the IP multicast address, the APN1, and an MBMS capability of the UE. The MBMS capability may be, for example, a quality of service (QoS) capability.

In step S207, a serving GPRS support node (SGSN) checks whether the UE has subscribed to the APN1. If the check fails, the SGSN transmits an MBMS notification reject request to the GGSN, and the GGSN transmits an MBMS notification reject response to the SGSN. The subscription data of the UE is stored in a home subscriber server (HSS), and an interaction process between the SGSN and the HSS is not shown in FIG. 2. In addition, for specific processes of step S208 and step S209 in FIG. 2, refer to activate MBMS context process defined in clause 8.2 in TS 23.246.

In step S210, if the check on the UE by the SGSN succeeds, the SGSN selects another GGSN (that is, a GGSN supporting the multicast service) according to the APN1, and transmits a create MBMS context request message to the GGSN, the message including an ID of the UE, a UE location ID, the IP multicast address, the APN1, and access information (for example, 2G or 3G) of the UE.

The ID of the UE may be an international mobile subscriber identity (IMSI) or a mobile station international integrated service digital network number (MSISDN). The UE location ID may be a radio access technology (RAT) ID, a common gateway interface (CGI), a service area identity (SAI), or the like.

In step S211, the GGSN transmits an MBMS authorization request to the BM-SC, and the BM-SC authorizes the UE according to subscription information of the UE and feeds back an MBMS authorization response to the GGSN.

In step S212, if access of the UE is authorized and there is no context of the UE indicated by the IP multicast address on the GGSN, that is, the UE is the first to access the multicast service identified by the IP multicast address on the GGSN, the UE registers with the upstream node BM-SC to indicate that multicast service data to be transmitted to the IP multicast address needs to be transmitted to this GGSN. (Note: Different GGSNs may be selected for different UEs, so when the BM-SC transmits multicast data downward, the same multicast data needs to be transmitted to these GGSNs at the same time).

In step S213, the GGSN creates an MBMS UE context of the UE corresponding to the IP multicast address, and then transmits a create MBMS context response to the SGSN to indicate that the MBMS context is successfully created.

In step S214, similar to S212, if there is no context of the UE indicated by the IP multicast address on the SGSN, that is, the UE is the first to access the multicast service identified by the IP multicast address on the SGSN, the UE registers with the upstream node GGSN to indicate that multicast service data to be transmitted to the IP multicast address needs to be transmitted to this SGSN. (Note: Different SGSNs may be selected for different UEs, so when the GGSN sends multicast data downstream, the same multicast data needs to be sent to these SGSNs at the same time).

For specific processes of steps S215 to S217 in FIG. 2, refer to the activate MBMS context process defined in clause 8.2 in TS 23.246.

It can be learned from the process shown in FIG. 2 that a UE in 2G or 3G first establishes a PDP context by using an APN0, and an IP address is allocated to the UE, and then the UE transmits an IGMP join data packet indicating that the UE joins a multicast group to a network with this IP address; the GGSN needs to intercept this IGMP join data packet, and then transmit a signaling (that is, ab MBMS authorization request) to a BM-SC; the BM-SC allocates an APN1 to the UE; then the UE transmits a activate MBMS context request message with this APN1, thus activating an MBMS context.

Figures 3, 4:
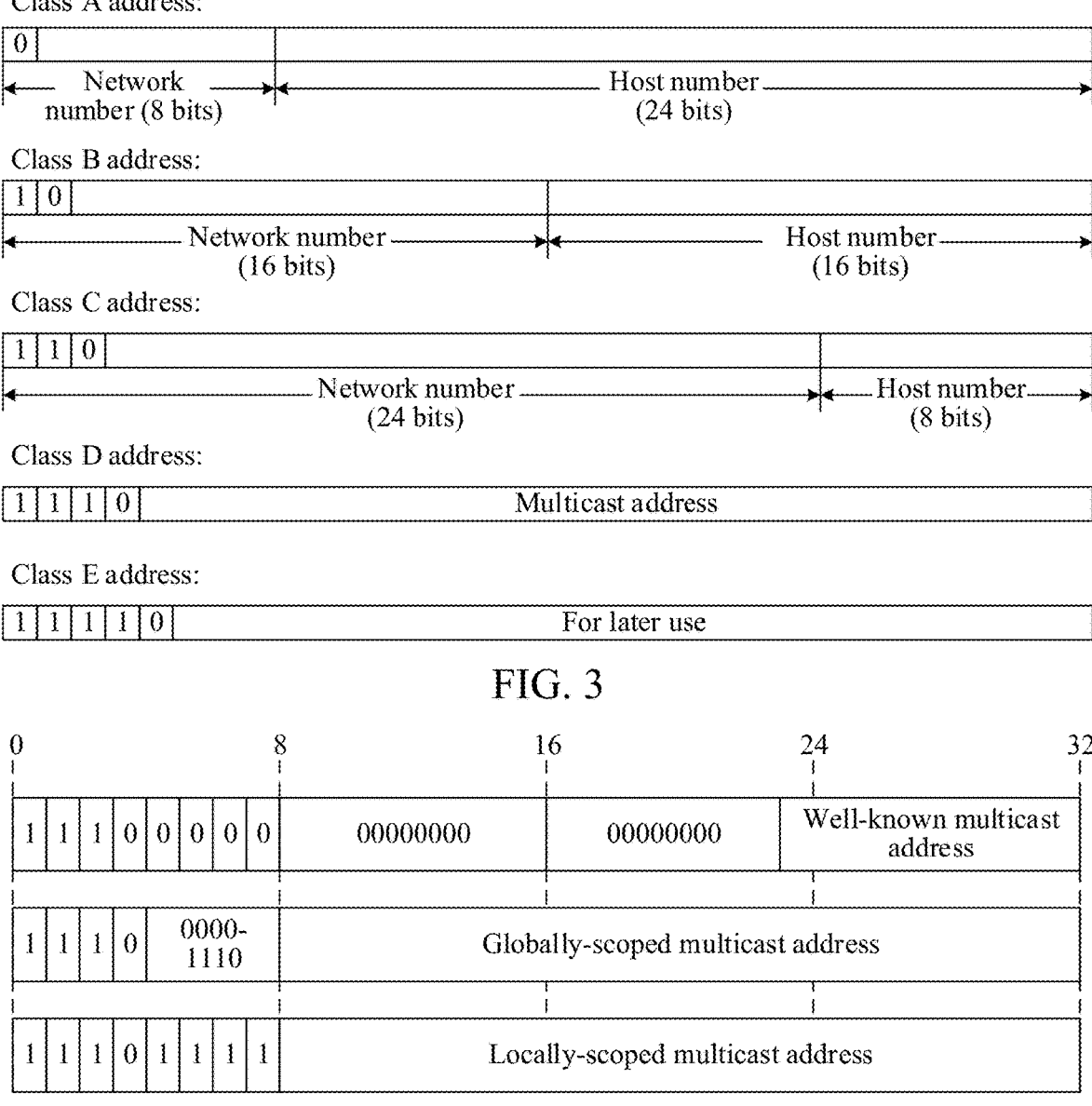
FIG. 3 is a schematic diagram showing classes of an IPv4 network addresses.
FIG. 4 is a schematic structural diagram of an IPv4 multicast address.

The IP multicast address may be an IPv4 multicast address or an IPv6 multicast address. As shown in FIG. 3, the IPv4 network address is classified as a class A address, a class B address, a class C address, a class D address, and a class E address. In the class A address, the first byte (8 bits) is network number, and the other three bytes (24 bits) are host number. The range of the class A address is: 0.0.0.0 to 127.255.255.255. In the class B address, the first byte and the second byte are network number, and the other two bytes are host number. The range of the class B address is: 128.0.0.0 to 191.255.255.255. In the class C address, the first three bytes are network number, and the fourth byte is host number. The range of the class C address is: 192.0.0.0 to 223.255.255.255. The class D address is a multicast address. The first four bits of the class D address are "1110". The range of the class D address is: 224.0.0.0 to 239.255.255.255. The class E address is a reserved address. The first five bits of the class E address are "11110". The range of the class E address is: 240.0.0.0 to 247.255.255.255.

As shown in FIG. 4, the IPv4 multicast address may have three structures, which are respectively applicable to a well-known multicast address, a globally-scope multicast address, and a local-scoped multicast address.

Figure 5:
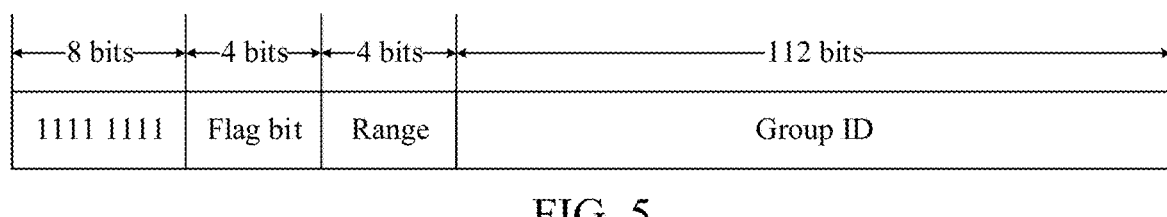
FIG. 5 is a schematic structural diagram of an IPv6 multicast address.

A structure of an IPv6 multicast address is as shown in FIG. 5, where the first byte (8 bits) indicates that the address is a multicast address, the next four bits are a flag field, and the next four bits are a scope field, and the last 112 bits are a group ID.

The first bit of a flag field is 0, which is reserved for future use. The second bit of the flag field indicates whether the multicast address is embedded with a rendezvous point (RP). The RP is a distribution point for a specified multicast stream in a multicast network. For example, when the second bit value is 0, it indicates that no rendezvous point is embedded and when the second bit value is 1, it indicates that a rendezvous point is embedded. The third bit of the flag field indicates whether prefix information is embedded in the multicast address. For example, when the third bit value is 0, it indicates that no prefix information is embedded, and when the third bit value is 1, it indicates that prefix information is embedded. The last bit of the flag field indicates whether the multicast address is a permanently assigned multicast address or a transient multicast address. For example, when the last bit value is 0, it indicates that the multicast address is the permanently assigned multicast address and when the last bit value is 1, it indicates that the multicast address is the transient multicast address.

The function of the scope field is to limit the scope of the multicast address. The values and descriptions of the scope field are as shown in Table 1:

TABLE 1

| Value | Description |
|---|---|
| 0 | Reserved |
| 1 | Interface-local scope, called a node-local scope in earlier specification |
| 2 | Link-local scope |
| 3 | Reserved |
| 4 | Admin-local scope |
| 5 | Site-local scope |
| 6 and 7 | Not allocated |
| 8 | Organization-local scope |
| 9, A, B, C, and D | Not allocated |
| E | Global scope |
| F | Reserved |

In multicast communication, the multicast address can be used as only a destination IP address (that is, the destination IP address in an IP header), and the multicast address cannot be used as a source IP address. In multicast services of MBMS (2G, 3G) and MBS (5G), multicast data packets are all transmitted down by the network side to UEs, that is, the multicast data packets are all downlink (DL) data packets, and the UEs cannot transmit data to the network side through corresponding multicast addresses. That is, the UE cannot use the multicast address as the destination IP address to transmit an uplink IP packet, that is, there is no uplink (UL) multicast data.

Figure 6:
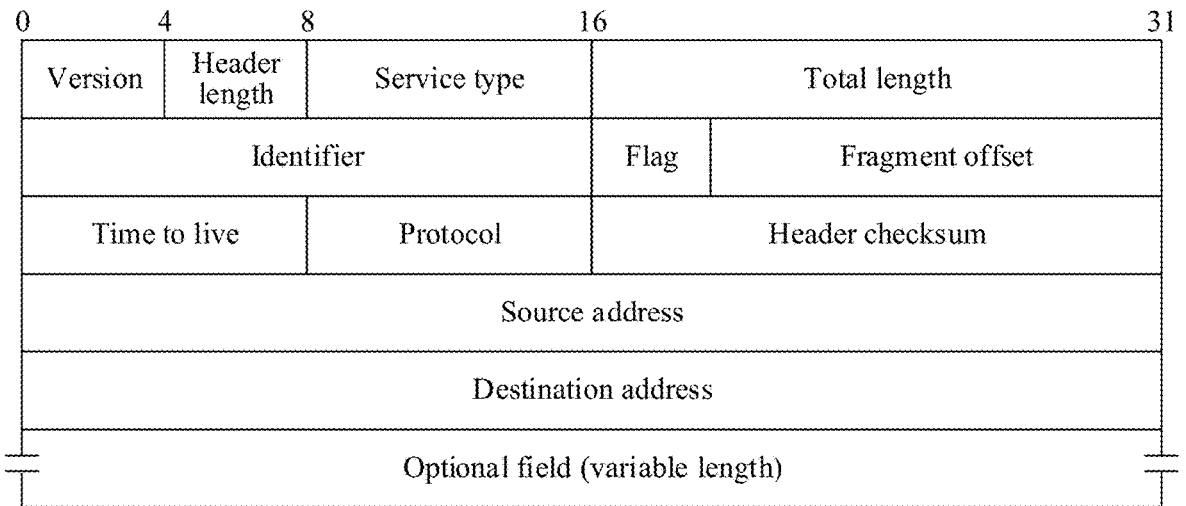
FIG. 6 is a schematic structural diagram of an IPv4 header.

An IP packet transmitted in a network is composed of two parts: an IP header and data. As shown in FIG. 6, a structure of an IPv4 header mainly includes: "version" field, "header length" field, "service type" field, "total length" field, "identifier" field, "flag" field, "fragment offset" field, "time to live" field, "protocol" field, "header checksum" field, "source address" field, "destination address" field, and "optional field".

The "version" field occupies 4 bits and refers to the version of the IP protocol, for example, a version number is 4 (i.e., IPv4). The "header length" field occupies 4 bits. The "service type" field occupies 8 bits and is used to obtain a better service. The "total length" field occupies 16 bits and refers to a length of a sum of the header and data. The "identifier" field occupies 16 bits and is a counter configured to generate an identifier of a datagram. The "flag" field occupies 3 bits. The least significant bit of the "flag" field is more fragment (MF). If MF=1, it indicates that there are "more fragments" later. If MF=0, it indicates that it is the last fragment. The middle bit of the "flag" field is don't fragment (DF), and fragmentation is allowed only when DF=0. The "fragment offset" field occupies 12 bits, and refers to the relative position of a certain fragment obtained by fragmenting a relatively long packet in the original packet. The "time to live" field is time to live (TTL), which occupies 8 bits. The TTL field is a field initially set by the transmitter. The "protocol" field occupies 8 bits and is used for indicating which protocol the data carried in this datagram uses, where a value of "1" indicates an Internet control message protocol (ICMP); a value of "2" indicates an IGMP; a value of "6" indicates a transmission control protocol (TCP); a value of "17" indicates a user datagram protocol (UDP); a value of "50" indicates an encapsulating security payload (ESP) protocol; and a value of "51" indicates an authentication header (AH) protocol. The "header checksum" field occupies 16 bits, where only the header of the datagram is checked, and the data part is not checked. The "source address" field and the "destination address" field each occupy 4 bytes, and are used for recording a source address and a destination address respectively.

For the IGMP protocol mentioned above, there are three protocol versions, namely, IGMPv1, IGMPv2, and IGMPv3, and corresponding standards are RFC1054, RFC2236, and RFC3376 respectively. A protocol header format of IGMPv1 and a protocol header format of IGMPv2 are shown in FIG. 7. A protocol header of IGMPv1 includes a 4-bit IGMP version field, a 4-bit IGMP packet type field (where a field value of 1 indicates a host membership query type; and a value of 2 indicates a host membership report type), an 8-bit unused field (where this field is filled with 0 when being transmitted and is ignored when being received), a 16-bit IGMP checksum field (when transmitting a packet, the check word is calculated and inserted into this field; when a packet is received, this field is checked before the packet is processed), and a 32-bit multicast address field.

A protocol header of IGMPv2 includes an 8-bit packet type field, an 8-bit maximum response time field, a 16-bit IGMP checksum field, and a 32-bit multicast address field.

The packet type field in the protocol header of IGMPv2 indicates the following types: 0x11=Membership Query, indicating an IGMP membership query message; 0x12=Version 1 Membership Report, indicating a membership report message of IGMPv1; and 0x16=Version 2 Membership Report, indicating a membership report message of IGMPv2; and 0x17=Leave Group, indicating a leave message. In IGMPv2, the old 4-bit version field and the old 4-bit type field are combined into a new 8-bit type field. The type codes of the membership query message (version 1 and version 2) and the membership report message of version 1 are set to 0x11 and 0x12 respectively to maintain backward compatibility with the IGMP version 1 and version 2 packet formats.

The maximum response time field in the protocol header of IGMPv2 is used for indicating a maximum time (in units of ⅒ second) before a response report is transmitted, and has a default value of 10 seconds. Similar to IGMPv1, when a packet is transmitted, a checksum is calculated and filled in a checksum field in the protocol header of IGMPv2. When a packet is received, a checksum is checked before the packet is processed, to determine whether an error occurs during transmission of the IGMP message.

Still referring to FIG. 7, a format of a membership report message in IGMPv3 includes a type field (because it is a membership report message, type=0x22), a reserved field, a checksum field, a group record number field, and a group record field. The IGMP join data packet shown in FIG. 2 is implemented by an IGMP membership report message. For IGMPv3, the destination IP address in the IP packet of the IGMP join message is not the IP multicast address to be joined, but the IP multicast address to be joined is included in the parameters of the message.

Figures 8, 9:
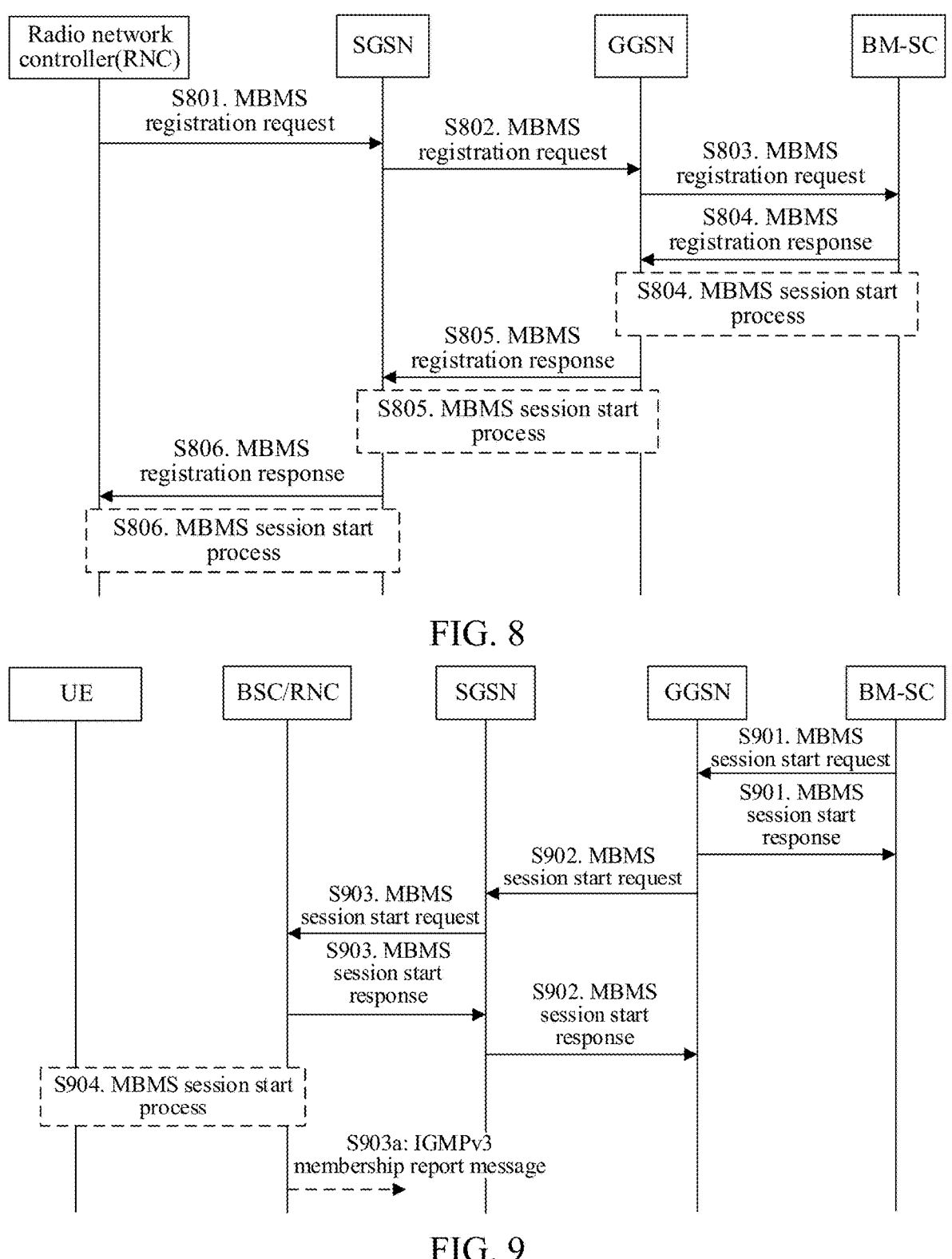
FIG. 8 is a schematic diagram of an MBMS registration process of an MBMS multicast service.
FIG. 9 is a schematic diagram of an MBMS session start process.

An MBMS registration process applicable to an MBMS multicast service is defined in clause 8.4 in the standard TS 23.246. Specifically, as shown in FIG. 8, the following steps are included:

In step S801. A radio network controller (RNC) transmits an MBMS registration request to an SGSN.

In step S802, the SGSN transmits the MBMS registration request to a GGSN.

In step S803, the GGSN transmits the MBMS registration request to a BM-SC.

In step S804, the BM-SC feeds back an MBMS registration response to the GGSN and performs an MBMS session start process.

In step S805, the GGSN feeds back the MBMS registration response to the SGSN and performs the MBMS session start process.

In step S806, the SGSN feeds back the MBMS registration response to the RNC and performs the MBMS session start process. It can be learned that a main function of the MBMS registration process is to form a signaling tree for controlling a bearer setup (an MBMS bearer context) from top to bottom. Because in the 2G or 3G standard, a control plane is not separated from a user plane, the formation of a transmission tree of an MBMS bearer control plane on the control plane is equivalent to the subsequent establishment of an MBMS bearer transmission tree from top to bottom (the MBMS bearer transmission tree is established in the MBMS session start process). In addition, because 4G does not support a multicast service, there is no MBMS registration process in the 4G standard.

The MBMS session start process is defined in clause 8.3 in the standard TS 23.246. Specifically, as shown in FIG. 9, the following steps are included:

In step S901, a BM-SC transmits an MBMS session start request to a GGSN, and the GGSN feeds back an MBMS session start response to the BM-SC.

In step S902, the GGSN transmits an MBMS session start request to an SGSN, and then the SGSN feeds back an MBMS session start response to the GGSN.

In step S903, the SGSN transmits an MBMS session start request to a base station controller (BSC)/RNC, and then the BSC/RNC feeds back an MBMS session start response to the SGSN.

In step S904, a UE performs an MBMS session start process with the RSC/RNC.

In step S903a, the BSC/RNC transmits an IGMPv3 membership report message.

For the MBMS multicast service, both the MBMS registration process and the MBS session start process are per IP multicast (each IP multicast) process for establishing the signaling tree of the MBMS bearer context of the control plane from top to bottom and the MBMS bearer transmission tree from top to bottom for this IP multicast rather than per UE per IP multicast. For the MBMS broadcast service, there is no MBMS registration process, and the MBS session start process is a per IP broadcast process for establishing the signaling tree of the MBMS bearer context of the control plane for top to bottom and the MBMS bearer transmission tree from top to bottom for this IP broadcast rather than per UE per IP broadcast.

However, for the MBMS multicast service, in order to optimize the registration process, the UE may perform a part of the MBMS registration process when performing the MBMS UE context activation process, for example, step S212 and step S214 shown in FIG. 2, but this is only performed when the first UE in the SGSN and the GGSN activates the IP multicast service. When a second UE activates this IP multicast on the same SGSN and GGSN, step S212 and step S214 shown in FIG. 2 are no longer performed.

For the MBMS multicast service and broadcast services, an important function is to form a user plane transmission tree of the multicast service and the broadcast service, to prevent the formation of a user plane transmission ring (that is, there are a plurality of different transmission paths for reaching a node), and also prevent the occurrence of MBMS broken branches (that is, there is no downstream node in a node).

In the 2G and 3G systems, a plurality of SGSNs may form a pool. Although the GGSN does not define the pool in the standard, there is a GGSN pool to provide high reliability of the system during actual deployment. In this way, when different UEs access the same BSC/RNC and activate the same MBMS IP multicast, the UEs may be selected by the BSC/RNC to different SGSNs in the same SGSN pool. However, because APNs used by the UEs are the same, different SGSNs in the same SGSN pool will be selected to different GGSNs, but the SGSNs may be connected to the same GGSN. The standard of 3GPP stipulates that the RNC is allowed to use the SGSN pool when using an Iu interface. For MBMS, the GGSN needs to be directly connected to the RNC by using a GPRS tunneling protocol-user plane (GTP-U), and the user plane is not allowed to pass through the SGSN. In this way, even if different users on the same RNC select different SGSNs by using a same APN and IP multicast, but user planes thereof are the same finally, and a plurality of different user planes do not exist.

However, a plurality of SGSNs transmit MBMS session start request messages to the BSC. For this case, that the MBMS session start request messages of other SGSNs are rejected by using the BSC/RNC to implement only one user plane is defined in the standard TS 23.236. Similarly, when a plurality of GGSNs transmit MBMS session start request messages to one SGSN, the SGSN can select only one GGSN to establish a bearer plane, to prevent occurrence of the MBMS transmission ring.

When the BSC/RNS rejects a bearer setup of one SGSN, it may cause the SGSN to have no downstream node. In this case, the SGSN can only delete itself from downstream nodes of the GGSN through a deregistration technology (for details, reference may be made to clause 8.6.0 in the standard TS 23.236), to avoid a problem that the GGSN transmits MBMS multicast data to the SGSN, but the SGSN cannot transmit the MBMS multicast data downward, thereby avoiding an MBMS transmission broken branch. Similarly, when the SGSN rejects a bearer setup of a GGSN, it may cause the GGSN to have no downstream node. In this case, the GGSN can only delete itself from downstream nodes of the BM-SC by using the deregistration technology, to prevent the BM-SC from transmitting MBMS multicast data to the GGSN, thereby avoiding the MBMS transmission broken branch.

That is, for the MBMS multicast service, except the final transmission point UE, any node has a downstream node. If one node has no downstream node, the node is to leave the transmission tree (which corresponds to a deregistration process). For example, when all MBMS UEs under a base station move to another base station, the base station needs to perform a deregistration operation on the SGSN. When all MBMS connection base stations under one SGSN perform the deregistration operations, the SGSN needs to perform the deregistration operation on the GGSN. When all MBMS connection SGSNs under one GGSN perform the deregistration operations, the GGSN needs to perform the deregistration operation on the BM-SC.

In addition, because a transmission path of MBMS services (which includes a broadcast service and a multicast service) is a tree-like structure, one or more son nodes is below each father node, and a bearer between the father node and the son node may be a GTP tunnel between the father and the son. However, when there are a relatively large quantity of son nodes, the father node needs to transmit same IP multicast data to a plurality of son nodes simultaneously, and the efficiency is obviously very low in a GTP tunnel transmission manner. To improve the transmission efficiency between the father node and the son node on a network side, the father node may allocate a local IP multicast address (the address is not a multicast address in the MBMS multicast service). The IP multicast address in the transmission layer is used for efficiently transmitting the MBMS service data between the son node (for example, the base station) and the father node (for example, the MBMS GW or the GGSN). In this case, the father node only needs to transmit out the MBMS service data by using the multicast address of the transmission layer, and all the son nodes may receive the MBMS service data, to greatly reduce a data processing volume of the father node.

By using the multicast-based bearer transmission optimization technology, the father node needs to allocate a local IP multicast transmission layer address, and after receiving the IP multicast transmission layer address allocated by the father node, the son node needs to join a multicast group of the transmission layer through an IGMP join process. Because some son nodes do not support multicast, some son nodes receive the MBMS service data in a transmission layer multicast manner, some other son nodes use a peer-to-peer GTP tunnel manner. In this case, the son node allocates an IP address and a TEID of the GTP-U. Certainly, if the father node finds that a quantity of son nodes is relatively small, the father node may also decide not to adopt multicast transmission.

Because in the MBMS system, the control plane is not separated from the user plane, that is, the network node includes functions of both the control plane and the user plane, when a network node does not support a multicast transmission technology, the network node directly returns an IP address and a TED of a GTP-U, the father node may learn that the node does not support multicast transmission. However, in a 5G multicast broadcast service (MBS) system, a control plane is separated from a user plane, that is, a control plane node and a user plane node are not a same network node. In this case, establishing an MBS session transmission tree will face a plurality of problems.

Figures 10, 11:
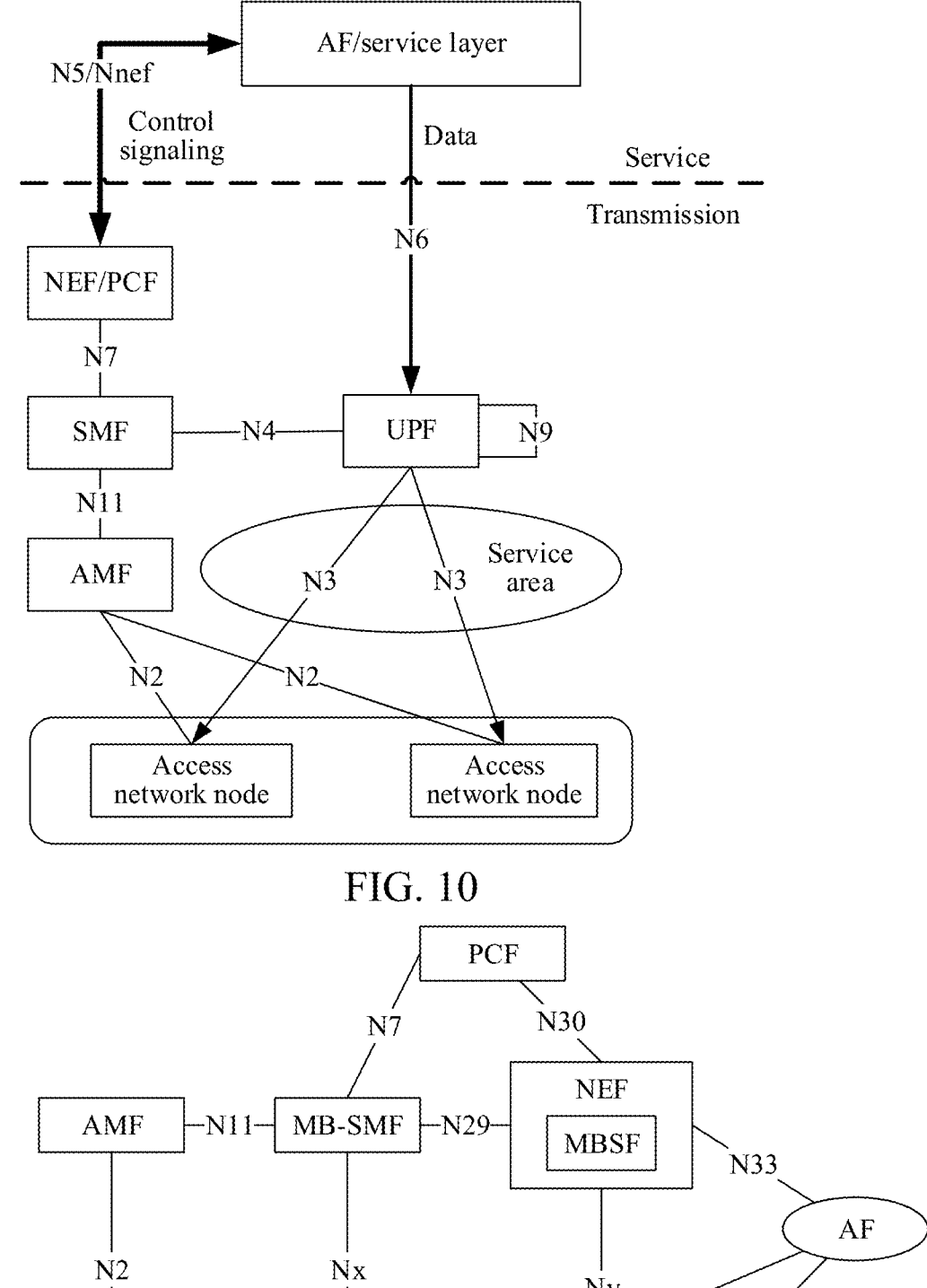
FIG. 10 is a schematic diagram of an MBS system architecture.
FIG. 11 is a schematic diagram of an MBS system architecture.

In addition, two system architectures shown in FIG. 10 and FIG. 11 are defined in the latest 5G MBS research reports. The system architecture shown in FIG. 10 is obtained by adding functions to a related 5G architecture, that is, supporting 5G MBS services by enhancing the functions and interfaces of the 5G architecture without modifying the related 5G architecture. The advantage of this architecture is that it can support 5G MBS through software upgrade. The system architecture shown in FIG. 11 is a brand-new architecture, which is obtained by adding some new network function nodes while keeping the related 5G architecture unchanged. This architecture can minimize the impact on the related 5G architecture, but some network function nodes may still need to be enhanced, such as a next generation radio access network (NG-RAN), an access and mobility management function (AMF), a unified data management (UDM), a user data repository (UDR), a network exposure function (NEF), and a PCF.

In FIG. 10, SMF represents session management function; UPF represents a user plane function; and AF represents application function. In FIG. 11, MB-UPF represents multicast/broadcast-UPF; MB-SMF represents multicast/broadcast-SMF; MBSU represents multicast/broadcast service user plane; and MBSF represents multicast/broadcast service User Plane.

Related technical content of a user plane MBS session transmission tree of a 5G MBS system is described in the following embodiments. Detailed descriptions are as follows.

FIG. 12 is a flowchart of a communication method for a multicast broadcast service according to an embodiment of this disclosure. The communication method for a multicast broadcast service may be performed by an I-SMF. The communication method for a multicast broadcast service includes at least step S1210 to step S1230. Detailed descriptions are as follows.

In step S1210, a first MBS session start request transmitted by an $i^{th}$ level control plane node in an MBS session transmission tree is received, the first MBS session start request including information of a son control plane node provided by the $i^{th}$ level control plane node, identification information of an $i^{th}$ level user plane node selected by the $i^{th}$ level control plane node, and a first MBS IP multicast transmission address and a first C-TEID used for transmitting MB S data through multicast that are allocated by the $i^{th}$ level user plane node, i=1, . . . , N, N being a positive integer.

In an embodiment of this disclosure, the ith level control plane node may select one or more user plane function entities as ith level user plane node(s) from managed user plane function entities according to the information of the son control plane node provided by the ith level control plane node. In addition, in a case that the ith level control plane node determines, according to the information of the son control plane node of the ith level control plane node, that a user plane function entity managed by the ith level control plane node is incapable of establishing a transmission path with a user plane function entity managed by the son control plane node of the ith level control plane node, the ith level control plane node may select an SMF capable of communicating with the ith level control plane node and the son control plane node of the ith level control plane node as the I-SMF.

For example, in a case that a service area of the ith level control plane node is A and a service area of the son control plane node of the ith level control plane node is B, i.e., in a case that a user plane function entity managed by the ith level control plane node is incapable of directly communicating with a user plane function entity managed by the son control plane node of the ith level control plane node, the ith level control plane node may select an I-SMF capable of communicating with the ith level control plane node and the son control plane node of the ith level control plane node.

In an embodiment of this disclosure, after selecting the ith level user plane node, the ith level control plane node may perform a user plane MBS session establishment process with the ith level user plane node, i.e., transmits a user plane MBS session establishment request to an ith level user plane node, receives a user plane MBS session establishment response fed back by the ith level user plane node, and then obtain a first MBS IP multicast transmission address and a first C-TEID that are allocated by the ith level user plane node from the user plane MBS session establishment response fed back by the ith level user plane node. After determining these information, the ith level control plane node transmits the first MBS session start request to the selected I-SMF, the first MBS session start request including these information, i.e., including the information of the son control plane node provided by the ith level control plane node, the identification information of the ith level user plane node, and the first MBS IP multicast transmission address and the first C-TEID that are allocated by the ith level user plane node.

In step S1220, an intermediate user plane node is selected according to the information of the ith level control plane node and the information of the son control plane node provided by the ith level control plane node, the intermediate user plane node being capable of establishing a connection with a user plane function entity managed by the ith level user plane node and with a user plane function entity managed by the son control plane node of the ith level user plane node.

In an embodiment of this disclosure, the information of the ith level control plane node may include a service area of the ith level control plane node, the information of the son control plane nodes provided by the ith level control plane node may include a service area of the son control plane node provided by the ith level control plane node, and the I-SMF selects, according to these information, an intermediate user plane node capable of establishing a connection with a user plane function entity managed by the ith level user plane node and with a user plane function entity managed by the son control plane node of the ith level user plane node.

S1230. Transmit a first user plane MBS session establishment request to the intermediate user plane node, and receive a first user plane MBS session establishment response fed back by the intermediate user plane node, the first user plane MBS session establishment request including a first MBS IP multicast transmission address and a first C-TEID, the first MBS IP multicast transmission address being used for the intermediate user plane node to join a multicast transmission group corresponding to the first MBS IP multicast transmission address to receive MBS data transmitted by the ith level user plane node through multicast.

In an embodiment of this disclosure, if the intermediate user plane node supports receiving the MBS data transmitted by the ith level user plane node through peer to peer rather than through multicast, the first user plane MBS session establishment request sent by the I-SMF to the ith level user plane node includes indication information for requesting to allocate an F-TEID to the intermediate user plane node. In this case, the first user plane MBS session establishment response fed back by the ith level user plane node includes an F-TEID allocated by the intermediate user plane node, and the F-TEID allocated to the intermediate user plane node is used for causing the intermediate user plane node to receive, through peer to peer, the MBS data transmitted by the ith level user plane node.

In an embodiment of this disclosure, if the I-SMF cannot learn whether the intermediate user plane node does not support receiving data transmitted through multicast or if the I-SMF learns that the intermediate user plane node does not support receiving data transmitted through multicast but the I-SMF does not make a decision, the intermediate user plane node may indicate, by using the first user plane MBS session establishment response, that the intermediate user plane node supports receiving the MBS data transmitted by the ith level user plane node through peer to peer rather than through multicast, and the user plane MBS session establishment response includes the F-TEID allocated to the intermediate user plane node.

In an embodiment of this disclosure, in a case that the ith level control plane node selects at least two ith level user plane nodes, the first MBS session start request transmitted by the I-SMF to the intermediate user plane node includes identification information of each of the ith level user plane nodes and a first MBS IP multicast transmission address and a first C-TEID that are allocated by each of the ith level user plane nodes. First MBS IP multicast transmission addresses allocated by different ith level user plane nodes are different.

Still refer to FIG. 12, in step S1240, a second MBS session start request is transmitted to the son control plane node provided by the ith level control plane node, to instruct the son control plane node provided by the ith level control plane node to allocate son user plane nodes to the intermediate user plane node, the second MBS session start request including identification information of the intermediate user plane node and a second MBS IP multicast transmission address and a second C-TEID that are allocated by the intermediate user plane node, the second MBS IP multicast transmission address being used for the son user plane nodes to join a multicast transmission group corresponding to the second MBS IP multicast transmission address to receive MBS data transmitted by the intermediate user plane node through multicast.

In an embodiment of this disclosure, the I-SMF may obtain the second MBS IP multicast transmission address and the second C-TEID that are allocated by the intermediate user plane node from the first user plane MBS session establishment response fed back by the intermediate user plane node. Specifically, the first MBS session start request transmitted by the I-SMF to the intermediate user plane node includes indication information for instructing the intermediate user plane node to allocate new MBS IP multicast distribution information, and the first user plane MBS session establishment response fed back by the intermediate user plane node to the I-SMF includes the second MBS IP multicast transmission address and the second C-TEID that are allocated by the intermediate user plane node.

In an embodiment of this disclosure, after transmitting the second MBS session start request to the son control plane node provided by the ith level control plane node, the I-SMF further needs to receive a second MBS session start response fed back by the son control plane node provided by the ith level control plane node for the second MBS session start request. The second MBS session start response includes first indication information. Content included in the first indication information may have the following cases.

Case 1: In an embodiment of this disclosure, the first indication information includes the identification information of the intermediate user plane node, first F-TEID list information, and first field information used for indicating that multicast transmission is started. The first field information indicates that a son user plane node that supports receiving, through multicast, the MB S data transmitted by the intermediate user plane node exists in the son user plane nodes allocated by the son control plane node provided by the ith level control plane node to the intermediate user plane node, the first F-TEID list information includes F-TEIDs allocated to son user plane nodes that support receiving, through peer to peer rather than through multicast, the MBS data transmitted by the intermediate user plane node, and the F-TEID is used for causing the son user plane node of the intermediate user plane node to receive, through peer to peer, the MBS data transmitted by the intermediate user plane node.

Case 2: In an embodiment of this disclosure, the first indication information includes the identification information of the intermediate user plane node and does not include the first F-TEID list information and the first field information. The first indication information is used for indicating that all the son user plane nodes allocated by the son control plane node provided by the ith level control plane node to the intermediate user plane node support receiving, through multicast, the MBS data transmitted by the intermediate user plane node.

Case 3: In an embodiment of this disclosure, the first indication information includes the identification information of the intermediate user plane node and the first F-TEID list information and does not include the first field information. The first indication information is used for indicating that all the son user plane nodes allocated by the son control plane node provided by the ith level control plane node to the intermediate user plane node support receiving, through peer to peer rather than through multicast, the MBS data transmitted by the intermediate user plane node.

Case 4: In an embodiment of this disclosure, the first indication information includes the identification information of the intermediate user plane node and field information indicating that multicast transmission is stopped and does not include the first F-TEID list information. In this case, the first indication information is used for indicating that the son control plane node provided by the ith level control plane node does not allocate the son user plane nodes to the intermediate user plane node. In some examples, the field information indicating that multicast transmission is stopped may be that a value of Multicast Enable is set to disable.

In an embodiment of this disclosure, in a case that the I-SMF selects at least two intermediate user plane nodes, the second MBS session start response fed by the son control plane node provided by the ith level control plane node to the I-SMF includes a first indication information list, and the first indication information list includes the first indication information respectively corresponding to all the intermediate user plane nodes.

In an embodiment of this disclosure, the second MBS session start response fed back by the son control plane node of the ith level control plane node to the I-SMF may further include a failed identification information list. The failed identification information list is used for indicating a target intermediate user plane node to which son user plane nodes are not allocated.

In an embodiment of this disclosure, if the I-SMF determines, according to the second MBS session start response fed back by the son control plane node of the ith level control plane node, that a target intermediate user plane node to which son user plane nodes are not allocated exists, the I-SMF may transmit a user plane MBS session deletion request to the target intermediate user plane node. The technical solution of this embodiment is that a broken branch in the user plane MBS session transmission tree is deleted.

In an embodiment of this disclosure, after transmitting the user plane MBS session deletion request to the target intermediate user plane node to which the son user plane nodes are not allocated, the I-SMF may further receive a user plane MBS session deletion response fed back by the target intermediate user plane node. The user plane MBS session deletion response is transmitted by the target intermediate user plane node after receiving the user plane MBS session deletion request. If the target intermediate user plane node has joined the multicast transmission group corresponding to the first MBS IP multicast transmission address, the target intermediate user plane node exits the multicast transmission group corresponding to the first MBS IP multicast transmission address after receiving the user plane MBS session deletion request.

In an embodiment of this disclosure, if the ith level control plane node provides at least two son control plane nodes, after receiving second MBS session start responses respectively fed back by all the son control plane nodes provided by the ith level control plane node, the I-SMF needs to determine whether a target intermediate user plane node to which son user plane nodes are not allocated exists, to prevent an error from occurring in the determining of whether the target intermediate user plane node to which the son user plane nodes are not allocated exists according to the received second MBS session start responses fed back by some son control plane nodes.

In an embodiment of this disclosure, after receiving the second MBS session start response fed back by the son control plane node provided by the ith level control plane node for the second MBS session start request, the I-SMF may determine, according to the second MBS session start response, that the intermediate user plane node respectively transmits the MBS data to the son user plane nodes of the intermediate user plane node in which manner.

Specifically, if the first indication information in the second MBS session start response includes the first F-TEID list information, the I-SMF transmits a user plane MBS session modification request to the intermediate user plane node according to the identification information of the intermediate user plane node included in the first indication information, to instruct the intermediate user plane node to respectively transmit, through peer to peer, the MBS data to son user plane nodes corresponding to the F-TEIDs included in the first F-TEID list information. In a case that the first indication information further includes the first field information, the user plane MBS session modification request is further used for instructing the intermediate user plane node to also transmit the MBS data to the son user plane nodes of the intermediate user plane node through multicast transmission. In a case that the first indication information does not include the first field information, the user plane MBS session modification request is further used for instructing the intermediate user plane node to transmit the MBS data to the son user plane nodes of the intermediate user plane node without using multicast transmission.

If the first indication information in the second MBS session start response does not include the first F-TEID list information and the first field information, it indicates that all the son user plane nodes of the intermediate user plane node support multicast transmission. Therefore, the intermediate user plane node may transmit the MBS data to all the son user plane nodes of the intermediate user plane node through multicast transmission.

In an embodiment of this disclosure, in a case that the I-SMF selects at least two intermediate user plane nodes, the I-SMF may transmit, according to first indication information corresponding to each of the intermediate user plane nodes included in the second MBS session start response, the user plane MBS session modification request to an intermediate user plane node to which the user plane MBS session modification request needs to be transmitted. Specifically, if it is determined, according to the second MBS session start response fed back by the son control plane node provided by the ith level control plane node, that some of son user plane nodes of an intermediate user plane node support receiving MBS data transmitted by the intermediate user plane node through peer to peer rather than through multicast, it indicates that the intermediate user plane node is an intermediate user plane node to which a user plane MBS session modification request needs to be transmitted.

In an embodiment of this disclosure, after receiving the second MBS session start response fed back by the son control plane node provided by the ith level control plane node for the second MBS session start request, the I-SMF may further feed back a first MBS session start response for the first MBS session start request to the ith level control plane node according to the second MBS session start response. In a case that the ith level control plane node provides at least two son control plane nodes, the I-SMF, after receiving second MBS session start responses respectively fed back by all the son control plane nodes provided by the ith level control plane node, needs to feed back the first MBS session start response to the ith level control plane node.

Similar to the second MBS session start response fed back by the son control plane node provided by the ith level control plane node, in an embodiment of this disclosure, the first MBS session start response fed back by the I-SMF to the ith level control plane node includes second indication information. Content included in the second indication information may have the following cases.

Case 1: In an embodiment of this disclosure, the second indication information including the identification information of the ith level user plane node, second F-TEID list information, and second field information used for indicating that multicast transmission is started, the second field information indicating that an intermediate user plane node that supports receiving, through multicast, the MBS data transmitted by the ith level user plane node exists, the second F-TEID list information including F-TEIDs of intermediate user plane nodes that support receiving, through peer to peer rather than through multicast, the MBS data transmitted by the ith level user plane node, and the F-TEID allocated to the intermediate user plane node is used for causing the intermediate user plane node to receive, through peer to peer, the MBS data transmitted by the ith level user plane node.

Case 2: In an embodiment of this disclosure, the second indication information includes the identification information of the ith level user plane node and does not include the second F-TEID list information and the second field information. The second indication information is used for indicating that none of the intermediate user plane nodes supports receiving, through multicast, the MBS data transmitted by the ith level user plane node.

Case 3: In an embodiment of this disclosure, the second indication information includes the identification information of the ith level user plane node and the second F-TEID list information and does not include the second field information. The second indication information is used for indicating that all the intermediate user plane nodes support receiving, through peer to peer rather than through multicast, the MBS data transmitted by the ith level user plane node.

In an embodiment of this disclosure, in a case that the ith level control plane node selects at least two ith level user plane nodes, the first MBS session start response fed back by the I-SMF to the ith level control plane node includes a second indication information list, and the second indication information list includes the second indication information respectively corresponding to all the ith level user plane nodes.

In FIG. 12, the communication method for a multicast broadcast service provided in this embodiment of this disclosure is described from the perspective of the I-SMF. The communication method for a multicast broadcast service provided in this embodiment of this disclosure is further described below from the perspective of the ith level control plane node with reference to FIG. 13.

FIG. 13 is a flowchart of a communication method for a multicast broadcast service according to an embodiment of this disclosure. The communication method for a multicast broadcast service may be performed by an ith level control plane node such as the SMF in FIG. 10 or the MB-SMF in FIG. 11. The communication method for a multicast broadcast service includes at least step S1310 to step S1320. Detailed descriptions are as follows.

In step S1310, a second user plane MBS session establishment request is transmitted to an ith level user plane node selected by an ith level control plane node, and a second user plane MBS session establishment response fed back by the ith level user plane node is received, the ith level control plane node being any level control plane node other than a last level control plane node in an MBS session transmission tree, i=1, . . . , N, N being a positive integer.

In an embodiment of this disclosure, the ith level control plane node may select one or more user plane function entities as ith level user plane node(s) from managed user plane function entities according to the information of the son control plane node provided by the ith level control plane node. after selecting the ith level user plane node, the ith level control plane node may perform a user plane MBS session establishment process with the ith level user plane node, i.e., transmits a second user plane MBS session establishment request to an ith level user plane node, receives a second user plane MBS session establishment response fed back by the ith level user plane node, and then obtain a first MBS IP multicast transmission address and a first C-TEID that are allocated by the ith level user plane node from the second user plane MBS session establishment response fed back by the ith level user plane node.

In step S1320, an intermediate session management function (I-SMF) is selected, and a first MBS session start request to the I-SMF is transmitted, the first MBS session start request including information of a son control plane node provided by the ith level control plane node, identification information of the ith level user plane node, and a first MBS IP multicast transmission address and a first C-TEID that are allocated by the ith level user plane node.

In an embodiment of this disclosure, the first MBS session start request being used for triggering the I-SMF to select an intermediate user plane node capable of establishing a connection with a user plane function entity managed by the ith level user plane node and with a user plane function entity managed by the son control plane node provided by the ith level control plane node, and being used for triggering the I-SMF to transmit a second MBS session start request to the son control plane node provided by the ith level control plane node, the intermediate user plane node being configured to join a multicast transmission group corresponding to the first MBS IP multicast transmission address to receive MBS data transmitted by the ith level user plane node through multicast, the second MBS session start request being used for instructing the son control plane node provided by the ith level control plane node to allocate son user plane nodes to the intermediate user plane node, and enable the son user plane nodes to receive MBS data transmitted by the intermediate user plane node.

In an embodiment of this disclosure, if the ith level control plane node provides at least two son user plane nodes, the first MBS session start request transmitted by the ith level control plane node to the I-SMF may include a list of son user plane nodes. The list includes information of all the son user plane nodes provided by the ith level control plane node.

In an embodiment of this disclosure, the selection of the I-SMF by the ith level control plane node is for the following purpose: in a case that the ith level control plane node determines that a user plane function entity managed by the ith level control plane node is incapable of establishing a transmission path with a user plane function entity managed by the son control plane node of the ith level control plane node, the ith level control plane node may select an SMF capable of communicating with the ith level control plane node and the son control plane node of the ith level control plane node as the I-SMF. By this method, when a direct connection for user plane transmission cannot be established between the ith level user plane node and the downstream user plane node (which is generally a base station or a distributed unit (DU) of the base station) during the user plane MBS session establishment process, an I-SMF may be added, and the I-SMF may select an intermediate user plane node to implement the establishment of the user plane MBS session transmission tree, thereby effectively optimizing user plane transmission resources.

In an embodiment of this disclosure, after transmitting the first MBS session start request to the I-SMF, the ith level control plane node may further receive a first MBS session start response fed back by the I-SMF for the first MBS session start request. In this case, the ith level control plane node may determine, according to a content included in the first MBS session start response, whether to transmit a user plane MBS session modification request to the ith level user plane node. Specifically, if it is determined, according to the first MBS session start response fed back by the I-SMF, that some intermediate user plane node(s) support receiving MBS data transmitted by the ith level user plane node through peer to peer rather than through multicast, a user plane MBS session modification request needs to be transmitted to the ith level user plane node.

In FIG. 13, the communication method for a multicast broadcast service provided in this embodiment of this disclosure is described from the perspective of the ith level control plane node. The communication method for a multicast broadcast service provided in this embodiment of this disclosure is further described below from the perspective of the intermediate user plane node with reference to FIG. 14.

FIG. 14 is a flowchart of a communication method for a multicast broadcast service according to an embodiment of this disclosure. The communication method for a multicast broadcast service may be performed by an intermediate user plane node such as the UPF in FIG. 10 or the MB-UPF in FIG. 11. The communication method for a multicast broadcast service includes at least step S1410 to step S1430. Detailed descriptions are as follows.

In step S1410, a first user plane MBS session establishment request transmitted by an I-SMF is received, the first user plane MBS session establishment request including a first MBS IP multicast transmission address and a first C-TEID that are allocated by an ith level user plane node, i=1, . . . , N, N being a positive integer.

In step S1420, a first user plane MBS session establishment response is fed back to the I-SMF, the first user plane MBS session establishment response including a second MBS IP multicast transmission address and a second C-TEID that are allocated by an intermediate user plane node, the second MBS IP multicast transmission address being used for a son user plane node of the intermediate user plane node to join a multicast transmission group corresponding to the second MBS IP multicast transmission address to receive MBS data transmitted by the intermediate user plane node through multicast.

In step S1430, a multicast transmission group corresponding to a first MBS IP multicast transmission address is joined in a case that the intermediate user plane node supports receiving MBS data transmitted by the ith level user plane node through multicast, to receive the MBS data transmitted by the ith level user plane node through multicast.

In an embodiment of this disclosure, if the intermediate user plane node supports receiving, through peer to peer rather than multicast, the MBS data transmitted by the ith level user plane node, the intermediate user plane node may allocate an F-TEID for receiving, through peer to peer, the MBS data transmitted by the ith level user plane node.

In an embodiment of this disclosure, after feeding back the first user plane MBS session establishment response to the I-SMF, the intermediate user plane node may further receive a user plane MBS session modification request transmitted by the I-SMF. The user plane MBS session modification request includes first F-TEID list information. The first F-TEID list information includes F-TEIDs of son user plane nodes that support receiving, through peer to peer rather than multicast, the MBS data transmitted by the intermediate user plane node. Subsequently, the intermediate user plane node may respectively transmit, based on the first F-TEID list information through peer to peer, the MBS data to the son user plane nodes corresponding to the F-TEIDs included in the first F-TEID list information and determine, according to the user plane MB S session modification request, whether to transmit the MBS data to the son user plane node of the intermediate user plane node through multicast transmission simultaneously. For specific details, reference is made to the technical solution of the foregoing embodiments. Details are not described again.

In an embodiment of this disclosure, if the intermediate user plane node receives a user plane MBS session deletion request transmitted by the I-SMF, the second user plane node transmits a user plane MBS session deletion response to the I-SMF. If the intermediate user plane node has joined the multicast transmission group corresponding to the first MBS IP multicast transmission address, the intermediate user plane node exits the multicast transmission group corresponding to the first MBS IP multicast transmission address after receiving the user plane MBS session deletion request. The technical solution of this embodiment is that a broken branch in the user plane MBS session transmission tree is deleted.

In an embodiment of this disclosure, in a case that the intermediate user plane node receives a plurality of user plane MBS session establishment requests, the intermediate user plane node feeds back a user plane MBS session establishment response for a user plane MBS session establishment request among the plurality of user plane MBS session establishment requests, and feeds back a rejection message for other user plane MBS session establishment requests among the plurality of user plane MBS session establishment requests, to indicate that the user plane node has been selected. The plurality of user plane MBS session establishment requests received by the intermediate user plane node at the same time may be transmitted by the same I-SMF (corresponding to the case where different control plane nodes select the same I-SMF), or may be transmitted by different I-SMFs (corresponding to the case where different control plane nodes select different I-SMFs). By the technical solution of this embodiment, a user plane node is allowed to be selected only as a son node of another user plane node, but is noted allowed to be selected as son nodes of multiple user plane nodes.

In an embodiment of this disclosure, after feeding back the first user plane MBS session establishment response to the I-SMF, in a case that the intermediate user plane node receives again a user plane MBS session establishment request for selecting the intermediate user plane node as a son user plane node of another user plane node, the intermediate user plane node feeds back a rejection message for the user plane MBS session establishment request received again, to indicate that the user plane node has been selected. The user plane MBS session establishment request received by the intermediate user plane node again may be transmitted by another I-SMF, or may be transmitted by the I-SMF to which the intermediate user plane node feeds back the first user plane MBS session establishment response, but the user plane MBS session establishment request received again is used for selecting the intermediate user plane node as a son user plane node of another user plane node. By the technical solution of this embodiment, a user plane node is also allowed to be selected only as a son node of another user plane node, but is noted allowed to be selected as son nodes of multiple user plane nodes.

The technical solutions of the embodiments of this disclosure have been described above from the perspectives of the I-SMF, the ith level control plane node, and the intermediate user plane node respectively. The implementation details of the technical solutions of the embodiments of this disclosure will be described in detail below from the perspective of interaction between entities.

In an embodiment of this disclosure, an MBS session transmission tree of 5G needs to ensure that there can be only one father user plane node of each user plane, but because the user plane is controlled by a control plane, there is not only one father control plane node of the control plane. In this case, son control plane nodes may respectively provide one or more different son user plane nodes to different father control plane nodes, that is, even though a same father control plane node corresponds to different father user plane nodes, son user plane node of the father user plane node are independent of each other.

If a plurality of son user plane nodes are allocated to one father control plane node, some son user plane nodes of the plurality of son user plane nodes support receiving data transmitted through multicast, and some other son user plane nodes do not support receiving the data transmitted through multicast but support receiving the MBS data through peer to peer. Therefore, the son user plane nodes that do not support receiving the data transmitted through multicast may allocate IP address+TEID (which is represented by F-TEID), to transmit the MB S data to the son user plane node through peer to peer.

Figure 15:
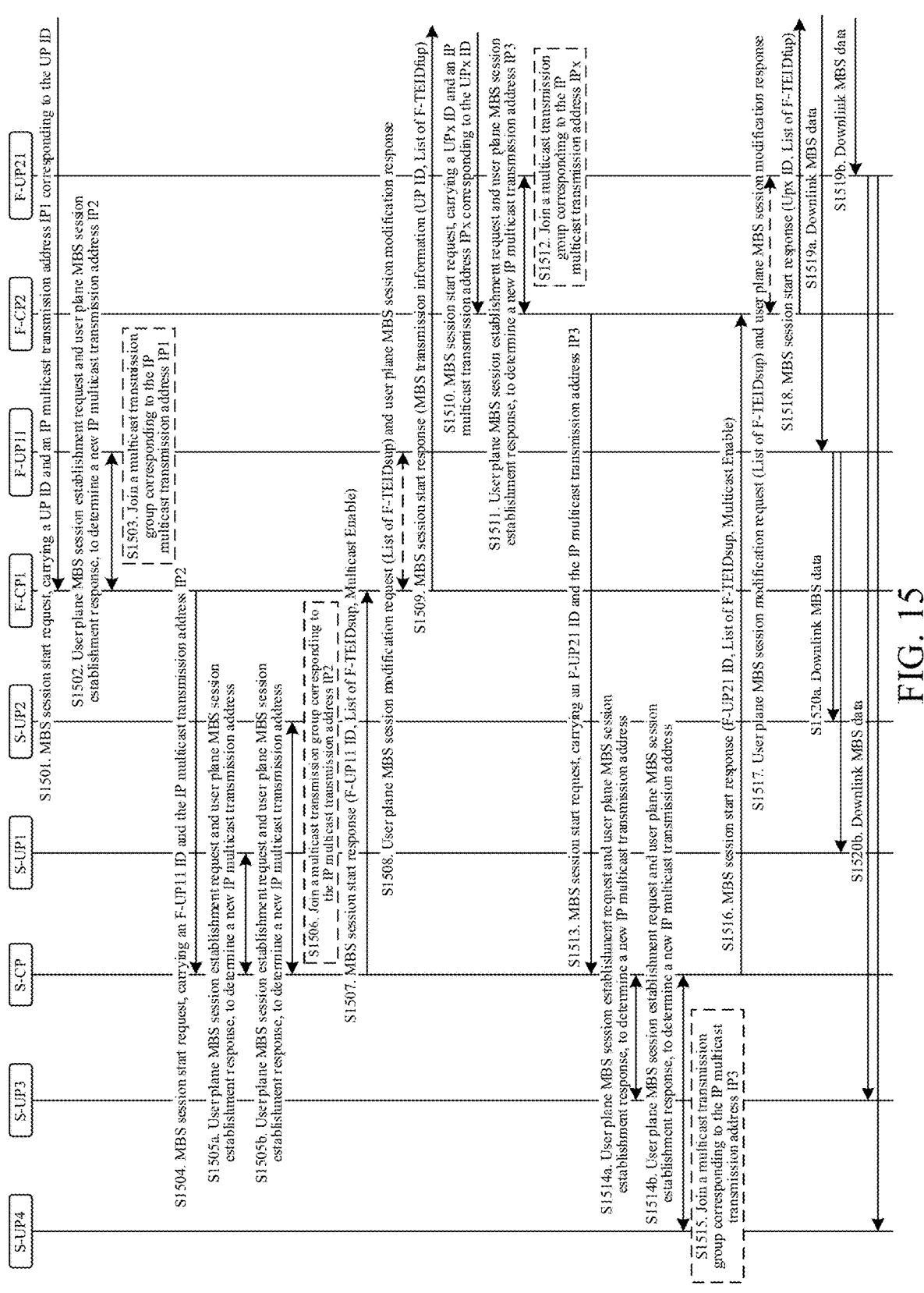
FIG. 15 is a flowchart of an MBS communication method in which a control plane is separated from a user plane according to an embodiment of this disclosure.

Specifically, FIG. 15 shows an MBS communication method in which a control plane is separated from a user plane according to an embodiment of this disclosure. In the following content, F-CP represents a father-control plane, S-CP represents a son-control plane, F-UP represents a father-user plane, and S-UP represents a son-user plane.

Referring to FIG. 15, the method includes the following steps.

In step S1501, an F-CP1 receives an MBS session start request (that is, Nfcp_MBSSessionStart Request) transmitted by a father control plane node of the F-CP1, the MBS session start request including a temporary mobile group identity (TMGI), an MBS session duration, MBS QoS flow identifiers (QFIs), a QoS profile, a UP ID (the UP ID is an identifier of a user plane node having a same level as the father control plane node of the F-CP1), an MBS IP Multicast Distribution (MBS IP multicast distribution information), an MBS time to data transfer, and an MBS service area.

The TMGI represents a multicast or broadcast temporary group identity. The MBS session duration represents a time length of a current MBS session. The MBS time to data transfer represents a time when MBS data starts to be transmitted. The QoS profile includes a 5G QoS identifier (5QI), a maximum flow bit rate (MFBR), a guaranteed flow bit rate (GFBR), an allocation and retention priority (ARP), and the like. The MBS IP Multicast Distribution includes an IP multicast transmission address (the IP multicast transmission address is an IP multicast transmission address and a C-TEID that are allocated by a user plane node (that is, the user plane node identified by the UP ID) having a same level as the father control plane node of the F-CP1, and for ease of distinguishing, the IP multicast transmission address is denoted as IP1) (for simplification, father control plane nodes of the F-CP1 and an F-CP2 are not drawn in FIG. 15, and father user plane nodes of an F-UP11 and an F-UP21 are not drawn similarly). The MBS service area is a service area when the MBS is a broadcast service.

In step S1502, the F-CP1 determines, according to information about a son control plane node of the F-CP1, that one or more F-UPFs are selected from a plurality of F-UPFs as user plane nodes having same levels as the F-CP1. In this embodiment, it is assumed that one user plane node (which is denoted as F-UP11) having a same level as the F-CP1 is selected, the F-CP1 transmits a user plane MBS session establishment request (that is, N4 MBSSessionEstablishment Request) to the F-UP11, and the F-UP11 feeds back a user plane MBS session establishment response (that is, N4 MBSSessionEstablishment Response) to the F-CP1.

In an embodiment of this disclosure, for an MBS multicast service, the information about the son control plane node of the F-CP1 is formed by MBS UE contexts. For an MBS broadcast service, the information about the son control plane node of the F-CP1 is provided by the father control plane node of the F-CP1 or configured by a network according to the service area. The information about the son control plane node of the F-CP1 includes a quantity of son-control plane nodes of the F-CP1 and position information thereof.

In an embodiment of this disclosure, the user plane MBS session establishment request transmitted by the F-CP1 to the selected F-UP11 may include a packet detection rule (PDR), a QoS enforcement rule (QER), a forwarding action rule (FAR), an MBS IP Multicast Distribution, an indication of allocate new MBS IP multicast distribution information for downlink node, and an indication of requesting to allocate an F-TEID. The user plane MBS session establishment response fed back by the F-UP11 includes the allocate MBS IP Multicast Distribution for downlink node and the F-TEID.

The PDR in the user plane MBS session establishment request includes one or more MBS IP multicast addresses+UDP ports to indicate one or more different MBS QoS flows. The QER includes the MFBR and the GFBR that correspond to the PDR and a downlink (DL) flow level marking. The MBS IP Multicast Distribution is an MBS IP Multicast Distribution corresponding to the TMGI and is from the MBS session start request transmitted by the father control plane node of the F-CP1 and received by the F-CP1, and the MBS IP multicast transmission address included in the MBS IP Multicast Distribution is IP1.

The indication of allocate new MBS IP Multicast Distribution for downlink node in the user plane MBS session establishment request is used for indicating that a son user plane node exists in the F-UP11. Therefore, the F-UP11 needs to allocate a new MBS IP Multicast Distribution. The allocate MBS IP Multicast Distribution for downlink node in the user plane MBS session establishment response includes the new MBS IP Multicast Distribution allocated by the F-UP11, and the new MBS IP Multicast Distribution includes a new IP multicast transmission address (for ease of distinguishing, the new IP multicast transmission address is denoted as IP2) and a C-TEID.

The MBS IP Multicast Distribution is allocated by each father user plane node to all son user plane nodes of the each father user plane node. Different father user plane nodes allocate different MBS IP Multicast Distributions.

In addition, according to a network configuration, if the F-UP11 does not support receiving MBS data transmitted through multicast but supports receiving the MBS data through peer to peer, the user plane MBS session establishment request transmitted by the F-CP1 includes the indication of requesting to allocate an F-TEID, for requesting the F-UP11 to allocate an F-TEID for receiving, through peer to peer, MBS data transmitted by a father user plane node of the F-UP11. After the F-UP11 allocates the F-TEID, the user plane MBS session establishment response carries the allocated F-TEID.

If the user plane MBS session establishment request does not include the indication of requesting to allocate an F-TEID, that is, the F-CP1 does not make a decision, but the user plane node F-UP11 does not support receiving data transmitted through multicast, the F-UP11 also needs to allocate an F-TEID, and the user plane MBS session establishment response carries the allocated F-TEID.

In step S1503, an application to join a multicast transmission group corresponding to an IP multicast transmission address IP1 is performed in a case that the F-UP11 supports receiving data transmitted through multicast to receive MBS data transmitted by a father user plane node of the F-UP11.

In step S1504, the F-CP1 transmits the MBS session start request (that is, Nscp_MBSSessionStart Request) to each son control plane node according to the information about the son control plane node of the F-CP1, that is, step S1504 to step S1508 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: TMGI, MBS Session Duration, MBS QFIs, QoS Profile, F-UP11 ID, MBS IP Multicast Distribution, MBS Time to Data Transfer, and MBS Service Area. The MBS IP Multicast Distribution in the MBS session start request transmitted by the F-CP1 is allocated in step S1502, and an IP multicast transmission address included in the MBS IP Multicast Distribution is IP2.

After the S-CP receives the MBS session start request transmitted by the F-CP1, similar to step S1502, the S-CP selects one or more S-UPs of the F-UP11 from a plurality of S-UPs according to information about a son control plane node of the S-CP. In this embodiment, it is assumed that an S-UP1 and an S-UP2 are selected. Then, step S1505a and step S1505b are respectively executed.

In step S1505a, the S-CP transmits a user plane MBS session establishment request to the selected S-UP1, and the S-UP1 feeds back a user plane MBS session establishment response to the S-CP.

In an embodiment of this disclosure, the user plane MBS session establishment request transmitted by the S-CP may also include a PDR, a QER, an FAR, an MBS IP Multicast Distribution, an F-UP11 ID, an indication of allocate new MBS IP Multicast Distribution for downlink node, an indication of requesting to allocate an F-TEID, and the like. The user plane MBS session establishment response fed back by the S-UP1 includes the allocate MBS IP Multicast Distribution for downlink node and the F-TEID.

The MBS IP Multicast Distribution in the user plane MBS session establishment request transmitted by the S-CP is from the MBS session start request received in step S1504, and an IP multicast transmission address included in the MBS IP Multicast Distribution is IP2. The indication of allocate new MBS IP Multicast Distribution for downlink node in the user plane MBS session establishment request transmitted by the S-CP to the S-UP1 is used for instructing the S-UP1 to allocate a new MBS IP Multicast Distribution for transmitting the MBS data to a son user plane node of the S-UP1 through multicast transmission. For a specific allocation process of the S-UP1, reference is made to the description in step S1502. Similarly, if the S-UP1 does not support multicast transmission, an F-TEID may be allocated by the S-UP1.

In step S1505b, the S-CP transmits a user plane MBS session establishment request to the selected S-UP2, and the S-UP2 feeds back a user plane MBS session establishment response to the S-CP. A specific process is similar to step S1505a. Details are not described again.

In step S1506, the S-UP1 and the S-UP2 respectively join a multicast transmission group corresponding to the IP multicast transmission address (that is, the IP2) allocated by the F-UP11 in a case that the S-UP1 and the S-UP2 support receiving the data transmitted through multicast, to receive MBS data transmitted by the F-UP11.

In step S1507, the S-CP transmits an MBS session start response (that is, Nscp_MBSSessionStart Response) to the F-CP1, the MBS session start response including an F-UP11 ID.

If there is an S-UP that does not support receiving the data transmitted through multicast in the S-UP1 and the S-UP2, the MBS session start response transmitted by the S-CP to the F-CP1 includes a list of F-TEID (because the list of F-TEID is for the son user plane node, the list of F-TEID is denoted as a list of F-TEIDsup for ease of distinguishing), which corresponds to the F-UP11. The list of F-TEIDsup includes an F-TEID allocated to the S-UP that supports receiving MBS data in the through peer to peer rather than in the multicast transmission manner in the S-UP1 and the S-UP2. If some S-UPs in the S-UP1 and the S-UP2 support the multicast transmission, it is necessary to include Multicast Enable in the MBS session start response to indicate that F-UP11 needs to use both multicast transmission and peer-to-peer transmission technologies to transmit MBS data to the son user plane node of F-UP11.

Specifically, if the MBS session start response transmitted by the S-CP to the F-CP1 does not include the list of F-TEIDsup, it indicates that all son user plane nodes selected by the S-CP support receiving the data transmitted through multicast. Therefore, the MBS session start response does not need to carry the identifier of Multicast Enable.

Specifically, if the MBS session start response transmitted by the S-CP to the F-CP1 includes the list of F-TEIDsup, but does not include the identifier of Multicast Enable, it indicates that all son user plane nodes selected by the S-CP do not support receiving of data transmitted in the multicast manner, but support receiving of the MBS data transmitted in the through peer to peer.

Specifically, if the MBS session start response transmitted by the S-CP to the F-CP1 does not include the list of F-TEIDsup, and Multicast Enable is set to disable, it indicates that the son control plane node S-CP does not allocate a corresponding son user plane node to the F-UP11 (one possible reason is that son user plane nodes to be selected have been allocated to father user plane nodes, in this case, the son user plane nodes cannot be selected). In this case, the son control plane node S-CP may also return a failure code by using the MBS session start response for an indication.

If only one son user plane node of the sub user plane nodes selected by the S-CP does not support receiving of data transmitted in the multicast manner, the MBS session start response transmitted by the S-CP to the F-CP1 may not include the list of F-TEIDsup, but includes only the F-TEID allocated to the son user plane node.

In step S1508, if the MBS session start response in step S1507 includes an F-UP11 ID and an F-TEID parameter (for example, an F-TEID allocated to an S-UP or a list of F-TEIDsup corresponding to some S-UPs), the F-CP1 transmits a user plane MBS session modification request (that is, N4 MBSSessionModification Request) to the F-UP11, and the F-UP11 feeds back a user plane MBS session modification response to the F-CP1. The user plane MBS session modification request includes the list of F-TEIDsup corresponding to the S-UPs that support receiving of the MBS data in the through peer to peer rather than in the multicast transmission manner, to instruct the F-UP11 to respectively transmit, in the through peer to peer, the MBS service data to the S-UPs that support receiving of the MBS data in the through peer to peer rather than in the multicast transmission manner. If the MBS session start response in step S1507 does not include an indication of Multicast Enable, it indicates that the F-UP11 no longer uses the multicast transmission manner. If the MBS session start response in step S1507 includes the indication of Multicast Enable, it indicates that the F-UP11 uses both the multicast transmission manner and peer-to-peer transmission manner.

If the MBS session start response in step S1507 includes only one F-TEID, and the F-UP11 does not learn a specific quantity of son user plane nodes of the F-UP11, the F-UP11 may transmit MBS data to an S-UP corresponding to the F-TEID only through peer to peer. The F-UP11 may simultaneously transmit the MBS data to other S-UPs by using the multicast transmission address (that is, the IP2) according to the user plane MBS session modification request in step S1508.

If the MBS session start response in step S1507 does not include the F-TEID, and Multicast Enable is not set to disable, it indicates that the F-UP11 continues to use the multicast transmission manner. In this case, step S1508 does not need to be executed.

In step S1509, after step S1504 to step S1508 are performed for each son control plane node, the F-CP1 transmits an MBS session start response (that is, Nfcp_MBSSession-Start Response) to the father control plane node of the F-CP1 according to MBS session start responses fed back by all the son control plane nodes.

Similar to step S1507, the MBS session start response replied by the F-CP1 to the father control plane node of the F-CP1 includes an UP ID (the UP ID is an identifier of a user plane node having a same level as the father control plane node of the F-CP1), and may also include a list of F-TEID (which is denoted as a list of F-TEIDfup for ease of distinguishing). Because the F-CP1 selects only a same-level user plane node F-UP11, if the MBS session start response replied by the F-CP1 to the father control plane node of the F-CP1 includes the list of F-TEIDfup, the list of F-TEIDfup includes only an F-TEID allocated by the F-UP11.

Because the F-CP1 selects only the same-level user plane node F-UP11 in this embodiment, if the MBS session start response replied by the F-CP1 to the father control plane node of the F-CP1 does not include the F-TEID allocated by the F-UP11, in this case, it indicates that the F-UP11 supports receiving the data transmitted through multicast. In this case, the MBS session start response replied by the F-CP1 to the father control plane node of the F-CP1 does not need to include Multicast Enable. If the MBS session start response replied by the F-CP1 to the father control plane node of the F-CP1 includes the F-TEID allocated by the F-UP11, it indicates that the F-UP11 does not support receiving the data transmitted through multicast. In this case, because the F-CP1 has only one same-level user plane node F-UP11, the MBS session start response replied by the F-CP1 to the father control plane node of the F-CP1 does not need to include Multicast Enable.

Step S1501 to step S1509 are a processing process after the MBS session start request transmitted by the father control plane node of the F-C1 is received by the F-CP1. In the processing process, the F-CP1 selects a same-level user plane node F-UP11, and the son control plane node S-CP of the F-CP1 selects two son user plane nodes S-UP1 and S-UP2 that have same levels as the S-CP.

Continuing to refer to FIG. 15, the method further includes the following steps.

In step S1510, an F-CP2 receives an MBS session start request transmitted by a father control plane node of the F-CP2, the MBS session start request including a TMGI, an MBS session duration, MBS QFIs, a QoS profile, a UPx ID, an MBS IP Multicast Distribution, an MBS time to data transfer, and an MBS service area. For specific meanings of the parameters, reference is made to the descriptions in step S1501. For ease of distinguishing, an IP multicast transmission address included in the MBS IP Multicast Distribution in the MBS session start request received by the F-CP2 may be denoted as IPx.

In step S1511, the F-CP2 determines, according to information about a son control plane node of the F-CP2, that one or more F-UPFs are selected from a plurality of F-UPFs as user plane nodes having same levels as the F-CP2. In this embodiment, it is assumed that only one user plane node F-UP21 having a same level as the F-CP2 is selected, then the F-CP2 transmits a user plane MBS session establishment request to the F-UP21, and the F-UP21 feeds back a user plane MBS session establishment response to the F-CP2.

For a detailed description, reference is made to the related content in step S1502. Similar to step S1502, the F-CP2 interacts with the F-UP21 by using the user plane MBS session establishment request and the user plane MBS session establishment response, and the F-UP21 allocates a new IP multicast transmission address (which is denoted as IP3 for ease of distinguishing).

In addition, similarly, if the F-UP21 does not support receiving data transmitted through multicast, the F-UP21 allocates an F-TEID used for receiving MBS data through peer to peer, and carries the allocated F-TEID in the user plane MBS session establishment response.

In step S1512, the F-UP21 applies to join a multicast transmission group corresponding to an IP multicast transmission address IPx in a case that the F-UP21 supports receiving data transmitted through multicast manner, to receive MBS data transmitted by a father user plane node of the F-UP21.

In step S1513, the F-CP2 transmits the MBS session start request to each son control plane node according to the information about the son control plane node of the F-CP2, that is, step S1513 to step S1517 are performed separately for each son control plane node. In this embodiment, a description is made by using an example in which the MBS session start request is transmitted to one son control plane node S-CP.

Similarly, the MBS session start request transmitted by the F-CP2 to the son control plane node S-CP of the F-CP2 also includes an MBS IP Multicast Distribution. The MBS IP Multicast Distribution is allocated in step S1511, and a corresponding user plane node identifier is an F-UP21 ID, and an IP multicast transmission address included in the MBS IP Multicast Distribution is IP3.

There is no sequential relationship between step S1513 and step S1504, which may be steps performed in parallel by the F-CP2 and the F-CP1.

After the S-CP receives the MBS session start request transmitted by the F-CP2, similar to the foregoing step, the S-CP selects one or more S-UPs for the F-UP21 from a plurality of S-UPs according to information about a son control plane node of the S-CP. In this embodiment, it is assumed that an S-UP3 and an S-UP4 are selected, and then step S1514a and step S1514b are performed respectively.

The S-UPs selected by the S-CP for the F-UP21 are different from the S-UPs selected by the S-CP for the F-UP11. In other words, in this embodiment of this disclosure, there may be a plurality of father control plane nodes for one son control plane node in a control plane. For example, a son control plane node S-CP has two father control plane nodes F-CP1 and F-CP2, but one son user plane node is not allowed to have a plurality of father user plane nodes. In this way, when one son user plane node already has one father user plane node, the son user plane node cannot participate in selection of a son user plane node. Therefore, the S-CP can select only the S-UP3 and the S-UP4 for the F-UP21, and the S-UP1 and the S-UP2 have been selected as son user plane nodes of the F-UP11. Therefore, the S-CP cannot select the S-UP1 and the S-UP2 as son user plane nodes of the F-UP21.

In step S1514a, the S-CP transmits a user plane MBS session establishment request to the selected S-UP3, and the S-UP3 feeds back a user plane MBS session establishment response to the S-CP. In step S1514b, the S-CP transmits a user plane MBS session establishment request to the selected S-UP4, and the S-UP4 feeds back a user plane MBS session establishment response to the S-CP. A specific process is similar to step S1505a. Details are not described again.

In step S1515, the S-UP3 and the S-UP4 respectively join a multicast transmission group corresponding to the IP multicast transmission address (that is, the IP3) allocated by the F-UP21 in a case that the S-UP3 and the S-UP4 support receiving the data transmitted through multicast, to receive MB S data transmitted by the F-UP21.

In step S1516, the S-CP transmits an MBS session start response to the F-CP2, the MBS Session start response including an F-UP21 ID. A detailed description of the step is similar to step S1507, and details are not described herein again.

In step S1517, the F-CP2 transmits a user plane MBS session modification request to the F-UP21, and the F-UP21 feeds back a user plane MBS session modification response to the F-CP2. A detailed description of the step is similar to step S1508, and details are not described herein again.

In step S1518, after step S1513 to step S1517 are performed for each son control plane node, the F-CP2 transmits an MBS session start response to the father control plane node of the F-CP2 according to MBS session start responses fed back by all the son control plane nodes. A detailed description of the step is similar to step S1509, and details are not described herein again.

Step S1510 to step S1518 are a processing process after the MBS session start request transmitted by the father control plane node of the F-CP2 is received by the F-CP2. In the processing process, the F-CP2 selects a same-level user plane node F-UP21, and the son control plane node S-CP of the F-CP2 selects two son user plane nodes S-UP3 and S-UP4 that have same levels as the S-CP.

It can be learned from step S1501 to step S1518 that in the embodiments of this disclosure, the son control plane node S-CP has a plurality of father control plane nodes F-CP1 and F-CP2, and the son user plane node S-UP controlled by the S-CP has only one father user plane node.

In addition, the message in step S1501 and the message in step S1510 may be transmitted in parallel, and therefore, steps S1501 to S1509 and steps S1510 to S1518 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

In step S1519a, the F-UP11 receives downlink MBS data transmitted by the father user plane node of the F-UP11. Subsequently, the received downlink MBS data is transmitted to the S-UP1 and the S-UP2 in step S1520a.

For each user plane node having a father user plane node, MBS data needs to be received in a multicast transmission manner or a peer-to-peer transmission manner determined in the foregoing steps. For example, for the S-UP1 and the S-UP2, if it is determined that only the multicast transmission manner is adopted, the S-UP1 and the S-UP2 receive, in the multicast transmission manner, the MBS data transmitted by the F-UP11. If it is determined that only the peer-to-peer transmission manner is adopted, the S-UP1 and the S-UP2 respectively receive, in the peer-to-peer transmission manner, the MBS data transmitted by the F-UP11.

mitted by the F-UP11. If it is determined that only the peer-to-peer transmission manner is adopted, the S-UP1 and the S-UP2 respectively receive, in the peer-to-peer transmission manner, the MBS data transmitted by the F-UP11.

For each user plane node having son user plane nodes, MBS data needs to be transmitted to each son user plane node in a multicast transmission manner or a peer-to-peer transmission manner in the foregoing steps. For example, for the F-UP11, if it is determined that only the multicast transmission manner is adopted, the F-UP11 transmits the MBS data to all son user plane nodes (that is, the S-UP1 and the S-UP2 in this embodiment) of the F-UP11 in the multicast transmission manner. If it is determined that only the peer-to-peer transmission manner is adopted, the F-UP11 transmits the MBS data to each son user plane node (that is, the S-UP1 and the S-UP2 in this embodiment) of the F-UP11 in the peer-to-peer transmission manner.

In step S1519b, the F-UP21 receives downlink MBS data transmitted by the father user plane node of the F-UP21. Subsequently, the received downlink MBS data is transmitted to the S-UP3 and the S-UP4 in step S1520b. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In the embodiment shown in FIG. 15, the MBS session start request transmitted by the father control plane node to the son control plane node includes information about only one father user plane node. In another embodiment of this disclosure, that the MBS session start request transmitted by the father control plane node to the son control plane node may include information about a plurality of father user plane nodes is described with reference to FIG. 16.

Figure 16:
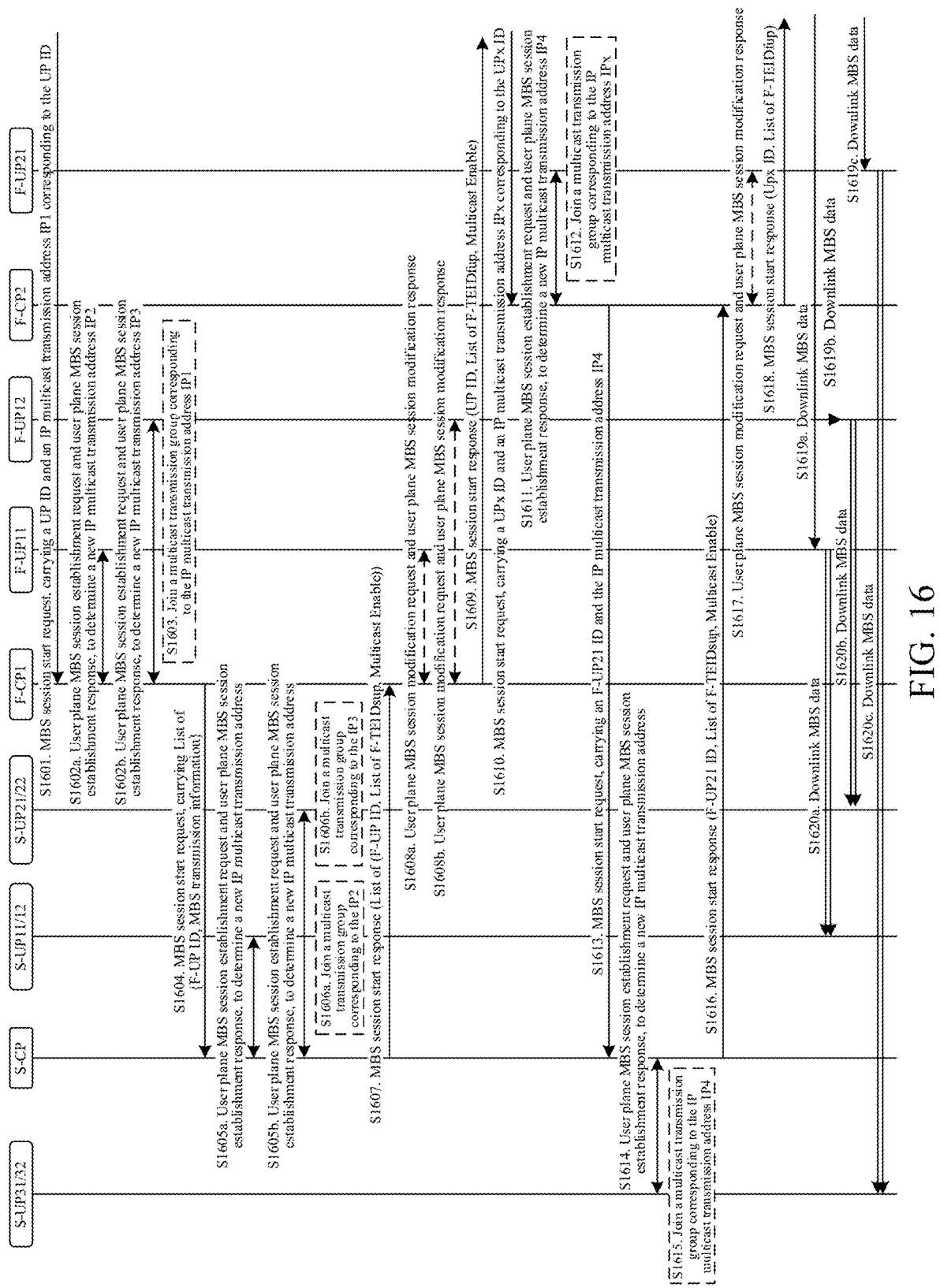
FIG. 16 is a flowchart of an MBS communication method in which a control plane is separated from a user plane according to an embodiment of this disclosure.

Specifically, FIG. 16 shows an MBS communication method in which a control plane is separated from a user plane according to an embodiment of this disclosure. Similarly, in the following content, F-CP represents a father-control plane, S-CP represents a son-control plane, F-UP represents a father-user plane, and S-UP represents a son-user plane.

Referring to FIG. 16, the method includes the following steps.

In step S1601, an F-CP1 receives an MBS session start request transmitted by a father control plane node of the F-CP1. A specific process is similar to step S1501. Details are not described again. An IP multicast transmission address included in an MBS IP Multicast Distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S1602a and step S1602b are respectively executed.

In step S1602a, the F-CP1 transmits a user plane MBS session establishment request to an F-UP11, and the F-UP11 feeds back a user plane MBS session establishment response to the F-CP1. The process is similar to the process of step S1502 in the foregoing embodiment, and details are not described again. An IP multicast transmission address allocated by the F-UP11 in step S1602a is denoted as IP2.

In step S1602b, the F-CP1 transmits a user plane MBS session establishment request to an F-UP12, and the F-UP12 feeds back a user plane MBS session establishment response to the F-CP1. The process is similar to the process of step S1502 in the foregoing embodiment, and details are not described again. An IP multicast transmission address allocated by the F-UP12 in step S1602b is denoted as IP3.

In step S1603, the F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

In step S1604, the F-CP1 transmits the MBS session start request to each son control plane node according to the information about the son control plane node of the F-CP1, that is, step S1604 to step S1608 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, because the F-CP1 selects two user plane nodes F-UP11 and F-UP12 that have same levels as the F-CP1, the List of {F-UP ID, MBS transmission information} includes an F-UP11 ID, an MBS IP Multicast Distribution corresponding to the F-UP11 ID, an F-UP12 ID, and an MBS IP Multicast Distribution corresponding to the F-UP12 ID. The MBS IP Multicast Distribution corresponding to the F-UP11 ID is allocated by the F-UP11, and the IP multicast transmission address included in the MBS IP Multicast Distribution is IP2. The MBS IP Multicast Distribution corresponding to the F-UP12 ID is allocated by the F-UP12, and the IP multicast transmission address included in the MBS IP Multicast Distribution is IP3.

The IP multicast transmission address IP3 allocated by the F-UP12 cannot be the same as the IP multicast transmission address IP2 allocated by the F-UP11, but the allocated C-TEIDs may be the same.

After receiving the MBS session start request transmitted by the F-CP1, similar to step S1502, the S-CP selects one or more S-UPs for the F-UP11 from a plurality of S-UPs according to information about a son control plane node of the S-CP, and selects one or more S-UPs for the F-UP12. In this embodiment, it is assumed that an S-UP11 and an S-UP 12 are selected for the F-UP11, and an S-UP21 and an S-UP22 are selected for the F-UP12, that is, different son user plane nodes are selected for the F-UP11 and the F-UP12. Then, step S1605a and step S1605b are respectively executed.

In step S1605a, the S-CP respectively transmits user plane MBS session establishment requests to the selected S-UP11 and S-UP12, the user plane MBS session establishment request including the IP multicast transmission address IP2 allocated by the F-UP11, and the S-UP11 and the S-UP12 respectively feed back user plane MBS session establishment responses to the S-CP (for saving layout, the S-UP11 and the S-UP12 are drawn together in FIG. 16). A specific process is similar to step S1505a. Details are not described again.

In step S1605b, the S-CP respectively transmits user plane MBS session establishment requests to the selected S-UP21 and S-UP22, the user plane MBS session establishment request including the IP multicast transmission address IP3 allocated by the F-UP12, and the S-UP21 and the S-UP22 respectively feed back user plane MBS session establishment responses to the S-CP (for saving layout, the S-UP21 and the S-UP22 are drawn together in FIG. 16). A specific process is similar to step S1505a. Details are not described again.

In step S1606a, the S-UP11 and the S-UP12 respectively join a multicast transmission group corresponding to the IP multicast transmission address (that is, the IP2) allocated by the F-UP11 in a case that the S-UP11 and the S-UP12 support receiving the data transmitted through multicast, to receive MBS data transmitted by the F-UP11.

In step S1606b, the S-UP21 and the S-UP22 respectively join a multicast transmission group corresponding to the IP multicast transmission address (that is, the IP3) allocated by the F-UP12 in a case that the S-UP21 and the S-UP22 support receiving the data transmitted through multicast, to receive MBS data transmitted by the F-UP12.

In step S1607, the S-CP transmits an MBS session start response to the F-CP1. If an S-UP does not support receiving the data transmitted through multicast, the MBS session start response includes an F-TEID allocated by the S-UP, and the F-TEID corresponds to the F-UP, to form a List of {F-UP ID, List of F-TEIDsup, Multicast Enable}. In this embodiment, the List of {F-UP ID, list of F-TEIDsup, Multicast Enable} includes the list of F-TEIDsup and the Multicast Enable for the F-UP11 and the list of F-TEIDsup and the Multicast Enable for the F-UP12.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP determines not to allocate any son user plane node to an/some F-UP IDs, Multicast Enable corresponding to this/these F-UP IDs may be set to Disable. Certainly, a failed list {F-UP} may alternatively be used in the MBS session start response to indicate a father user plane node to which a son user plane node is not allocated.

In step S1608a, the F-CP1 transmits a user plane MBS session modification request to the F-UP11 according to the List of {F-UP ID, list of F-TEIDsup, Multicast Enable} included in the MBS session start response, and the F-UP11 feeds back a user plane MBS session modification response to the F-CP1. A detailed description of the step is similar to step S1508, and details are not described herein again.

In step S1608b, the F-CP1 transmits a user plane MBS session modification request to the F-UP12 according to the List of {F-UP ID, list of F-TEIDsup, Multicast Enable} included in the MBS session start response, and the F-UP12 feeds back a user plane MBS session modification response to the F-CP1. A detailed description of the step is similar to step S1508, and details are not described herein again.

In step S1609, after step S1604 to step S1608 are performed for each son control plane node, the F-CP1 transmits an MBS session start response to the father control plane node of the F-CP1 according to MBS session start responses fed back by all the son control plane nodes.

Because the F-CP1 selects two user plane nodes F-UP11 and F-UP12 that have same levels as the F-CP1, if F-UPs that do not support receiving the data transmitted through multicast exists in the F-UP11 and the F-UP12, the MBS session start response replied by the F-CP1 to the father control plane node of the F-CP1 includes a list of F-TEID (because the list of F-TEID is for the father user plane node, the list of F-TEID is denoted as a list of F-TEIDfup for ease of distinguishing), and the list of F-TEIDfup corresponds to UP IDs of the father user plane nodes of the F-UP11 and the F-UP12. The list of F-TEIDfup includes F-TEIDs allocated by the F-UPs that support receiving MBS data through peer to peer rather than through multicast transmission in the F-UP11 and the F-UP12. If some F-UPs in the F-UP11 and the F-UP12 support receiving the data transmitted through multicast, the MBS session start response needs to include Multicast Enable to indicate that the father user plane nodes of the F-UP11 and the F-UP12 transmit the MBS data to the F-UP11 and the F-UP12 by using multicast transmission and peer-to-peer transmission technologies.

Specifically, if the MBS session start response replied by the F-CP1 to the father control plane node of the F-CP1 does not include the list of F-TEIDsup, it indicates that all user plane nodes that have same levels as the F-CP1 and are selected by the F-CP1 support receiving the data transmitted through multicast. Therefore, the MBS session start response does not need to carry an identifier of Multicast Enable.

Specifically, if the MBS session start response replied by the F-CP1 to the father control plane node of the F-CP1 includes the list of F-TEIDsup, but does not include the identifier of Multicast Enable, it indicates that all the user plane nodes that have the same levels as the F-CP1 and are selected by the F-CP1 do not support receiving the data transmitted through multicast, but support receiving the MBS data transmitted through peer to peer.

Specifically, if the MBS session start response replied by the F-CP1 to the father control plane node of the F-CP1 does not include the list of F-TEIDfup, and Multicast Enable is set to disable, it indicates that the F-CP1 does not select user plane nodes that have same levels as the F-CP1. In this case, the F-CP1 may also return a failure code by using the MBS session start response for an indication.

If only one user plane node of the user plane nodes that have the same levels as the F-CP1 and are selected by the F-CP1 does not support receiving the data transmitted through multicast, the MBS session start response may alternatively not include the list of F-TEIDfup, but include only an F-TEID allocated by the user plane node that supports receiving the MBS data through peer to peer rather than through multicast transmission.

Step S1601 to step S1609 are a processing process after the MBS session start request transmitted by the father control plane node of the F-CP1 is received by the F-CP1. In the processing process, the F-CP1 selects two user plane nodes F-UP11 and F-UP12 that have the same levels as the F-CP1, and a son control plane node S-CP of the F-CP1 selects two son user plane nodes S-UP11 and S-UP12 that have the same levels as the S-CP for the F-UP11, and selects two son user plane nodes S-UP21 and S-UP22 that have the same levels as the S-CP for the F-UP12.

Continuing to refer to FIG. 16, the method further includes the following steps.

In step S1610, an F-CP2 receives an MBS session start request transmitted by a father control plane node of the F-CP2, the MBS session start request including a TMGI, an MBS session duration, MBS QFIs, a QoS profile, a UPx ID, an MBS IP Multicast Distribution, an MBS time to data transfer, and an MBS service area. For specific meanings of the parameters, reference is made to the descriptions in step S1501. For ease of distinguishing, an IP multicast transmission address included in the MBS IP Multicast Distribution in the MBS session start request received by the F-CP2 may be denoted as IPx.

In step S1611, the F-CP2 determines, according to information about a son control plane node of the F-CP2, that one or more F-UPFs are selected from a plurality of F-UPFs as user plane nodes having same levels as the F-CP2. In this embodiment, it is assumed that only one user plane node F-UP21 having a same level as the F-CP2 is selected, then the F-CP2 transmits a user plane MBS session establishment request to the F-UP21, and the F-UP21 feeds back a user plane MBS session establishment response to the F-CP2.

For a detailed description, reference is made to the related content in step S1502. Similar to step S1502, the F-CP2 interacts with the F-UP21 by using the user plane MBS session establishment request and the user plane MBS session establishment response, and the F-UP21 allocates a new IP multicast transmission address (which is denoted as IP4 for ease of distinguishing).

In addition, similarly, if the F-UP21 does not support receiving data transmitted through multicast, the F-UP21 allocates an F-TEID for receiving the MBS data through peer to peer, and carries the allocated F-TEID in the user plane MBS session establishment response.

In step S1612, the F-UP21 applies to join a multicast transmission group corresponding to an IP multicast transmission address IPx in a case that the F-UP21 supports receiving data transmitted through multicast manner, to receive MBS data transmitted by a father user plane node of the F-UP21.

In step S1613, the F-CP2 transmits the MBS session start request to each son control plane node according to the information about the son control plane node of the F-CP2, that is, step S1613 to step S1617 are performed separately for each son control plane node. In this embodiment, a description is made by using an example in which the MBS session start request is transmitted to one son control plane node S-CP.

Similarly, the MBS session start request transmitted by the F-CP2 to the son control plane node S-CP of the F-CP2 also includes an MBS IP Multicast Distribution. The MBS IP Multicast Distribution is allocated in step S1611, and a corresponding user plane node identifier is an F-UP21 ID, and an IP multicast transmission address included in the MBS IP Multicast Distribution is IP4.

There is no sequential relationship between step S1613 and step S1604, which may be steps performed in parallel by the F-CP2 and the F-CP1.

After the S-CP receives the MBS session start request transmitted by the F-CP2, similar to the foregoing step, the S-CP selects one or more S-Ups for the F-UP21 from a plurality of S-UPs according to information about a son control plane node of the S-CP. In this embodiment, it is assumed that an S-UP31 and an S-UP32 are selected, and then step S1614 is performed.

The S-UPs selected by the S-CP for the F-UP21 are different from the S-UPs selected by the S-CP for the F-UP11 and the F-UP12. In other words, in this embodiment of this disclosure, there may be a plurality of father control plane nodes for one son control plane node in a control plane. For example, a son control plane node S-CP has two father control plane nodes F-CP1 and F-CP2, but one son user plane node is not allowed to have a plurality of father user plane nodes. In this way, when one son user plane node already has one father user plane node, the son user plane node cannot participate in selection of a son user plane node.

In step S1614, the S-CP respectively transmits user plane MBS session establishment requests to the selected S-UP31 and S-UP32, and the S-UP31 and the S-UP32 respectively feed back user plane MBS session establishment responses to the S-CP. A specific process is similar to step S1505a. Details are not described again.

In step S1615, the S-UP31 and the S-UP32 respectively join a multicast transmission group corresponding to the IP multicast transmission address (that is, the IP4) allocated by the F-UP21 in a case that the S-UP31 and the S-UP32 support receiving the data transmitted through multicast, to receive MBS data transmitted by the F-UP21.

In step S1616, the S-CP transmits an MBS session start response to the F-CP2, the MBS Session start response including an F-UP21 ID. A detailed description of the step is similar to step S1507, and details are not described herein again.

In step S1617, the F-CP2 transmits a user plane MBS session modification request to the F-UP21, and the F-UP21 feeds back a user plane MBS session modification response to the F-CP2. A detailed description of the step is similar to step S1508, and details are not described herein again.

In step S1618, after step S1613 to step S1617 are performed for each son control plane node, the F-CP2 transmits an MBS session start response to the father control plane node of the F-CP2 according to MBS session start responses fed back by all the son control plane nodes. A detailed description of the step is similar to step S1509, and details are not described herein again.

Step S1610 to step S1618 are a processing process after the MBS session start request transmitted by the father control plane node of the F-CP2 is received by the F-CP2. In the processing process, the F-CP2 selects a user plane node F-UP21 having a same level as the F-CP2, and the son control plane node S-CP of the F-CP2 selects two son user plane nodes S-UP31 and S-UP32 that have same levels as the S-CP.

It can be learned from step S1601 to step S1618 that in the embodiments of this disclosure, the son control plane node S-CP has a plurality of father control plane nodes F-CP1 and F-CP2, and the son user plane node S-UP controlled by the S-CP has only one father user plane node.

In addition, the message in step S1601 and the message in step S1610 may be transmitted in parallel, and therefore, steps S1601 to S1609 and steps S1610 to S1618 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

In step S1619a, the F-UP11 receives downlink MBS data transmitted by the father user plane node of the F-UP11. Subsequently, the received downlink MBS data is transmitted to the S-UP11 and the S-UP12 in step S1620a. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In step S1619b, the F-UP12 receives downlink MBS data transmitted by the father user plane node of the F-UP12. Subsequently, the received downlink MBS data is transmitted to the S-UP21 and the S-UP22 in step S1620b. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In step S1619c, the F-UP21 receives downlink MB S data transmitted by the father user plane node of the F-UP21. Subsequently, the received downlink MBS data is transmitted to the S-UP31 and the S-UP32 in step S1620c. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

Figure 17:
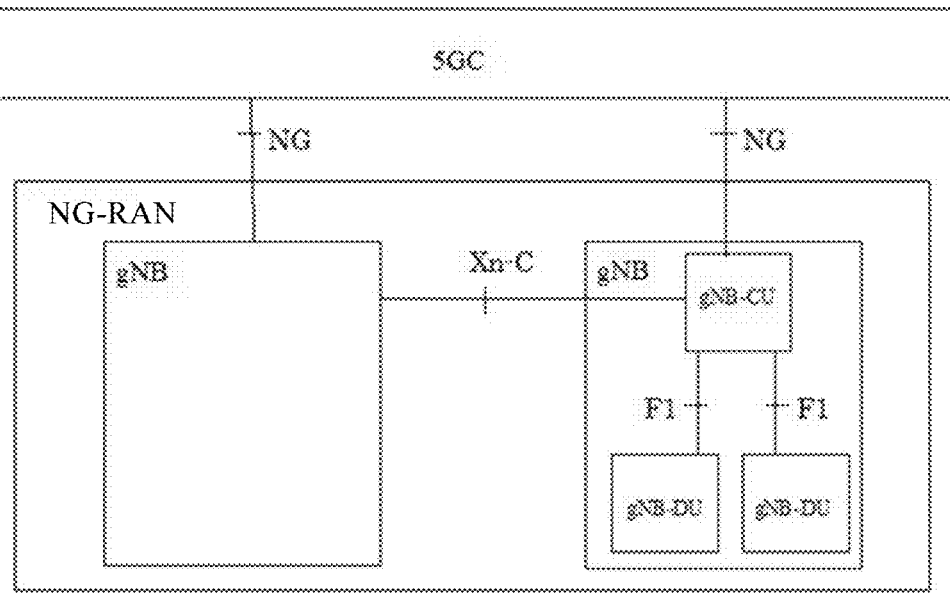
FIG. 17 is a schematic diagram of a connection relationship between a gNB and a 5GC in an NG-RAN.

In the embodiment shown in FIG. 16, the MBS session start request transmitted by the father control plane node to the son control plane node includes information about a plurality of father user plane nodes. In some examples, in a 5G system, a control plane and a user plane are separated in a new radio (NR) base station (gNB), that is, a gNB-centralized unit (CU) may be used as a son control plane node, and a gNB-distributed unit (DU) may be used as a son user plane node. In addition, a control plane of one gNB may control user planes of one or more gNBs. Specifically, as shown in FIG. 17, a gNB in a next-generation radio access network (NG-RAN) is connected to a 5G core network (5GC) through an NG interface. A control plane and a user plane may be separated in the gNB in the NG-RAN. An interface between a base station control plane (that is, a gNB-CU) and a base station user plane (that is, a gNB-DU) may be an F1 interface, and an interface between gNBs may be an Xn-C interface.

Figure 18:
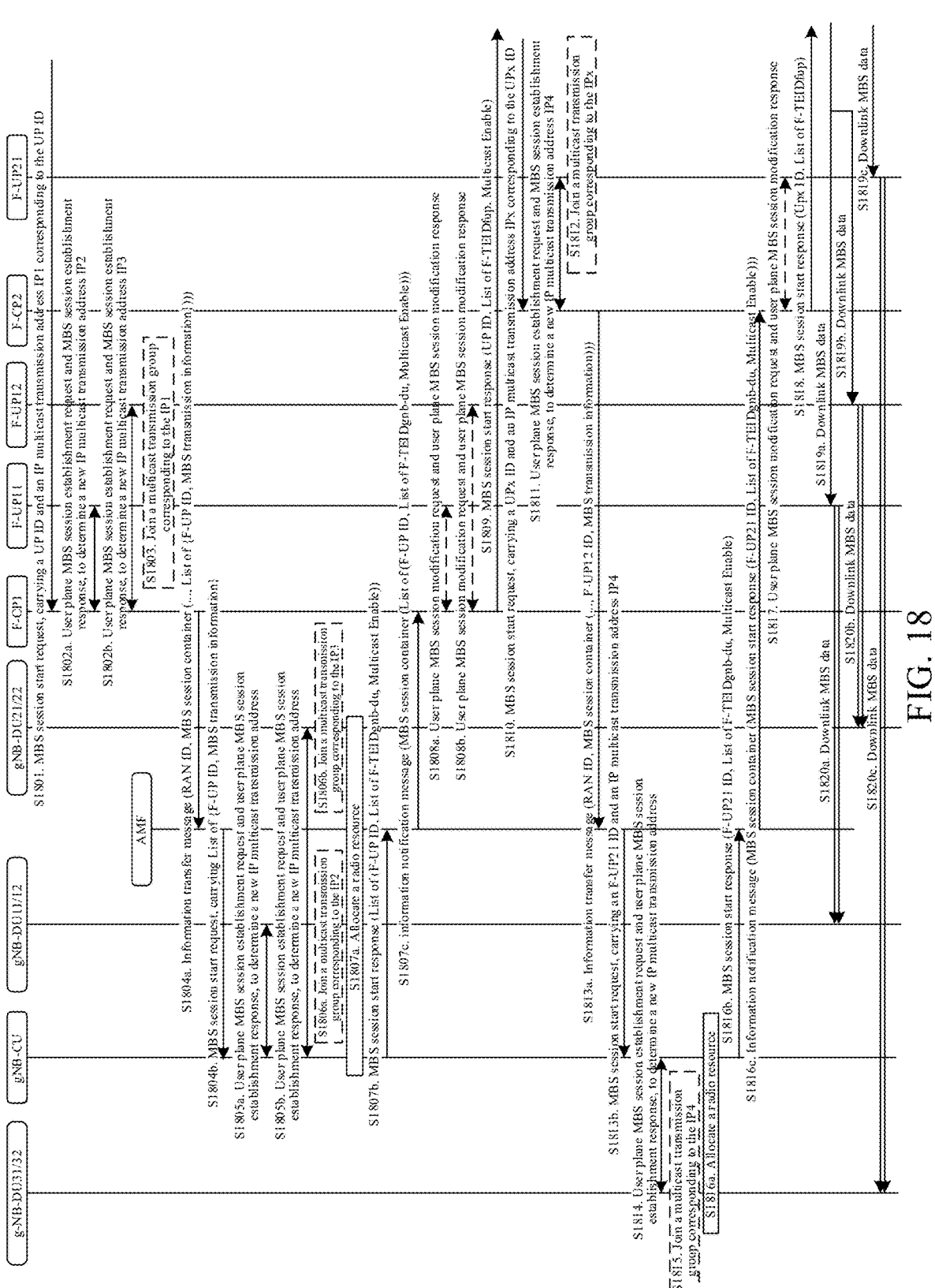
FIG. 18 is a flowchart of an MBS communication method in which a control plane is separated from a user plane according to an embodiment of this disclosure.

In an embodiment of this disclosure, after the gNB-CU and the gNB-DU are applied to the embodiment shown in FIG. 16, the embodiment shown in FIG. 18 may be obtained. Because a network node SMF or MB-SMF cannot directly communicate with an NR gNB, the AMF is introduced for interaction.

Referring to FIG. 18, the method may include the following steps.

In step S1801, an F-CP1 receives an MBS session start request transmitted by a father control plane node of the F-CP1. A specific process is similar to step S1501. Details are not described again. An IP multicast transmission address included in an MBS IP Multicast Distribution in the MBS session start request is denoted as IP1.

After receiving the MBS session start request transmitted by the father control plane node of the F-CP1, the F-CP1 may determine, according to information (for example, a position and a quantity) about a gNB corresponding to the F-CP1), that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S1802*a* and step S1802*b* are respectively executed.

In step S1802*a*, the F-CP1 transmits a user plane MBS session establishment request to an F-UP11, and the F-UP11 feeds back a user plane MBS session establishment response to the F-CP1. The process is similar to the process of step S1502 in the foregoing embodiment, and details are not described again. An IP multicast transmission address allocated by the F-UP11 in step S1802*a* is denoted as IP2.

In step S1802*b*, the F-CP1 transmits a user plane MBS session establishment request to an F-UP12, and the F-UP12 feeds back a user plane MBS session establishment response to the F-CP1. The process is similar to the process of step S1502 in the foregoing embodiment, and details are not described again. An IP multicast transmission address allocated by the F-UP12 in step S1802*b* is denoted as IP3.

In step S1803, the F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

In step S1804*a*, the F-CP1 transmits an information transfer message (that is, Namf_Communication_NonUeN2MessageTransfer) to an AMF.

The information transfer message transmitted by the F-CP1 to the AMF includes the following parameters: RAN ID and N2 MBS session container. The N2 MBS session container includes (an N2 MBS session start request (TMGI, MBS QFIs, QoS profile, List of {F-UP ID, MBS transmission information})). The MBS transmission information is an MBS IP Multicast Distribution (which include an IP multicast transmission address and a C-TEID). In this embodiment, because the F-CP1 selects two user plane nodes F-UP11 and F-UP12 that have same levels as the F-CP1, the List of {F-UP ID, MBS transmission information} includes an F-UP11 ID, an MBS IP Multicast Distribution corresponding to the F-UP11 ID, an F-UP12 ID, and an MBS IP Multicast Distribution corresponding to the F-UP12 ID. The MBS IP Multicast Distribution corresponding to the F-UP11 ID is allocated by the F-UP11, and the IP multicast transmission address included in the MBS IP Multicast Distribution is IP2. The MBS IP Multicast Distribution corresponding to the F-UP12 ID is allocated by the F-UP12, and the IP multicast transmission address included in the MBS IP Multicast Distribution is IP3.

The IP multicast transmission address IP3 allocated by the F-UP12 cannot be the same as the IP multicast transmission address IP2 allocated by the F-UP11, but the allocated C-TEIDs may be the same.

The MBS session container included in the information transfer message transmitted by the F-CP1 to the AMF indicates that the AMF transmits related content of the N2 MBS session start request (TMGI, MBS QFIs, QoS profile, List of {F-UP ID, MBS transmission information} to a gNB identified by the RAN ID. When a plurality of RAN IDs are recorded in an MBS session context in the F-CP1, subsequent step S1804*b* to step S1808*b* are performed for a gNB identified by each RAN ID.

In step S1804*b*, the AMF transmits an MBS session start request to a corresponding gNB-CU according to a RAN ID included in the information transfer message in step S1804*a*, the MBS session start request including the parameters in step S1804*a*, that is, including the TMGI, the MBS QFIs, the QoS profile, and the List of {F-UP MBS transmission information}.

After the gNB-CU receives the MBS session start request transmitted by the AMF, the gNB-CU respectively selects one or more gNB-DUs for the F-UP11 and the F-UP12 from a plurality of gNB-DUs according to a quantity and positions of registered MBS multicast service UEs (for an MBS multicast service) or an MBS broadcast service area (for an MBS broadcast service). In this embodiment, it is assumed that a gNB-DU11 and a gNB-DU12 are selected for the F-UP11, and a gNB-DU21 and a gNB-DU22 are selected for the F-UP12, that is, different gNB-DUs are selected for the F-UP11 and the F-UP12. Then, step S1805*a* and step S1805*b* are respectively executed.

In step S1805*a*, the gNB-CU respectively transmits user plane MBS session establishment requests (that is, F1 MBS Session Establishment Request) to the selected gNB-DU11 and gNB-DU12, the user plane MBS session establishment request including the IP multicast transmission address IP2 allocated by the F-UP11, and the gNB-DU11 and the gNB-DU12 respectively feed back user plane MBS session establishment responses to the gNB-CU (for saving layout, the gNB-DU11 and the gNB-DU12 are drawn together in FIG. 18). A specific process is similar to the interaction process between the S-CP and the S-UP in step S1505*a*, and details are not described herein again.

In step S1805*b*, the gNB-CU respectively transmits user plane MBS session establishment requests (that is, F1 MBS Session Establishment Request) to the selected gNB-DU21 and gNB-DU22, the user plane MBS session establishment request including the IP multicast transmission address IP3 allocated by the F-UP12, and the gNB-DU21 and the gNB-DU22 respectively feed back user plane MBS session establishment responses to the gNB-CU (for saving layout, the gNB-DU21 and the gNB-DU22 are drawn together in FIG. 18). A specific process is similar to the interaction process between the S-CP and the S-UP in step S1505*a*, and details are not described herein again.

In step S1806*a*, the gNB-DU11 and the gNB-DU12 respectively join a multicast transmission group corresponding to the IP multicast transmission address (that is, the IP2) allocated by the F-UP11 in a case that the gNB-DU11 and the gNB-DU12 support receiving the data transmitted through multicast, to receive MBS data transmitted by the F-UP11.

In step S1806*b*, the gNB-DU21 and the gNB-DU22 respectively join a multicast transmission group corresponding to the IP multicast transmission address (that is, the IP3) allocated by the F-UP12 in a case that the gNB-DU21 and the gNB-DU22 support receiving the data transmitted through multicast, to receive MBS data transmitted by the F-UP12.

Similar to the foregoing embodiments, if the gNB-DU does not support receiving the data transmitted through multicast, but supports receiving MBS data through peer to peer according to a network configuration, a corresponding F-TEID needs to be allocated. The F-TEID is allocated by the gNB-CU, or is allocated by the gNB-DU.

In step S1807*a*, the gNB allocates a radio air interface resource according to the QFIs and the QoS profile included in the information transfer message received in step S1804*a*.

In step S1807*b*, the gNB-CU transmits an MBS session start response to the AMF. If a gNB-DU does not support receiving the data transmitted through multicast, the MBS session start response includes an F-TEID (which is denoted as F-TEIDgnb-du for ease of distinguishing) allocated by the gNB-DU, and the F-TEID corresponds to the F-UP, to form a List of {F-UP ID, list of F-TEIDgnb-du, Multicast Enable}. In this embodiment, the List of {F-UP ID, list of F-TEIDgnb-du, Multicast Enable} includes the list of F-TEIDgnb-du and the Multicast Enable for the F-UP11 and the list of F-TEIDgnb-du and the Multicast Enable for the F-UP12.

Similar to step S1507, because some gNB-DUs support receiving the data transmitted through multicast, and some other gNB-DUs do not support receiving the data transmitted through multicast, the list of F-TEIDgnb-du corresponds to only the gNB-DUs that support receiving MBS data through peer to peer rather than through multicast transmission. Therefore, when all gNB-DUs of one F-UP support receiving the data transmitted through multicast, there is no list of F-TEIDgnb-du corresponding to the F-UP. For another description, reference is made to the related content of step S1507.

In addition, when the gNB-CU determines not to allocate any son user plane node to an/some F-UP IDs, Multicast Enable corresponding to this/these F-UP IDs may be set to disable. Certainly, a failed list {F-UP} may alternatively be used in the MBS session start response to indicate a father user plane node to which a gNB-DU is not allocated.

In step S1807*c*, the AMF transmits an information notification message Namf_Communication_NonUeN2InfoNotify to the F-CP1 according to the MBS session start response received in step S1807*b*. The information notification message includes an N2 MBS session container (an N2 MBS session start response (a list of (F-UP ID, list of F-TEIDgnb-du, Multicast Enable))).

In step S1808*a*, the F-CP1 transmits a user plane MBS session modification request to the F-UP11 according to the List of {F-UP ID, list of F-TEIDgnb-du, Multicast Enable} included in the received information notification message, and the F-UP11 feeds back a user plane MBS session modification response to the F-CP1. A detailed description of the step is similar to step S1508, and details are not described herein again.

In step S1808*b*, the F-CP1 transmits a user plane MBS session modification request to the F-UP12 according to the List of {F-UP ID, list of F-TEIDgnb-du, Multicast Enable} included in the received information notification message, and the F-UP12 feeds back a user plane MBS session modification response to the F-CP1. A detailed description of the step is similar to step S1508, and details are not described herein again.

In step S1809, after step S1804*a* to step S1808*b* are performed for the gNB identified by each RAN ID, the F-CP1 transmits an MBS session start response to the father control plane node of the F-CP1 according to the MBS session start response fed back by the gNB-CU.

Similar to step S1609, the MBS session start response replied by the F-CP1 to the father control plane node of the F-CP1 includes a UP ID of a user plane node having a same level as the father control plane node of the F-CP1 and may further include a list of F-TEIDfup and Multicast Enable.

Step S1801 to step S1809 are a processing process after the MBS session start request transmitted by the father control plane node of the F-CP1 is received by the F-CP1. In the processing process, the F-CP1 selects two user plane nodes F-UP11 and F-UP12 that have same levels as the F-CP1, and a gNB-CU corresponding to the F-CP1 selects two son user plane nodes gNB-DU11 and gNB-DU12 that have same levels as the gNB-CU for the F-UP11, and selects two son user plane nodes gNB-DU21 and gNB-DU22 that have same levels as the gNB-CU for the F-UP12.

Continuing to refer to FIG. 18, the method further includes the following steps.

In step S1810, an F-CP2 receives an MBS session start request transmitted by a father control plane node of the F-CP2. A specific process is similar to step S1501. Details are not described again. An IP multicast transmission address included in an MBS IP Multicast Distribution in the MBS session start request is denoted as IPx.

In step S1811, after receiving the MBS session start request transmitted by the father control plane node of the F-CP2, the F-CP2 may determine, according to information (for example, a position and a quantity) about a gNB corresponding to the F-CP2, that one or more F-UPFs are selected from a plurality of F-UPFs as user plane nodes that have same levels as the F-CP2. In this embodiment, it is assumed that only one user plane node F-UP21 is selected, then the F-CP2 transmits a user plane MBS session establishment request to the F-UP21, and the F-UP21 feeds back a user plane MBS session establishment response to the F-CP2.

For a detailed description, reference is made to the related content in step S1502. Similar to step S1502, the F-CP2 interacts with the F-UP21 by using the user plane MBS session establishment request and the user plane MBS session establishment response, and the F-UP21 allocates a new IP multicast transmission address (which is denoted as IP4 for ease of distinguishing).

In addition, similarly, if the F-UP21 does not support receiving data transmitted through multicast, the F-UP21 allocates an F-TEID for receiving the MBS data through peer to peer, and carries the allocated F-TEID in the user plane MBS session establishment response.

In step S1812, the F-UP21 applies to join a multicast transmission group corresponding to an IP multicast transmission address IPx in a case that the F-UP21 supports receiving data transmitted through multicast manner, to receive MBS data transmitted by a father user plane node of the F-UP21.

In step S1813*a*, the F-CP2 transmits an information transfer message (that is, Namf_Communication_NonUeN2MessageTransfer) to an AMF. A detailed description of the information transfer message is similar to step S1804*a*, and details are not described again. However, because the F-CP 2 selects the user plane node F-UP21 that has a same level as the F-CP2, the information transfer message includes an F-UP21 ID and an MBS IP Multicast Distribution corresponding to the F-UP21 ID, and an IP multicast transmission address included in the MBS IP Multicast Distribution is IP4. When a plurality of RAN IDs are recorded in an MBS session context in the F-CP2, subsequent step S1813*b* to step S1817 are performed for a gNB identified by each RAN ID.

There is no sequential relationship between step S1813*a* and step S1804*a*, which may be steps performed in parallel by the F-CP2 and the F-CP1.

In step S1813*b*, the AMF transmits an MBS session start request to a corresponding gNB-CU according to a RAN ID included in the information transfer message in step S1813*a*, the MBS session start request including the parameters in step S1813*a*.

After the gNB-CU receives the MBS session start request transmitted by the AMF, the gNB-CU respectively selects one or more gNB-DUs for the F-UP21 from a plurality of gNB-DUs according to a quantity and positions of registered MBS multicast service UEs (for an MBS multicast service) or an MBS broadcast service area (for an MBS broadcast service). In this embodiment, it is assumed that a gNB-DU31 and a gNB-DU32 are selected for the F-UP21, that is, gNB-DUs selected for the F-UP21 are different from the gNB-DUs selected for the F-UP11 and the F-UP12.

In step S1814, the gNB-CU respectively transmits user plane MBS session establishment requests (that is, F1 MBS Session Establishment Request) to the selected gNB-DU31 and gNB-DU32, the user plane MBS session establishment request including the IP multicast transmission address IP4 allocated by the F-UP21, and the gNB-DU31 and the gNB-DU32 respectively feed back user plane MBS session establishment responses to the gNB-CU (for saving layout, the gNB-DU31 and the gNB-DU32 are drawn together in FIG. 18). A specific process is similar to step S1505*a*. Details are not described again.

In step S1815, the gNB-DU31 and the gNB-DU32 respectively join a multicast transmission group corresponding to the IP multicast transmission address (that is, the IP4) allocated by the F-UP21 in a case that the gNB-DU31 and the gNB-DU32 support receiving the data transmitted through multicast, to receive MBS data transmitted by the F-UP21.

Similar to the foregoing embodiments, if the gNB-DU does not support receiving the data transmitted through multicast, but supports receiving MBS data through peer to peer according to a network configuration, a corresponding F-TEID needs to be allocated. The F-TEID is allocated by the gNB-CU, or is allocated by the gNB-DU.

In step S1816*a*, the gNB allocates a radio air interface resource according to the QFIs and the QoS profile included in the information transfer message received in step S1813*a*.

In step S1816*b*, the gNB-CU transmits an MBS session start response to the AMF. If a gNB-DU does not support receiving the data transmitted through multicast, the MBS session start response includes an F-TEIDgnb-du allocated by the gNB-DU, and the F-TEIDgnb-du corresponds to the F-UP21. For another description, reference may be made to the related content in step S1507.

In step S1816*c*, the AMF transmits an information notification message Namf_Communication_NonUeN2InfoNotify to the F-CP2 according to the MBS session start response received in step S1816*b*. The information notification message includes (an N2 MBS session container (an N2 MBS session start response (a list of (F-UP21 ID, list of F-TEIDgnb-du, Multicast Enable))).

In step S1817, the F-CP2 transmits a user plane MBS session modification request to the F-UP21 according to the F-UP21 ID and the list of F-TEIDgnb-du included in the received information notification message, and the F-UP21 feeds back a user plane MBS session modification response to the F-CP2. A detailed description of the step is similar to step S1508, and details are not described herein again.

In step S1818, after step S1813*b* to step S1817 are performed for the gNB identified by each RAN ID, the F-CP2 transmits an MBS session start response to the father control plane node of the F-CP2 according to the MBS session start response fed back by the gNB-CU.

Similar to step S1509, the MBS session start response replied by the F-CP2 to the father control plane node of the F-CP2 includes a UPx ID of a user plane node having a same level as the father control plane node of the F-CP2 and may further include a list of F-TEIDfup.

Step S1810 to step S1818 are a processing process after the MBS session start request transmitted by the father control plane node of the F-CP2 is received by the F-CP2. In the processing process, the F-CP2 selects a user plane node F-UP21 having a same level as the F-CP2, and a gNB-DU corresponding to the F-CP2 selects two son user plane nodes gNB-DU31 and gNB-DU32 that have same levels as the gNB-CU.

It can be learned from step S1801 to step S1818 that in the embodiments of this disclosure, the gNB-CU has a plurality of father control plane nodes F-CP1 and F-CP2, and the gNB-DU controlled by the gNB-CU has only one father user plane node.

In addition, the message in step S1801 and the message in step S1810 may be transmitted in parallel, and therefore, steps S1801 to S1809 and steps S1810 to S1818 may be performed in parallel. In this way, in a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

In step S1819*a*, the F-UP11 receives downlink MBS data transmitted by the father user plane node of the F-UP11. Subsequently, the downlink MBS data received in step S1820*a* is transmitted to the gNB-DU11 and the gNB-DU12. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In step S1819*b*, the F-UP12 receives downlink MBS data transmitted by the father user plane node of the F-UP12. Subsequently, the downlink MBS data received in step S1820*b* is transmitted to the gNB-DU21 and the gNB-DU22. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In step S1819c, the F-UP21 receives downlink MBS data transmitted by the father user plane node of the F-UP21. Subsequently, the downlink MBS data received in step S1820c is transmitted to the gNB-DU31 and the gNB-DU32. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

Figure 19:
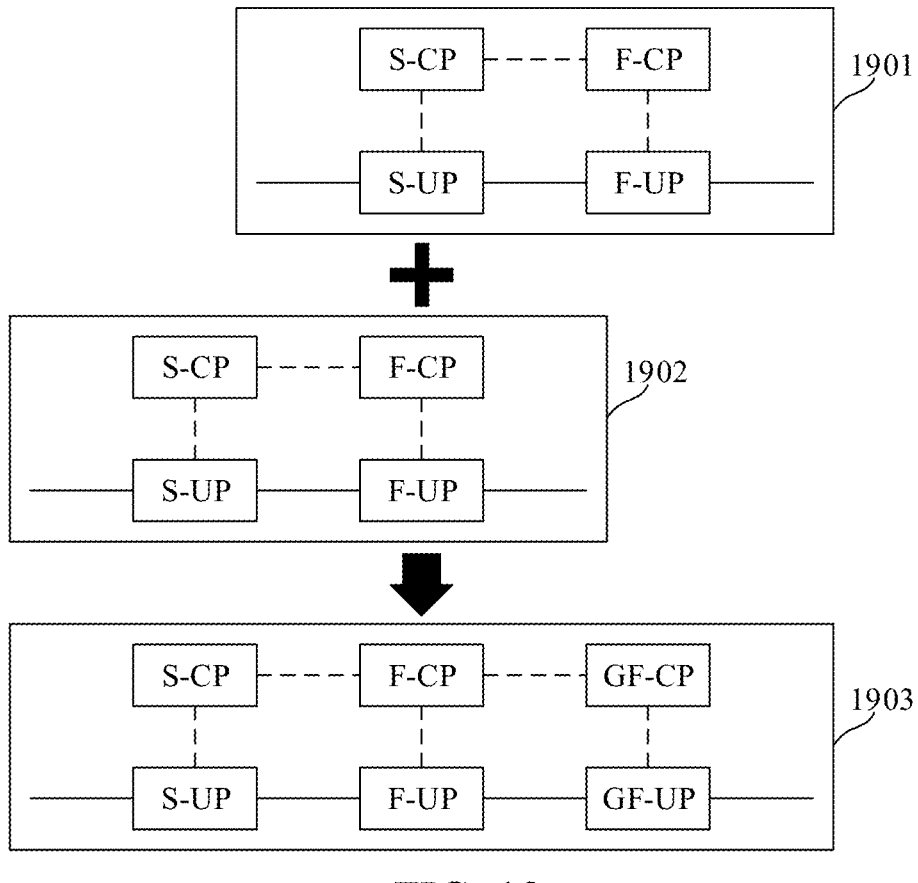
FIG. 19 is a schematic diagram of a cascading manner of a technical solution according to an embodiment of this disclosure.

The technical solution of the embodiment shown in FIG. 18 is mainly a process of establishing a control plane transmission tree and a user plane transmission tree after the NR base station is introduced into the MBS session transmission tree. In the embodiments shown in FIG. 15, FIG. 16, and FIG. 18, only the interaction process between two level nodes in the MBS session transmission tree is introduced, and for an MBS session transmission tree containing three or more level nodes, an interaction process between any two level nodes may be implemented with reference to the embodiment shown in FIG. 15, FIG. 16, or FIG. 18. For example, as shown in FIG. 19, two level nodes shown in 1901 and 1902 may be the two level nodes shown in FIG. 15 or FIG. 16. After a son control plane node S-CP and a son user plane node S-UP in 1901 are respectively superimposed onto a father control plane node F-CP and a father user plane node F-UP in 1902 to form a same entity, as shown in 1903 in FIG. 19, a three-level MBS session transmission tree may be implemented. A GF-CP is a father control plane node of the F-CP, and GF-UP is a father user plane node of the F-UP. In this manner, any level of MBS session transmission tree may be implemented.

For the embodiment shown in FIG. 18, because the base station can only serve as a last level of a network side, the embodiment shown in FIG. 18 may also be combined with the embodiments shown in FIG. 15 and FIG. 16 to implement the any level of MBS session transmission tree including the base station.

FIG. 15, FIG. 16, and FIG. 18 show establishment processes of an MBS session transmission tree according to an embodiment of this disclosure. A broken branch may also occur in a user plane transmission tree in the establishment process of the MBS session transmission tree. Therefore, an operation of deleting a broken branch also needs to be performed.

Figure 20:
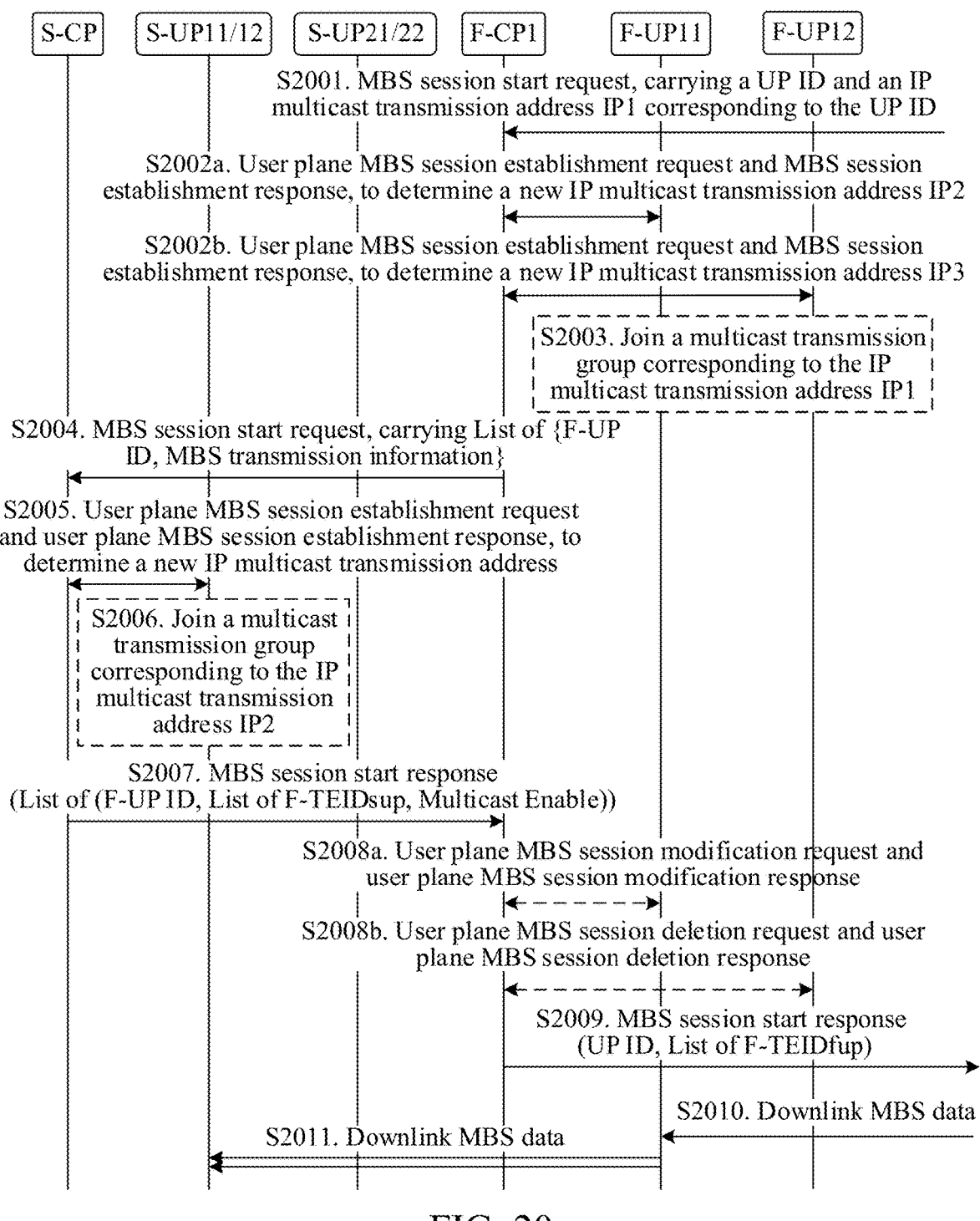
FIG. 20 is a flowchart of an MBS communication method in which a control plane is separated from a user plane according to an embodiment of this disclosure.

As shown in FIG. 20, the following steps may be included.

In step S2001, an F-CP1 receives an MBS session start request transmitted by a father control plane node of the F-CP1. A specific process is similar to step S1501. Details are not described again. An IP multicast transmission address included in an MBS IP Multicast Distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes F-UP11 and F-UP12 are selected. Then, step S1602a and step S1602b are respectively executed.

In step S2002a, the F-CP1 transmits a user plane MBS session establishment request to an F-UP11, and the F-UP11 feeds back a user plane MBS session establishment response to the F-CP1. The process is similar to the process of step S1502 in the foregoing embodiment, and details are not described again. An IP multicast transmission address allocated by the F-UP11 in step S2002a is denoted as IP2.

In step S2002b, the F-CP1 transmits a user plane MBS session establishment request to an F-UP12, and the F-UP12 feeds back a user plane MBS session establishment response to the F-CP1. The process is similar to the process of step S1502 in the foregoing embodiment, and details are not described again. An IP multicast transmission address allocated by the F-UP12 in step S2002b is denoted as IP3.

In step S2003, the F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

In step S2004, the F-CP1 transmits the MBS session start request to each son control plane node according to the information about the son control plane node of the F-CP1, that is, step S2004 to step S2008 are performed separately for each son control plane node. In this embodiment, a description is made by using an example in which the MBS session start request is transmitted to one son control plane node S-CP.

The MBS session start request transmitted by the F-CP1 to the son control plane node S-CP of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, because the F-CP1 selects two user plane nodes F-UP11 and F-UP12 that have same levels as the F-CP1, the List of {F-UP ID, MBS transmission information} includes an F-UP11 ID, an MBS IP Multicast Distribution corresponding to the F-UP11 ID, an F-UP12 ID, and an MBS IP Multicast Distribution corresponding to the F-UP12 ID. The MBS IP Multicast Distribution corresponding to the F-UP11 ID is allocated by the F-UP11, and the IP multicast transmission address included in the MBS IP Multicast Distribution is IP2. The MBS IP Multicast Distribution corresponding to the F-UP12 ID is allocated by the F-UP12, and the IP multicast transmission address included in the MBS IP Multicast Distribution is IP3.

The IP multicast transmission address IP3 allocated by the F-UP12 cannot be the same as the IP multicast transmission address IP2 allocated by the F-UP11, but the allocated C-TEIDs may be the same.

After receiving the MBS session start request transmitted by the F-CP1, similar to step S1502, the S-CP selects one or more S-UPs for the F-UP11 from a plurality of S-UPs according to information about a son control plane node of the S-CP, and selects one or more S-UPs for the F-UP12. In this embodiment, it is assumed that an S-UP11 and an S-UP12 are selected for the F-UP11, but no son user plane node is selected for the F-UP12. Then, step S2005 is performed.

In step S2005, the S-CP respectively transmits user plane MBS session establishment requests to the selected S-UP11 and S-UP12, the user plane MBS session establishment request including the IP multicast transmission address IP2 allocated by the F-UP11, and the S-UP11 and the S-UP12 respectively feed back user plane MBS session establishment responses to the S-CP (for saving layout, the S-UP11 and the S-UP12 are drawn together in FIG. 20). A specific process is similar to step S1505a. Details are not described again.

In step S2006, the S-UP11 and the S-UP12 respectively join a multicast transmission group corresponding to the IP multicast transmission address (that is, the IP2) allocated by the F-UP11 in a case that the S-UP11 and the S-UP12 support receiving the data transmitted through multicast, to receive MBS data transmitted by the F-UP11.

In step S2007, the S-CP transmits an MBS session start response to the F-CP1. If an S-UP does not support receiving the data transmitted through multicast, the MBS session start response includes an F-TEID allocated by the S-UP, and the F-TEID corresponds to the F-UP, to form a List of {F-UP ID, List of F-TEIDsup, Multicast Enable}. In this embodiment, the List of {F-UP ID, list of F-TEIDsup, Multicast Enable} includes the list of F-TEIDsup and the Multicast Enable for the F-UP11 and the Multicast Enable (a value is disable) for the F-UP12. Because the F-UP12 does not allocate F-TEID, and corresponding Multicast Enable is set to disable, it indicates that no son user plane node is selected for the F-UP12.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP determines not to allocate any son user plane node to an/some F-UP IDs, in addition to setting Multicast Enable parameters corresponding to this/these F-UP IDs to Disable, a failed list {F-UP} may further be used in the MBS session start response to indicate a father user plane node to which a son user plane node is not allocated.

In step S2008a, the F-CP1 transmits a user plane MBS session modification request to the F-UP11 according to the List of {F-UP ID, list of F-TEIDsup, Multicast Enable} included in the MBS session start response, and the F-UP11 feeds back a user plane MBS session modification response to the F-CP1. A detailed description of the step is similar to step S1508, and details are not described herein again.

If the F-CP1 determines that all the son control plane nodes of the F-CP1 do not allocate son user plane nodes to the F-UP11, the F-CP1 transmits a user plane MBS session deletion request to the F-UP11, the F-UP11 transmits an IGMP leave data packet after receiving the user plane MBS session deletion request, and deletes an MBS session from a multicast transmission group indicated by the multicast transmission address IP1 allocated by the father user plane node of the F-UP11, and the F-UP 11 returns a user plane MBS session deletion response to the F-CP1 (this process is not identified in the figure).

In step S2008b, after receiving MBS session start responses replied by all the son control plane nodes of the F-CP1, the F-CP1 determines that all the son control plane nodes of the F-CP1 do not allocate son user plane nodes to the F-UP12 and transmits a user plane MBS session deletion request (that is, N4 MBSSessionDelete Request) to the F-UP12, after receiving the user plane MBS session deletion request, the F-UP12 transmits an IGMP leave data packet and deletes an MBS session from the multicast transmission group indicated by the multicast transmission address (that is, IP1) corresponding to the father user plane node of the F-UP12, and the F-UP12 returns a user plane MBS session deletion response to the F-CP1.

Step S2004 to step S2008 are separately performed for each son control plane node of the F-CP1. The operation of deleting the MBS session in step S2008b cannot be started only because an MBS session start response replied by one son control plane node of the F-CP1 in step S2007 indicates that no son user plane node is allocated to the F-UP12. After receiving replies of all the son control plane nodes, the F-CP1 determines that a son user plane node is not allocated to which user plane node, to decide whether an MBS session with the user plane node needs to be deleted.

In step S2009, after step S2004 to step S2008 are performed for each son control plane node, the F-CP1 transmits an MBS session start response to the father control plane node of the F-CP1 according to MBS session start responses fed back by all the son control plane nodes.

Similar to step S1509, the MBS session start response replied by the F-CP1 to the father control plane node of the F-CP1 includes an UP ID of a user plane node having a same level as the father control plane node of the F-CP1, and may also include a list of F-TEID (which is denoted as a list of F-TEIDfup for ease of distinguishing). Because the F-CP1 selects two user plane nodes F-UP11 and F-UP12 that have same levels as the F-CP1, but the S-CP does not allocate a son user plane node to the F-UP12, if the MBS session start response replied by the F-CP1 to the father control plane node of the F-CP1 includes the list of F-TEIDfup, the list of F-TEIDfup also includes an F-TEID allocated by the F-UP11.

If the MBS session start response replied by the F-CP1 to the father control plane node of the F-CP1 may not include the F-TEID allocated by the F-UP11, in this case, it indicates that the F-UP11 supports receiving the data transmitted through multicast. In this case, the MBS session start response replied by the F-CP1 to the father control plane node of the F-CP1 does not need to include the Multicast Enable. If the MBS session start response replied by the F-CP1 to the father control plane node of the F-CP1 includes the F-TEID allocated by the F-UP11, it indicates that the F-UP 11 does not support receiving the data transmitted through multicast but supports receiving the MBS data transmitted through peer to peer. In this case, because the F-CP1 has only one same-level user plane node F-UP11, the MBS session start response replied by the F-CP1 to the father control plane node of the F-CP1 does not need to include the Multicast Enable.

After this MBS session transmission tree is established, the following steps may be performed.

In step S2010, the F-UP11 receives downlink MBS data transmitted by the father user plane node of the F-UP11. Subsequently, the received downlink MBS data is transmitted to the S-UP11 and the S-UP12 in step S2011. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In the embodiment shown in FIG. 20, although the F-CP1 selects two user plane nodes F-UP11 and F-UP12 that have same levels as the F-CP1, a son control plane node S-CP of the F-CP1 does not allocate a son user plane node to the F-UP12, that is, a broken branch occurs in the user plane transmission tree. Therefore, the broken branch needs to be deleted.

In an embodiment of this disclosure, a UPF of a non protocol data unit (PDU) session anchor (PSA) may further participate in an MBS session. In this case, a user plane MBS transmission tree establishment process may refer to FIG. 21, and the following steps are included.

In step S2101, an F-CP1 receives an MBS session start request transmitted by a father control plane node of the F-CP1. A specific process is similar to step S1501. Details are not described again. An IP multicast transmission address included in an MBS IP Multicast Distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S2102*a* and step S2102*b* are respectively executed.

In step S2102*a*, the F-CP1 transmits a user plane MBS session establishment request to an F-UP11, and the F-UP11 feeds back a user plane MBS session establishment response to the F-CP1. The process is similar to the process of step S1502 in the foregoing embodiment, and details are not described again. An IP multicast transmission address allocated by the F-UP11 in step S2102*a* is denoted as IP2.

In step S2102*b*, the F-CP1 transmits a user plane MBS session establishment request to an F-UP12, and the F-UP12 feeds back a user plane MBS session establishment response to the F-CP1. The process is similar to the process of step S1502 in the foregoing embodiment, and details are not described again. An IP multicast transmission address allocated by the F-UP12 in step S2102*b* is denoted as IP3.

In step S2103, the F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

After step S2102*a* and step S2102*b* are performed, the F-CP1 may select to perform the following step S2104*a*, step S2104*b*, and step S2104*c*, and select user plane nodes F-UP21, F-UP22, and F-UP23 (the user plane nodes selected by the F-CP1 and a quantity of user plane nodes are merely an example). The purpose of this is to enable the F-UP11 and the F-UP12 to perform offloading or optimize transmission through the F-UP21, the F-UP22, and the F-UP23.

For example, when a distance between the F-UP11 and a next level user plane node of the F-UP11 is relatively long and there are a relatively large quantity of next level user plane nodes of the F-UP11, if the F-UP11 directly transmits MBS data to the next user plane nodes of the F-UP11, the transmission efficiency is very low. If the F-UP21, the F-UP22, and the like are introduced between the F-UP11 and the next level user plane nodes of the F-UP11, the F-UP11 transmits the MBS data to the next level user plane nodes by using the F-UP21. In this way, the data transmission efficiency may be effectively improved.

Step S2104*a*, step S2104*b*, and step S2104*c* are described below.

In step S2104*a*, the F-CP1 transmits a user plane MBS session establishment request to an F-UP21, and the F-UP21 feeds back a user plane MBS session establishment response to the F-CP1. The process is similar to the process of step S1502 in the foregoing embodiment, and details are not described again. In step S2104*a*, the F-UP21 further allocates a new IP multicast transmission address for transmitting the MBS data to a son user plane node of the F-UP21, and the new IP multicast transmission address is denoted as IP4 in this embodiment. In addition, if the F-UP21 does not support receiving the MBS data transmitted by the F-UP11 through multicast, the F-UP21 allocates an F-TEID to receive the MBS data from the F-UP11 through peer to peer.

In step S2104*b*, the F-CP1 transmits a user plane MBS session establishment request to an F-UP22, and the F-UP22 feeds back a user plane MBS session establishment response to the F-CP1. The process is similar to the process of step S1502 in the foregoing embodiment, and details are not described again. In step S2104*b*, the F-UP22 further allocates a new IP multicast transmission address for transmitting the MBS data to a son user plane node of the F-UP22, and the new IP multicast transmission address is denoted as IP5 in this embodiment. In addition, if the F-UP22 does not support receiving the MBS data transmitted by the F-UP11 through multicast, the F-UP22 allocates an F-TEID to receive the MBS data from the F-UP11 through peer to peer.

In an embodiment of this disclosure, a multicast transmission address in an MBS IP Multicast Distribution included in the user plane MBS session establishment request in step S2104*a* and step S2104*b* is the multicast transmission address IP2 in step S2102*a*.

In step S2104*c*, the F-CP1 transmits a user plane MBS session establishment request to an F-UP23, and the F-UP23 feeds back a user plane MBS session establishment response to the F-CP1. In addition, the F-UP23 further allocates a new IP multicast transmission address for transmitting the MBS data to a son user plane node of the F-UP23, and the new IP multicast transmission address is denoted as IP6 in this embodiment. The process is similar to the process of step S1502 in the foregoing embodiment, and details are not described again.

In an embodiment of this disclosure, a multicast transmission address in an MBS IP Multicast Distribution included in the user plane MBS session establishment request in step S2104*c* is the multicast transmission address IP3 in step S2102*b*. The new multicast transmission address determined in step S2104*c* is allocated by the F-UP23 to son user plane nodes (that is, the S-UP31 and the S-UP32 in FIG. 21) of the F-UP23. In addition, if the F-UP23 does not support receiving the MBS data transmitted by the F-UP12 through multicast, the F-UP23 allocates an F-TEID to receive the MBS data from the F-UP12 through peer to peer.

In step S2105*a*, the F-UP21 and the F-UP22 apply to join a multicast transmission group corresponding to an IP multicast transmission address IP2 in a case that the F-UP21 and the F-UP22 support receiving data transmitted through multicast, to receive MBS data transmitted by the F-UP11.

In step S2105*b*, an F-UP23 applies to join a multicast transmission group corresponding to an IP multicast transmission address IP3 in a case that the F-UP23 supports receiving the data transmitted through multicast, to receive MBS data transmitted by the F-UP12.

In step S2106*a*, if there is a user plane node that supports receiving the MBS data through peer to peer rather than through multicast transmission in the F-UP21 and the F-UP22, the F-CP1 transmits a user plane MBS session modification request to the F-UP11, and the F-UP11 feeds back a user plane MBS session modification response to the F-CP1. The user plane MBS session modification request includes an F-TEID allocated by the user plane node that supports receiving the MBS data through peer to peer rather than through multicast transmission in the F-UP21 and the F-UP22, to instruct the F-UP11 to transmit, through peer to peer, the MBS data to the user plane node that supports receiving the MBS data through peer to peer rather than through multicast transmission in the F-UP21 and the F-UP22.

In step S2106*b*, if the F-UP23 supports receiving the MBS data through peer to peer rather than through multicast transmission, the F-CP1 transmits a user plane MBS session modification request to the F-UP12, and the F-UP12 feeds back a user plane MBS session modification response to the F-CP1. The user plane MBS session modification request includes an F-TEID allocated by the F-UP23, to instruct the F-UP12 to transmit MBS data to the F-UP23 through peer to peer.

In step S2107, the F-CP1 transmits an MBS session start request to a son control plane node S-CP1 of the F-CP1 according to information about the son control plane node of the F-CP1.

The MBS session start request transmitted by the F-CP1 to the son control plane node S-CP1 of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, the List of {F-UP ID, MBS transmission information} includes an F-UP21 ID, an MBS IP Multicast Distribution corresponding to the F-UP21 ID, an F-UP22 ID, and an MBS IP Multicast Distribution corresponding to the F-UP22 ID. The MBS IP Multicast Distribution corresponding to the F-UP21 ID is allocated by the F-UP21, and the IP multicast transmission address included in the MBS IP Multicast Distribution is the new IP multicast transmission address IP4 allocated by the F-UP21 in step S2104*a*. The MBS IP Multicast Distribution corresponding to the F-UP22 ID is allocated by the F-UP22, and the IP multicast transmission address included in the MBS IP Multicast Distribution is the new IP multicast transmission address IP5 allocated by the F-UP22 in step S2104*b*. The new IP multicast transmission address IP4 allocated by the F-UP21 in step S2104*a* is different from the new IP multicast transmission address IP5 allocated by the F-UP22 in step S2104*b*.

In step S2108, after receiving the MBS session start request transmitted by the F-CP1, the S-CP1 performs a user plane MBS session establishment process. Specifically, the S-CP1 selects one or more S-UPs for the F-UP21 from a plurality of S-UPs according to information about a son control plane node of the S-CP1, and selects one or more S-UPs for the F-UP22. In this embodiment, it is assumed that an S-UP11 and an S-UP 12 are selected for the F-UP21, and an S-UP21 and an S-UP22 are selected for the F-UP22, that is, different son user plane nodes are selected for the F-UP21 and the F-UP22. Then, the S-CP1 respectively transmits user plane MBS session establishment requests to the son user plane nodes (that is, the S-UP11, the S-UP12, the S-UP21, and the S-UP22) selected for the F-UP21 and the F-UP22 and receives user plane MBS session establishment responses fed back by the son user plane nodes. In addition, if the son user plane nodes support multicast transmission, the son user plane nodes may join a corresponding multicast transmission group to receive MBS data (that is, the S-UP11 and the S-UP12 join a multicast transmission group corresponding to the IP4, and the S-UP21 and the S-UP22 join a multicast transmission group corresponding to the IP5). if some of the son user plane nodes do not support receiving the data transmitted through multicast but support receiving the MBS data through peer to peer, the son user plane nodes that do not support receiving the data transmitted through multicast but support receiving the MBS data through peer to peer may allocate F-TEIDs to receive the MBS data through peer to peer. A specific process is similar to step S1505*a* and step S1506, and details are not described again.

In step S2109, the S-CP1 transmits an MBS session start response to the F-CP1. If an S-UP does not support receiving the data transmitted through multicast but supports receiving the MBS data through peer to peer, the MBS session start response includes an F-TEID allocated by the S-UP, and the F-TEID corresponds to the F-UP, to form a List of {F-UP ID, list of F-TEIDsup, Multicast Enable}. In this embodiment, the List of {F-UP ID, list of F-TEIDsup, Multicast Enable} includes the list of F-TEIDsup and the Multicast Enable for the F-UP21 and the list of F-TEIDsup and the Multicast Enable for the F-UP22.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP1 determines not to allocate any son user plane node to an/some F-UP IDs, the Multicast Enable corresponding to this/these F-UP IDs may be set to disable. Certainly, a failed list {F-UP} may alternatively be used in the MBS session start response to indicate an F-UP to which a son user plane node is not allocated.

In step S2110*a*, the F-CP1 transmits a user plane MBS session modification request to the F-UP21 according to the List of {F-UP ID, list of F-TEIDsup, Multicast Enable} included in the MBS session start response fed back by the S-CP1, and the F-UP21 feeds back a user plane MBS session modification response to the F-CP1. A detailed description of the step is similar to step S1508, and details are not described herein again.

In step S2110*b*, the F-CP1 transmits a user plane MBS session modification request to the F-UP22 according to the List of {F-UP ID, list of F-TEIDsup, Multicast Enable} included in the MBS session start response fed back by the S-CP1, and the F-UP22 feeds back a user plane MBS session modification response to the F-CP1. A detailed description of the step is similar to step S1508, and details are not described herein again.

In step S2111, the F-CP1 transmits an MBS session start request to a son control plane node S-CP2 of the F-CP1 according to information about the son control plane node of the F-CP1.

The MBS session start request transmitted by the F-CP1 to the son control plane node S-CP2 of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, the List of {F-UP ID, MBS transmission information} includes an F-UP23 ID and an MBS IP Multicast Distribution corresponding to the F-UP23 ID. The MBS IP Multicast Distribution corresponding to the F-UP23 ID is allocated by the F-UP23, and the IP multicast transmission address included in the MBS IP Multicast Distribution is the new IP multicast transmission address IP6 allocated by the F-UP23 in step S2104c.

There is no sequential relationship between step S2111 and step S2107, which may be steps performed in parallel by the F-CP1.

In step S2112, after receiving the MBS session start request transmitted by the F-CP1, the S-CP2 performs a user plane MBS session establishment process. Specifically, the S-CP2 selects one or more S-UPs for the F-UP23 from a plurality of S-UPs according to information about a son control plane node of the S-CP2. In this embodiment, it is assumed that an S-UP31 and an S-UP32 are selected for the F-UP23, that is, the son user plane nodes selected for the F-UP23 are different from the son user plane nodes selected for the F-UP21 and the F-UP22. Then, the S-CP2 respectively transmits user plane MBS session establishment requests to the son user plane nodes (that is, the S-UP31 and the S-UP32) selected for the F-UP23 and receives user plane MBS session establishment responses fed back by the S-UP31 and the S-UP32. In addition, if the S-UP31 and the S-UP32 supports multicast transmission, the S-UP31 and the S-UP32 may join a multicast transmission group corresponding to a new IP multicast transmission address IP6 allocated by the F-UP23 in step S2104c, to receive the MBS data transmitted by the F-UP23. if some son user plane nodes in the S-UP31 and the S-UP32 do not support receiving the data transmitted through multicast but support receiving the MBS data through peer to peer, the son user plane nodes that do not support receiving the data transmitted through multicast but support receiving of the MBS data through peer to peer in the S-UP 31 and the S-UP32 may allocate F-TEIDs to receive the MBS data transmitted by the F-UP23 through peer to peer. A specific process is similar to step S1505a and step S1506, and details are not described again.

In step S2113, the S-CP2 transmits an MBS session start response to the F-CP1. If there is an S-UP that does not support receiving the data transmitted through multicast but supports receiving the MBS data through peer to peer in the S-UP31 and the S-UP32, the MBS session start response includes an F-TEID allocated by the S-UP, which corresponds to the F-UP, to form a List of {F-UP ID, list of F-TEIDsup, Multicast Enable}. In this embodiment, the List of {F-UP ID, list of F-TEIDsup, Multicast Enable} includes the list of F-TEIDsup and the Multicast Enable for the F-UP23.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP2 determines not to allocate any son user plane node to an/some F-UP IDs, the Multicast Enable corresponding to this/these F-UP IDs may be set to disable. Certainly, a failed list {F-UP} may alternatively be used in the MBS session start response to indicate an F-UP to which a son user plane node is not allocated.

In step S2114, the F-CP1 transmits a user plane MBS session modification request to the F-UP23 according to the List of {F-UP ID, list of F-TEIDsup, Multicast Enable} included in the MBS session start response fed back by the S-CP2, and the F-UP23 feeds back a user plane MBS session modification response to the F-CP1. A detailed description of the step is similar to step S1508, and details are not described herein again.

In step S2115, after the F-CP1 receives the MBS session start responses fed back by all the S-CPs, the F-CP1 transmits an MBS session start response to the father control plane node of the F-CP1 according to the MBS session start responses fed back by all the S-CPs.

Similar to step S1609, the MBS session start response replied by the F-CP1 to the father control plane node of the F-CP1 includes a UP ID (the UP ID is an identifier of a user plane node having a same level as the father control plane node of the F-CP1) and may further include a list of F-TEIDfup and Multicast Enable.

It can be learned through step S2101 to step S2115 that in this embodiment of this disclosure, the F-CP1 has two son control plane nodes S-CP1 and S-CP2, the F-CP1 selects next level user plane nodes F-UP21 and F-UP22 for the F-UP11, and the F-CP1 selects a next level user plane node F-UP23 for the F-UP12. In addition, the S-CP1 selects son user plane nodes S-UP11 and S-UP12 for the F-UP21, the S-CP1 selects son user plane nodes S-UP21 and S-UP22 for the F-UP22, and the S-CP2 selects son user plane nodes S-UP31 and S-UP32 for the F-UP23.

In a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

In step S2116a, the F-UP11 receives downlink MBS data transmitted by the father user plane node of the F-UP11. Subsequently, the received downlink MBS data received in step S2117a is transmitted to the F-UP21, and the downlink MBS service data received in step S2117b is transmitted to the F-UP22. The F-UP21 transmits the downlink MBS service data received in step S2118a to the S-UP11 and the S-UP12. The F-UP22 transmits the downlink MBS service data received in step S2118b to the S-UP21 and the S-UP22. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In step S2116b, the F-UP12 receives downlink MBS data transmitted by the father user plane node of the F-UP12.

Subsequently, the downlink MBS service data received in step S2117c is transmitted to the F-UP23, and the F-UP23 transmits the downlink MBS service data received in step S2118c to the S-UP31 and the S-UP32. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

Figure 21:
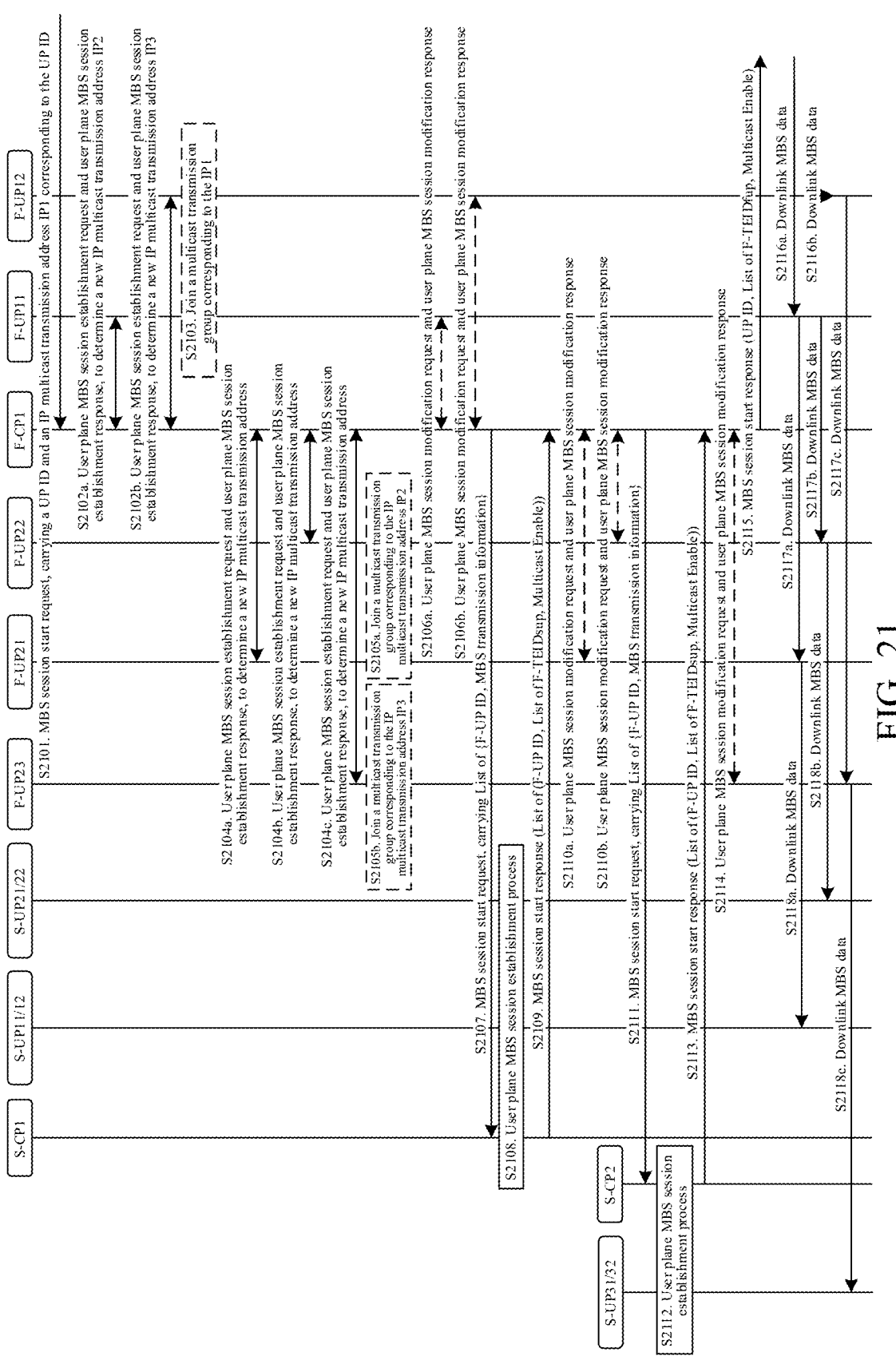
FIG. 21 is a flowchart of an MBS communication method in which a control plane is separated from a user plane according to an embodiment of this disclosure.
Figure 22:
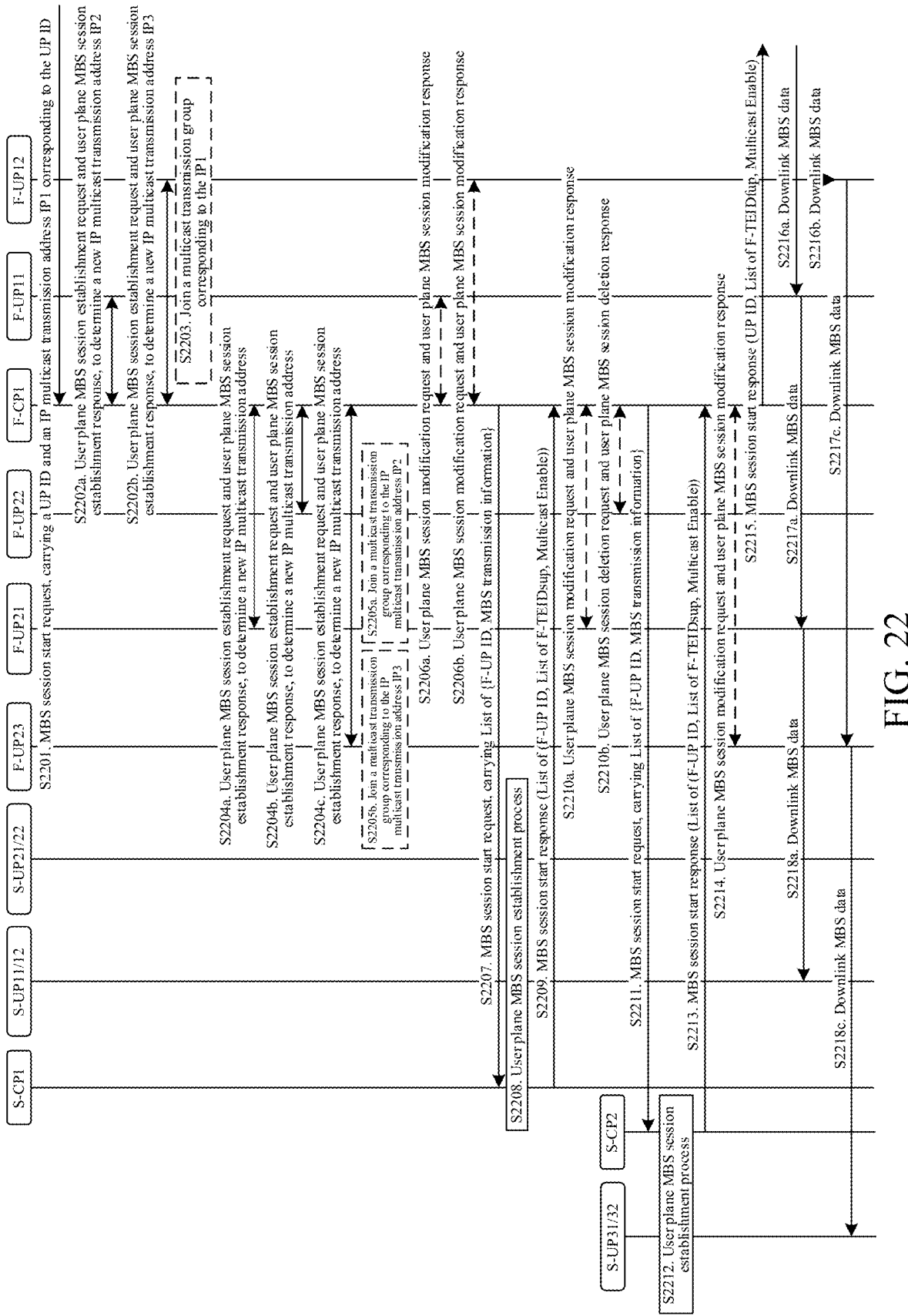
FIG. 22 is a flowchart of an MBS communication method in which a control plane is separated from a user plane according to an embodiment of this disclosure.

For an application scenario in which a UPF of a non-PSA shown in FIG. 21 participates in an MBS session, occurrence of a broken branch also needs to be prevented. For a specific process, reference may be made to FIG. 22, the method includes the following steps.

In step S2201, an F-CP1 receives an MBS session start request transmitted by a father control plane node of the F-CP1. A specific process is similar to step S1501. Details are not described again. An IP multicast transmission address included in an MBS IP Multicast Distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S2202a and step S2202b are respectively executed.

In step S2202a, the F-CP1 transmits a user plane MBS session establishment request to an F-UP11, and the F-UP11 feeds back a user plane MBS session establishment response to the F-CP1. The process is similar to the process of step S1502 in the foregoing embodiment, and details are not described again. An IP multicast transmission address allocated by the F-UP11 in step S2202a is denoted as IP2.

In step S2202b, the F-CP1 transmits a user plane MBS session establishment request to an F-UP12, and the F-UP12 feeds back a user plane MBS session establishment response to the F-CP1. The process is similar to the process of step S1502 in the foregoing embodiment, and details are not described again. An IP multicast transmission address allocated by the F-UP12 in step S2202b is denoted as IP3.

In step S2203, the F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

After step S2202a and step S2202b are performed, the F-CP1 may select to perform the following step S2204a, step S2204b, and step S2204c, and select user plane nodes F-UP21, F-UP22, and F-UP23 (the user plane nodes selected by the F-CP1 and a quantity of user plane nodes are merely an example). The purpose of this is to enable the F-UP11 and the F-UP12 to perform offloading or optimize transmission through the F-UP21, the F-UP22, and the F-UP23.

For example, when a distance between the F-UP11 and a next level user plane node of the F-UP11 is relatively long and there are a relatively large quantity of next level user plane nodes of the F-UP11, if the F-UP11 directly transmits MBS data to the next user plane nodes of the F-UP11, the transmission efficiency is very low. If the F-UP21, the F-UP22, and the like are introduced between the F-UP11 and the next level user plane nodes of the F-UP11, the F-UP11 transmits the MBS data to the next level user plane nodes by using the F-UP21. In this way, the data transmission efficiency may be effectively improved.

Step S2204a, step S2204b, and step S2204c are described below.

In step S2204a, the F-CP1 transmits a user plane MBS session establishment request to an F-UP21, and the F-UP21 feeds back a user plane MBS session establishment response to the F-CP1. The process is similar to the process of step S1502 in the foregoing embodiment, and details are not described again. In step S2204a, the F-UP21 further allocates a new IP multicast transmission address for transmitting the MBS data to a son user plane node of the F-UP21, and the new IP multicast transmission address is denoted as IP4 in this embodiment. In addition, if the F-UP21 does not support receiving the MBS data transmitted by the F-UP11 through multicast, the F-UP21 allocates an F-TEID to receive the MBS data from the F-UP11 through peer to peer.

In step S2204b, the F-CP1 transmits a user plane MBS session establishment request to an F-UP22, and the F-UP22 feeds back a user plane MBS session establishment response to the F-CP1. The process is similar to the process of step S1502 in the foregoing embodiment, and details are not described again. In step S2104b, the F-UP22 further allocates a new IP multicast transmission address for transmitting the MBS data to a son user plane node of the F-UP22, and the new IP multicast transmission address is denoted as IP5 in this embodiment. In addition, if the F-UP22 does not support receiving the MBS data transmitted by the F-UP11 through multicast, the F-UP22 allocates an F-TEID to receive the MBS data from the F-UP11 through peer to peer.

In an embodiment of this disclosure, a multicast transmission address in an MBS IP Multicast Distribution included in the user plane MBS session establishment request in step S2204a and step S2204b is the multicast transmission address IP2 in step S2202a.

In step S2204c, the F-CP1 transmits a user plane MBS session establishment request to an F-UP23, and the F-UP23 feeds back a user plane MBS session establishment response to the F-CP1. In addition, the F-UP23 further allocates a new IP multicast transmission address for transmitting the MBS data to a son user plane node of the F-UP23, and the new IP multicast transmission address is denoted as IP6 in this embodiment. The process is similar to the process of step S1502 in the foregoing embodiment, and details are not described again.

In an embodiment of this disclosure, a multicast transmission address in an MBS IP Multicast Distribution included in the user plane MBS session establishment request in step S2204c is the multicast transmission address IP3 in step S2202b. The new multicast transmission address IP6 determined in step S2204c is allocated by the F-UP23 to son user plane nodes (that is, the S-UP31 and the S-UP32 in FIG. 22) of the F-UP23. In addition, if the F-UP23 does not support receiving the MBS data transmitted by the F-UP12 through multicast, the F-UP23 allocates an F-TED to receive the MBS data from the F-UP12 through peer to peer.

In step S2205a, the F-UP21 and the F-UP22 apply to join a multicast transmission group corresponding to an IP multicast transmission address IP2 in a case that the F-UP21 and the F-UP22 support receiving the data transmitted through multicast, to receive MBS data transmitted by the F-UP11.

In step S2205b, an F-UP23 applies to join a multicast transmission group corresponding to an IP multicast transmission address IP3 in a case that the F-UP23 supports receiving the data transmitted through multicast, to receive MBS data transmitted by the F-UP12.

In step S2206a, if there is a user plane node that supports receiving the MBS data through peer to peer rather than through multicast transmission in the F-UP21 and the F-UP22, the F-CP1 transmits a user plane MBS session modification request to the F-UP11, and the F-UP11 feeds back a user plane MBS session modification response to the F-CP1. The user plane MBS session modification request includes an F-TEID allocated by the user plane node that supports receiving the MBS data through peer to peer rather than through multicast transmission in the F-UP21 and the F-UP22, to instruct the F-UP11 to transmit, through peer to peer, the MBS data to the user plane node that supports receiving the MBS data through peer to peer rather than through multicast transmission in the F-UP21 and the F-UP22.

If the F-CP1 does not allocate a next level user plane node to the F-UP11, the F-CP1 transmits a user plane MBS session deletion request to the F-UP11, the F-UP11 transmits an IGMP leave data packet after receiving the user plane MBS session deletion request, and the F-UP11 exits a multicast transmission group indicated by the multicast transmission address IP1 allocated by the father user plane node of the F-UP11, and the F-UP 11 returns a user plane MBS session deletion response to the F-CP1 (this process is not identified in the figure).

In step S2206b, if the F-UP23 supports receiving the MBS data through peer to peer rather than through multicast transmission, the F-CP1 transmits a user plane MBS session modification request to the F-UP12, and the F-UP12 feeds back a user plane MBS session modification response to the F-CP1. The user plane MBS session modification request includes an F-TEID allocated by the F-UP23, to instruct the F-UP12 to transmit MBS data to the F-UP23 through peer to peer.

If the F-CP1 does not allocate a next level user plane node to the F-UP12, the F-CP1 transmits a user plane MBS session deletion request to the F-UP12, the F-UP12 transmits an IGMP leave data packet after receiving the user plane MBS session deletion request, and the F-UP12 exits a multicast transmission group indicated by the multicast transmission address IP1 allocated by the father user plane node of the F-UP12, and the F-UP12 returns a user plane MBS session deletion response to the F-CP1 (this process is not identified in the figure).

In step S2207, the F-CP1 transmits an MBS session start request to a son control plane node S-CP1 of the F-CP1 according to information about the son control plane node of the F-CP1.

The MBS session start request transmitted by the F-CP1 to the son control plane node S-CP1 of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, the List of {F-UP ID, MBS transmission information} includes an F-UP21 ID, an MBS IP Multicast Distribution corresponding to the F-UP21 ID, an F-UP22 ID, and an MBS IP Multicast Distribution corresponding to the F-UP22 ID. The MBS IP Multicast Distribution corresponding to the F-UP21 ID is allocated by the F-UP21, and the IP multicast transmission address included in the MBS IP Multicast Distribution is the new IP multicast transmission address IP4 allocated by the F-UP21 in step S2204a. The MBS IP Multicast Distribution corresponding to the F-UP22 ID is allocated by the F-UP22, and the IP multicast transmission address included in the MBS IP Multicast Distribution is the new IP multicast transmission address IP5 allocated by the F-UP22 in step S2204b. The new IP multicast transmission address IP4 allocated by the F-UP21 in step S2204a is different from the new IP multicast transmission address IP5 allocated by the F-UP22 in step S2204b.

In step S2208, after receiving the MBS session start request transmitted by the F-CP1, the S-CP1 performs a user plane MBS session establishment process. Specifically, the S-CP1 selects one or more S-UPs for the F-UP21 from a plurality of S-UPs according to information about a son control plane node of the S-CP1, and selects a plurality of S-UPs for the F-UP22. In this embodiment, it is assumed that an S-UP11 and an S-UP 12 are selected for the F-UP21, and no son user plane node is selected for the F-UP22. Then, the S-CP1 respectively transmits user plane MBS session establishment requests to the S-UP11 and the S-UP12 and receives user plane MBS session establishment responses fed back by the S-UP11 and the S-UP12. In addition, if the S-UP11 and the S-UP12 supports multicast transmission, the S-UP11 and the S-UP12 may join a multicast transmission group corresponding to a new IP multicast transmission address IP4 allocated in step S2204a to receive the MBS data transmitted by the F-UP21. if some son user plane nodes in the S-UP11 and the S-UP12 do not support receiving the data transmitted through multicast but support receiving the MBS data through peer to peer, the son user plane nodes that do not support receiving the data transmitted through multicast but support receiving the MBS data through peer to peer in the S-UP 11 and the S-UP12 may allocate F-TEIDs to receive the MBS data transmitted by the F-UP21 through peer to peer. A specific process is similar to step S1505a and step S1506, and details are not described again.

In step S2209, the S-CP1 transmits an MBS session start response to the F-CP1. If an S-UP does not support receiving the data transmitted through multicast but supports receiving the MBS data through peer to peer, the MBS session start response includes an F-TEID allocated by the S-UP, and the F-TEID corresponds to the F-UP, to form a List of {F-UP ID, list of F-TEIDsup, Multicast Enable}. In this embodiment, the List of {F-UP ID, list of F-TEIDsup, Multicast Enable} includes the list of F-TEIDsup and the Multicast Enable for the F-UP21 and the list of F-TEIDsup and the Multicast Enable for the F-UP22. Because the S-CP1 does not select a son user plane node for the F-UP22, the list of F-TEIDsup for the F-UP22 does not include any F-TEID, and Multicast Enable for the F-UP22 is disable. Alternatively, there is no list of F-TEIDsup for the F-UP22 in the MBS session start response transmitted by the S-CP1 to the F-CP1, and a value of Multicast Enable for the F-UP22 is disable. Certainly, the S-CP1 may alternatively return a failure code (for example, a failed List of {F-UP22}) by using the MBS session start response to indicate that no son user plane node is selected for the F-UP22.

Similar to step S1507, because some S-UPs support receiving the data transmitted through multicast, and some other S-UPs do not support receiving the data transmitted through multicast, the list of F-TEIDsup for the F-UP21 corresponds to only the S-UPs that support receiving the MBS data through peer to peer rather than through multicast transmission. For another description, reference is made to the related content of step S1507.

In step S2210a, the F-CP1 transmits a user plane MBS session modification request to the F-UP21 according to the List of {F-UP ID, list of F-TEIDsup, Multicast Enable} included in the MBS session start response fed back by the S-CP1, and the F-UP21 feeds back a user plane MBS session modification response to the F-CP1. A detailed description of the step is similar to step S1508, and details are not described herein again.

If the F-CP1 determines that no next level user plane node is allocated to the F-UP21, the F-CP1 transmits a user plane MBS session deletion request to the F-UP21, the F-UP21 transmits an IGMP leave data packet after receiving the user plane MBS session deletion request, and the F-UP21 exits a multicast transmission group indicated by the multicast transmission address IP2 allocated by the F-UP11, and the F-UP21 returns a user plane MBS session deletion response to the F-CP1 (this process is not identified in the figure).

In step S2210b, after receiving MBS session start responses replied by all son control plane nodes of the F-CP1, the F-CP1 determines that all the son control plane nodes of the F-CP1 do not select son user plane nodes for the F-UP22 and transmits a user plane MBS session deletion request to the F-UP22, after receiving the user plane MBS session deletion request, the F-UP22 transmits an IGMP leave data packet, and deletes an MBS session from the multicast transmission group indicated by the multicast transmission address IP2 allocated by the F-UP11, and the F-UP22 returns a user plane MBS session deletion response to the F-CP1.

In step S2211, the F-CP1 transmits an MBS session start request to a son control plane node S-CP2 of the F-CP1 according to information about the son control plane node of the F-CP1.

The MBS session start request transmitted by the F-CP1 to the son control plane node S-CP2 of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, the List of {F-UP ID, MBS transmission information} includes an F-UP23 ID and an MBS IP Multicast Distribution corresponding to the F-UP23 ID. The MBS IP Multicast Distribution corresponding to the F-UP23 ID is allocated by the F-UP23, and the IP multicast transmission address included in the MBS IP Multicast Distribution is the new IP multicast transmission address IP6 allocated by the F-UP23 in step S2204c.

There is no sequential relationship between step S2211 and step S2207, which may be steps performed in parallel by the F-CP1.

In step S2212, after receiving the MBS session start request transmitted by the F-CP1, the S-CP2 performs a user plane MBS session establishment process. Specifically, the S-CP2 selects one or more S-UPs for the F-UP23 from a plurality of S-UPs according to information about a son control plane node of the S-CP2. In this embodiment, it is assumed that an S-UP31 and an S-UP32 are selected for the F-UP23, that is, the son user plane nodes selected for the F-UP23 are different from the son user plane nodes selected for the F-UP21 and the F-UP22. Then, the S-CP2 respectively transmits user plane MBS session establishment requests to the son user plane nodes (that is, the S-UP31 and the S-UP32) selected for the F-UP23 and receives user plane MBS session establishment responses fed back by the S-UP31 and the S-UP32. In addition, if the S-UP31 and the S-UP32 supports multicast transmission, the S-UP31 and the S-UP32 may join a multicast transmission group corresponding to a new IP multicast transmission address IP6 allocated by the F-UP23 in step S2204c to receive the MBS data transmitted by the F-UP23. if some son user plane nodes in the S-UP31 and the S-UP32 do not support receiving the data transmitted through multicast but support receiving the MBS data through peer to peer, the son user plane nodes that do not support receiving the data transmitted through multicast but support receiving the MBS data through peer to peer in the S-UP 31 and the S-UP32 may allocate F-TEIDs to receive the MBS data transmitted by the F-UP23 through peer to peer. A specific process is similar to step S1505a and step S1506, and details are not described again.

In step S2213, the S-CP2 transmits an MBS session start response to the F-CP1. If there is an S-UP that does not support receiving the data transmitted through multicast but supports receiving the MBS data through peer to peer in the S-UP31 and the S-UP32, the MBS session start response includes an F-TEID allocated by the S-UP, which corresponds to the F-UP, to form a List of {F-UP ID, list of F-TEIDsup, Multicast Enable}. In this embodiment, the List of {F-UP ID, list of F-TEIDsup, Multicast Enable} includes the list of F-TEIDsup and the Multicast Enable for the F-UP23.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. Therefore, when all S-UPs of one F-UP support receiving the data transmitted through multicast, there is no list of F-TEIDsup corresponding to the F-UP. For another description, reference is made to the related content of step S1507.

In addition, when the S-CP2 determines not to allocate any son user plane node to an/some F-UP IDs, the Multicast Enable corresponding to this/these F-UP IDs may be set to disable. Certainly, a failed list {F-UP} may alternatively be used in the MBS session start response to indicate an F-UP to which a son user plane node is not allocated.

In step S2214, the F-CP1 transmits a user plane MBS session modification request to the F-UP23 according to the List of {F-UP ID, list of F-TEIDsup, Multicast Enable} included in the MBS session start response fed back by the S-CP2, and the F-UP23 feeds back a user plane MBS session modification response to the F-CP1. A detailed description of the step is similar to step S1508, and details are not described herein again.

If the F-CP1 determines that no next level user plane node is allocated to the F-UP23, the F-CP1 transmits a user plane MBS session deletion request to the F-UP23, the F-UP23 transmits an IGMP leave data packet after receiving the user plane MBS session deletion request, exits a multicast transmission group indicated by the multicast transmission address IP3 allocated by the F-UP12, and returns a user plane MBS session deletion response to the F-CP1 (this process is not identified in the figure).

In step S2215, after the F-CP1 receives the MBS session start responses fed back by all the S-CPs, the F-CP1 transmits an MBS session start response to the father control plane node of the F-CP1 according to the MBS session start responses fed back by all the S-CPs.

Similar to step S1609, the MBS session start response replied by the F-CP1 to the father control plane node of the F-CP1 includes a UP ID (the UP ID is an identifier of a user plane node having a same level as the father control plane node of the F-CP1) and may further include a list of F-TEIDfup and Multicast Enable.

It can be learned through step S2201 to step S2215 that in the embodiment of this disclosure, the F-CP1 has two son control plane nodes S-CP1 and S-CP2, the F-CP1 selects next level user plane nodes F-UP21 and F-UP22 for the F-UP11, and the F-CP1 selects a next level user plane node F-UP23 for the F-UP12. In addition, the S-CP1 selects son user plane nodes S-UP11 and S-UP12 for the F-UP21, and the S-CP2 selects son user plane nodes S-UP31 and S-UP32 for the F-UP23. In addition, because the S-CP1 does not select a son user plane node for the F-UP22, the F-UP22 needs to be deleted from the user plane MBS transmission tree.

In a user plane MBS session establishment process, two control plane nodes may transmit user plane MBS session establishment requests to one user plane node simultaneously, or after being selected by one control plane node, one user plane node receives a user plane MBS session establishment request transmitted by an other control plane node. If one user plane node simultaneously receives user plane MBS session establishment requests transmitted by two control plane nodes (which may be more control plane nodes, herein a description is made by using an example of two control plane nodes), the user plane node may normally respond to the user plane MBS session establishment request transmitted by one of the control plane nodes in a user plane MBS session establishment response, and reject the other control plane node in an other user plane MBS session establishment response, to indicate that the user plane node has been selected. If one user plane node already has a father user plane node by using one control plane node and when receiving a user plane MBS session establishment request transmitted by an other control plane node, the user plane node rejects the other control plane node in an other user plane MBS session establishment response, to indicate that the user plane node has been selected.

After this MBS session transmission tree is established, the following steps may be performed.

In step S2216a, the F-UP11 receives downlink MBS data transmitted by the father user plane node of the F-UP11. Subsequently, the received downlink MBS service data is transmitted to the F-UP21 in step S2217a. The F-UP21 transmits the downlink MBS service data received in step S2218a to the S-UP11 and the S-UP12. Each user plane node transmits the MB S data in the multicast transmission manner or the peer-to-peer transmission manner determined in the foregoing steps, and each user plane node receives the MBS data in the multicast transmission manner or the peer-to-peer transmission manner determined in the foregoing steps.

In step S2216b, the F-UP12 receives downlink MBS data transmitted by the father user plane node of the F-UP12. Subsequently, the received downlink MBS service data is transmitted to the F-UP23 in step S2217c, and the F-UP23 transmits the received downlink MB S service data to the S-UP31 and the S-UP32 in step S2218c. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In addition, clause 5.3.4.2.2 in the standard TS 23.501 defines an architecture where one or more I-SMFs and one or more I-UPFs (Intermediate-UPFs, intermediate user plane function entities) participate in a PDU session in a non-roaming scenario. For a non-roaming PDU session, there is only one SMF. If there are multiple SMFs, the SMF that controls the PSA is still called SMF in order to comply with the specifications, and the other SMFs are called I-SMF. The name of the UPF controlled by the SMF remains unchanged, and is still called UPF, while the UPF controlled by I-SMF is called I-UPF.

Figure 23:
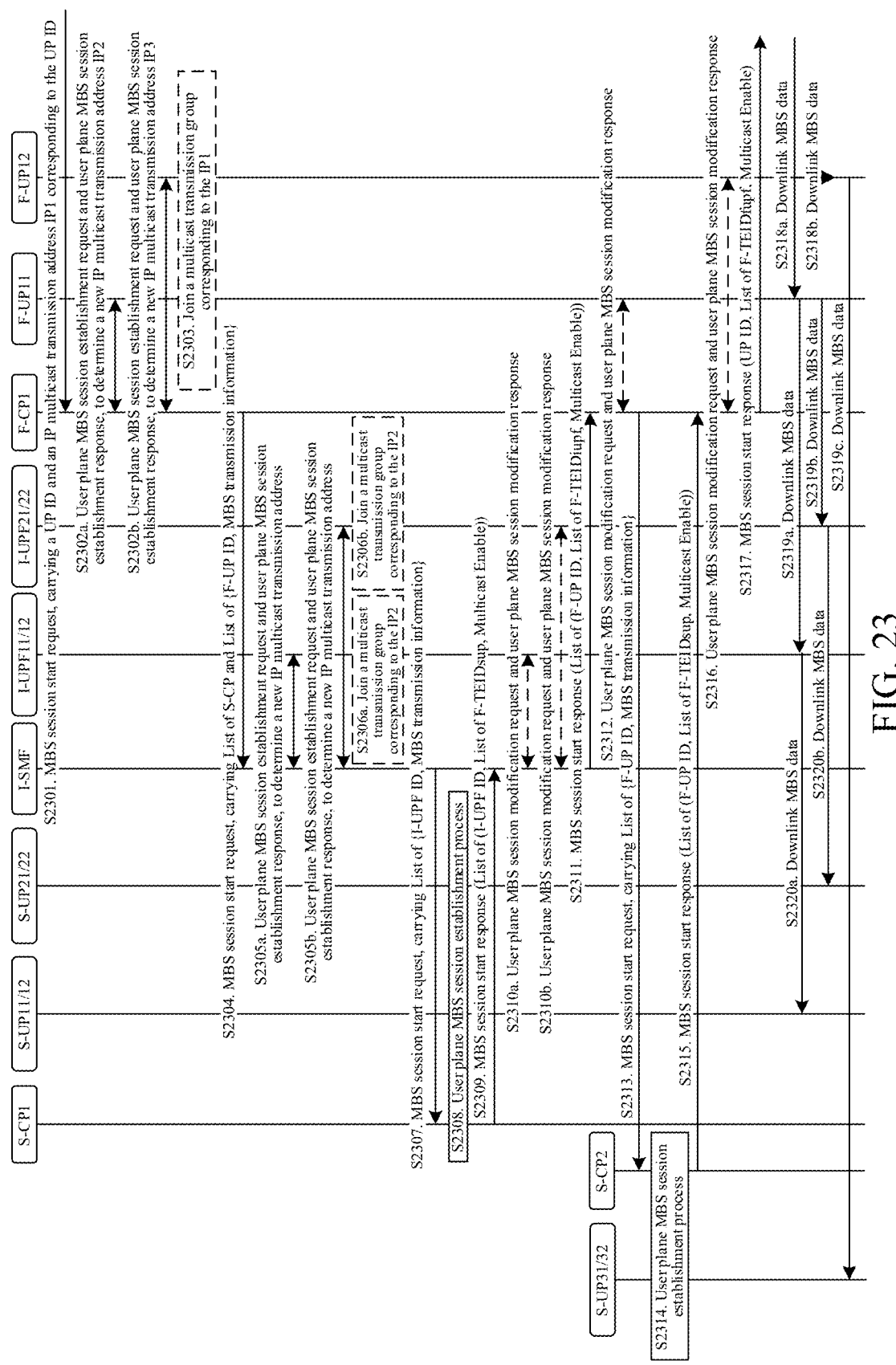
FIG. 23 is a flowchart of an MBS communication method in which a control plane is separated from a user plane according to an embodiment of this disclosure.

In this case, according to the embodiments of this disclosure, an I-SMF and an I-UPF may participate in an MBS session. For a user plane MBS transmission tree establishment process may include the following steps as shown in FIG. 23.

In step S2301, an F-CP1 receives an MBS session start request transmitted by a father control plane node of the F-CP1. A specific process is similar to step S1501. Details are not described again. An IP multicast transmission address included in an MBS IP Multicast Distribution in the MBS session start request is denoted as IP1.

After receiving the MBS session start request transmitted by the father control plane node of the F-CP1, the F-CP1 may determine, according to information about a son control plane node of the F-CP1, that one or more F-UPFs are selected from a plurality of F-UPFs as user plane nodes having same levels as the F-CP1. In this embodiment, it is assumed that two user plane nodes are selected, which are denoted as an F-UP11 and an F-UP12. Then, step S2302a and step S2302b are respectively executed.

In step S2302a, the F-CP1 transmits a user plane MBS session establishment request to an F-UP11, and the F-UP11 feeds back a user plane MBS session establishment response to the F-CP1. The process is similar to the process of step S1502 in the foregoing embodiment, and details are not described again. An IP multicast transmission address allocated by the F-UP11 in step S2302a is denoted as IP2.

In step S2302b, the F-CP1 transmits a user plane MBS session establishment request to an F-UP12, and the F-UP12 feeds back a user plane MBS session establishment response to the F-CP1. The process is similar to the process of step S1502 in the foregoing embodiment, and details are not described again. An IP multicast transmission address allocated by the F-UP12 in step S2302b is denoted as IP3.

In step S2303, the F-UP11 and the F-UP12 apply to join a multicast transmission group corresponding to an IP multicast transmission address IP1 in a case that the F-UP11 and the F-UP12 support receiving data transmitted through multicast, to receive MBS data transmitted by father user plane nodes of the F-UP11 and the F-UP12.

Then, if the F-CP1 determines that the UPF managed by the F-CP1 cannot directly establish a transmission path with the UPF managed by the sub control plane node of the F-CP1 according to service area information of the son control plane node (which is generally an NR base station) of the F-CP1, the F-CP1 selects an I-SMF, where the selected I-SMF can communicate with the F-CP1 and the son control plane node of the F-CP1. In this embodiment, it is assumed that one I-SMF is selected, and then step S2304 is performed.

In step S2304, the F-CP1 transmits an MBS session start response (that is, Nscp_MBSSessionStart Request) to the I-SMF.

The MBS session start request transmitted by the F-CP1 to the I-SMF includes the following parameters: TMGI, MBS Session Duration, List of S-CP, MBS QFIs, QoS Profile, MBS Time to Data Transfer, List of {F-UP ID, MBS transmission information}, and MBS Service Area. The reason why the MBS session start request transmitted by the F-CP1 to the I-SMF includes the son control plane node information, i.e., List of S-CP, provided by the F-CP1 is mainly because the I-SMF is dynamically selected by the F-CP1 to join MBS service management, and the I-SMF does not have information of any MBS UE Context (for MBS multicast service) or user plane node. In this embodiment, the List of {F-UP ID, MBS Transport Information} includes only an F-UP11 ID and an MBS IP Multicast Distribution corresponding to the F-UP11 ID. The MBS IP Multicast Distribution corresponding to the F-UP11 ID is allocated by the F-UP11, and includes the new IP multicast transmission address IP2 and the C-TEID that are allocated by the F-UP11 in step S2302a.

After receiving the MBS session start request, the I-SMF determines and selects I-UPF11, I-UPF12, I-UPF21, and I-UPF22 based on the received MBS session start request and according to a service area of the F-CP1 obtained by query or network matching and a service area of the List of S-CP provided by the F-CP1. Then, step S2305a and step S2305b are executed.

In step S2305a, the I-SMF respectively transmits user plane MBS session establishment requests to the I-UPF11 and the I-UPF12, and the I-UPF11 and the I-UPF12 respectively feed back user plane MBS session establishment responses to the I-SMF. The process is similar to the process of step S1502 in the foregoing embodiment, and details are not described again. In step S2305a, the I-UPF11 and the I-UPF12 respectively allocate new IP multicast transmission addresses, which are respectively defined as IP4 and IP5 in this embodiment. The new IP multicast transmission address IP4 allocated by the I-UPF11 is used for transmitting MBS service data to the son user plane node of the I-UPF11 (i.e., S-UP11 in FIG. 23). The new IP multicast transmission address IP5 allocated by the I-UPF12 is used for transmitting MBS service data to the son user plane node of the I-UPF12 (i.e., S-UP12 in FIG. 23). In addition, if the I-UPF11 does not support receiving the MBS data transmitted by the F-UP11 through multicast, the I-UPF11 allocates an F-TEID to receive the MBS data from the F-UP11 through peer to peer. Similarly, if the I-UPF12 does not support receiving the MBS data transmitted by the F-UP11 through multicast, the I-UPF12 allocates an F-TEID to receive the MBS data from the F-UP11 through peer to peer.

In step S2305b, the I-SMF respectively transmits user plane MBS session establishment requests to the I-UPF21 and the I-UPF22, and the I-UPF21 and the I-UPF22 respectively feed back user plane MBS session establishment responses to the I-SMF. The process is similar to the process of step S1502 in the foregoing embodiment, and details are not described again. In step S2305a, the I-UPF21 and the I-UPF22 respectively allocate new IP multicast transmission addresses, which are respectively defined as IP6 and IP7 in this embodiment. The new IP multicast transmission address IP6 allocated by the I-UPF21 is used for transmitting MBS service data to the son user plane node of the I-UPF21 (i.e., S-UP21 in FIG. 23). The new IP multicast transmission address IP7 allocated by the I-UPF22 is used for transmitting MBS service data to the son user plane node of the I-UPF22 (i.e., S-UP22 in FIG. 23). In addition, if the I-UPF21 does not support receiving the MBS data transmitted by the F-UP11 through multicast, the I-UPF21 allocates an F-TEID to receive the MBS data from the F-UP11 through peer to peer. Similarly, if the I-UPF22 does not support receiving the MBS data transmitted by the F-UP11 through multicast, the I-UPF22 allocates an F-TEID to receive the MBS data from the F-UP11 through peer to peer.

In an embodiment of this disclosure, an IP multicast transmission address in an MBS IP Multicast Distribution included in the user plane MBS session establishment request in step S2305a and step S2305b is the IP multicast transmission address IP2 allocated by the F-UP11 in step S2302a. In FIG. 23, due to layout reasons, the I-UPF11 and the I-UPF12 are drawn together, the I-UPF21 and the I-UPF22 are drawn together, the S-UP11 and the S-UP12 are drawn together, and the S-UPF21 and the S-UP22 are drawn together.

In step S2306a, the I-UPF11 and the I-UPF12 apply to join a multicast transmission group corresponding to an IP multicast transmission address IP2 in a case that the I-UPF11 and the I-UPF12 support receiving data transmitted through multicast, to receive MBS data transmitted by the F-UP11.

In step S2306b, the I-UPF21 and the I-UPF22 apply to join a multicast transmission group corresponding to an IP multicast transmission address IP2 in a case that the I-UPF21 and the I-UPF22 support receiving data transmitted through multicast, to receive MBS data transmitted by the F-UP11.

In step S2307, the I-SMF transmits an MBS session start request to a son control plane node S-CP1 provided by the F-CP1.

The MBS session start request transmitted by the I-SMF to the S-CP1 includes the following parameters: TMGI, MBS QFIs, QoS Profile, List of {I-UPF ID, MBS transmission information}, and MBS Service Area. In this embodiment, the List of {I-UPF ID, MBS transmission information} includes IDs respectively corresponding to the I-UPF11, the I-UPF12, the I-UPF21, and the I-UPF22, as well as MBS transmission information respectively corresponding to the I-UPF11, the I-UPF12, the I-UPF21, and the I-UPF22. The IP multicast transmission address included in the MBS transmission information corresponding to the I-UPF11 is IP4, the IP multicast transmission address included in the MBS transmission information corresponding to the I-UPF12 is IP5, the IP multicast transmission address included in the MBS transmission information corresponding to the I-UPF21 is IP6, and the IP multicast transmission address included in the MBS transmission information corresponding to the I-UPF22 is IP7. IP4, IP5, IP6, and IP7 are different from each other.

In step S2308, after receiving the MBS session start request transmitted by the I-SMF, the S-CP1 performs a user plane MBS session establishment process. Specifically, the S-CP1 selects one or more S-UPs for the I-UPF11, one or more S-UPs for the I-UPF12, one or more S-UPs for the I-UPF21, and one or more S-UPs for the I-UPF22 from a plurality of S-UPs. In this embodiment, it is assumed that the S-CP1 selects the S-UP11 for the I-UPF11, the S-UP12 for the I-UPF12, the S-UP21 for the I-UPF21, and the S-UP22 for the I-UPF22. Then, the S-CP1 respectively transmits user plane MBS session establishment requests to the S-UP11, the S-UP12, the S-UP21, and the S-UP22, and receives user plane MBS session establishment responses respectively fed back by the S-UP11, the S-UP12, the S-UP21, and the S-UP22. In addition, if the S-UP11 supports multicast transmission, the S-UP11 may join a multicast transmission group corresponding to the IP multicast transmission address IP4 allocated by the I-UPF11, to receive the MBS data transmitted by the I-UPF11. In addition, if the S-UP12 supports multicast transmission, the S-UP12 may join a multicast transmission group corresponding to the IP multicast transmission address IP5 allocated by the I-UPF12, to receive the MBS data transmitted by the I-UPF12. In addition, if the S-UP21 supports multicast transmission, the S-UP21 may join a multicast transmission group corresponding to the IP multicast transmission address IP6 allocated by the I-UPF21, to receive the MBS data transmitted by the I-UPF21. In addition, if the S-UP22 supports multicast transmission, the S-UP22 may join a multicast transmission group corresponding to the IP multicast transmission address IP7 allocated by the I-UPF22, to receive the MBS data transmitted by the I-UPF22. Specific processes are similar to step S1505*a* and S1506, so details are not described again.

In step S2309, the S-CP1 transmits an MBS session start response to the I-SMF. If an S-UP that does not support receiving the data transmitted through multicast but supports receiving the MBS data through peer to peer exists in the S-UP11, the S-UP12, the S-UP21, and the S-UP22, the MBS session start response transmitted by the S-CP1 to the I-SMF includes an F-TEID allocated by the S-UP, which corresponds to the corresponding I-UPF, to form a List of {I-UPF ID, List of F-TEIDsup, Multicast Enable}. In this embodiment, the List of {I-UPF ID, List of F-TEIDsup, Multicast Enable} includes the List of F-TEIDsup and Multicast Enable respectively for the S-UP11, the S-UP12, the S-UP21, and the S-UP22.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. For another description, reference is made to the related content of step S1507.

In addition, when the S-CP1 determines not to allocate any son user plane node to an/some I-UPF IDs, the Multicast Enable corresponding to this/these I-UPF IDs may be set to disable. Certainly, a failed list {I-UPF} may alternatively be used in the MBS session start response to indicate an I-UPF to which a son user plane node is not allocated.

In step S2310*a*, the I-SMF respectively transmits a user plane MBS session modification request to the I-UPF11/I-UPF12 according to the List of {I-UPF ID, List of F-TEIDsup, Multicast Enable} included in the MBS session start response fed back by the S-CP1, and the I-UPF11/I-UPF12 feeds back a user plane MBS session modification response to the I-SMF. A detailed description of the step is similar to step S1508, and details are not described herein again.

If the I-SMF determines that no son user plane node is allocated to the I-UPF11 or the I-UPF12, the I-SMF transmits a user plane MBS session deletion request to the I-UPF11 or the I-UPF12. The I-UPF11 or the I-UPF12 transmits an IGMP leave data packet after receiving the user plane MBS session deletion request, exits a multicast transmission group indicated by the multicast transmission address IP2 allocated by the F-UP11, and returns a user plane MBS session deletion response to the I-SMF (this process is not identified in the figure).

In step S2310*b*, the I-SMF respectively transmits a user plane MBS session modification request to the I-UPF21/I-UPF22 according to the List of {I-UPF ID, List of F-TEIDsup, Multicast Enable} included in the MBS session start response fed back by the S-CP1, and the I-UPF21/I-UPF22 feeds back a user plane MBS session modification response to the I-SMF. A detailed description of the step is similar to step S1508, and details are not described herein again.

If the I-SMF determines that no son user plane node is allocated to the I-UPF21 or the I-UPF22, the I-SMF transmits a user plane MBS session deletion request to the I-UPF21 or the I-UPF22. The I-UPF21 or the I-UPF22 transmits an IGMP leave data packet after receiving the user plane MBS session deletion request, exits a multicast transmission group indicated by the multicast transmission address IP2 allocated by the F-UP11, and returns a user plane MBS session deletion response to the I-SMF (this process is not identified in the figure).

In step S2311, the I-SMF transmits an MBS session start response to the F-CP1. If an I-UPF that does not support receiving the data transmitted through multicast but supports receiving the MBS data through peer to peer exists in the I-UPF11, the I-UPF12, the I-UPF21, and the I-UPF22, the MBS session start response transmitted by the I-SMF to the F-CP1 includes an F-TED allocated by the I-UPF, which corresponds to F-UP11, to form a List of {F-UP ID, List of F-TEIDiupf, Multicast Enable}. In this embodiment, the List of {F-UP ID, List of F-TEIDiupf, Multicast Enable} includes the list of F-TEIDiupf and the Multicast Enable for the F-UP11.

Similar to step S1507, because some I-UPFs support receiving the data transmitted through multicast, and some other I-UPFs do not support receiving the data transmitted through multicast, the List F-TEIDiupf corresponds to only the I-UPFs that support receiving the MBS data through peer to peer rather than through multicast transmission. For other descriptions, reference is made to the related content of step S1507.

In step S2312, if an I-UPF that supports receiving the MBS data through peer to peer rather than through multicast transmission exists in the I-UPF11, the I-UPF12, the I-UPF21, and the I-UPF22, the F-CP1 transmits a user plane MBS session modification request to the F-UP11, and the F-UP11 feeds back a user plane MBS session modification response to the F-CP1. The user plane MBS session modification request transmitted by the F-CP1 to the F-UP11 includes an F-TED of an I-UPF that supports receiving the MBS data through peer to peer rather than through multicast transmission in the I-UPF11, the I-UPF12, the I-UPF21, and the I-UPF22, to instruct the F-UP11 to transmit, through peer to peer, the MBS data to the I-UPF that supports receiving the MBS data through peer to peer rather than through multicast transmission in the I-UPF11, the I-UPF12, the I-UPF21, and the I-UPF22.

If the F-CP1 determines that no next level user plane node is allocated to the F-UP11, the F-CP1 transmits a user plane MBS session deletion request to the F-UP11, the F-UP11 transmits an IGMP leave data packet after receiving the user plane MBS session deletion request, exits a multicast transmission group indicated by the multicast transmission address IP1 allocated by the father user plane node of the F-UP11, and returns a user plane MBS session deletion response to the F-CP1 (this process is not identified in the figure).

In step S2313, the F-CP1 transmits an MBS session start request to a son control plane node S-CP2 of the F-CP1 according to information about the son control plane node of the F-CP1.

The MBS session start request transmitted by the F-CP1 to the son control plane node S-CP2 of the F-CP1 includes the following parameters: TMGI, MBS Session Duration, MBS QFIs, QoS Profile, MBS Time to Data Transfer, List of {F-UP ID, MBS transmission information}, and MBS Service Area. The MBS transmission information is an MBS IP Multicast Distribution (which includes an IP multicast transmission address and a C-TEID). In this embodiment, the List of {F-UP ID, MBS transmission information} includes an F-UP12 ID and an MBS IP Multicast Distribution corresponding to the F-UP12 ID. The MBS IP Multicast Distribution corresponding to the F-UP12 ID is allocated by the F-UP12, and the IP multicast transmission address included in the MBS IP Multicast Distribution is the new IP multicast transmission address IP3 allocated by the F-UP12 in step S2302*b*.

There is no sequential relationship between step S2313 and step S2304, which may be steps performed in parallel by the F-CP1.

In step S2314, after receiving the MBS session start request transmitted by the F-CP1, the S-CP2 performs a user plane MBS session establishment process. Specifically, the S-CP2 selects one or more S-UPs for the F-UP12 from a plurality of S-UPs according to information about a son control plane node of the S-CP2. In this embodiment, it is assumed that an S-UP31 and an S-UP32 are selected for the F-UP12. Then, the S-CP2 respectively transmits user plane MBS session establishment requests to the S-UP31 and the S-UP32 and receives user plane MBS session establishment responses fed back by the S-UP31 and the S-UP32. In addition, if the S-UP31 and the S-UP32 supports multicast transmission, the S-UP31 and the S-UP32 may join a multicast transmission group corresponding to a new IP multicast transmission address IP3 allocated by the F-UP12 in step S2302*b*, to receive the MBS data transmitted by the F-UP12. If some son user plane nodes in the S-UP31 and the S-UP32 do not support receiving the data transmitted through multicast but support receiving the MBS data through peer to peer, the son user plane nodes that do not support receiving the data transmitted through multicast but support receiving of the MBS data through peer to peer in the S-UP 31 and the S-UP32 may allocate F-TEIDs to receive the MBS data transmitted by the F-UP12 through peer to peer. A specific process is similar to step S1505*a* and step S1506, and details are not described again.

In step S2315, the S-CP2 transmits an MBS session start response to the F-CP1. If there is an S-UP that does not support receiving the data transmitted through multicast but supports receiving the MBS data through peer to peer in the S-UP31 and the S-UP32, the MBS session start response transmitted by the S-CP2 to the F-CP1 includes an F-TEID allocated by the S-UP, which corresponds to the F-UP, to form a List of {F-UP ID, list of F-TEIDsup, Multicast Enable}. In this embodiment, the List of {F-UP ID, list of F-TEIDsup, Multicast Enable} includes the list of F-TE-IDsup and the Multicast Enable for the F-UP12.

Similar to step S1507, because some S-UPs support receiving the data transmitted through multicast, and some other S-UPs do not support receiving the data transmitted through multicast, the list of F-TEIDsup corresponds to only the S-UPs that support receiving the MBS data through peer to peer rather than through multicast transmission. For another description, reference is made to the related content of step S1507.

In step S2316, the F-CP1 transmits a user plane MBS session modification request to the F-UP12 according to the List of {F-UP ID, list of F-TEIDsup, Multicast Enable} included in the MBS session start response fed back by the S-CP2, and the F-UP12 feeds back a user plane MBS session modification response to the F-CP1. A detailed description of the step is similar to step S1508, and details are not described herein again.

If the F-CP1 determines that no next level user plane node is allocated to the F-UP12, the F-CP1 transmits a user plane MBS session deletion request to the F-UP12, the F-UP12 transmits an IGMP leave data packet after receiving the user plane MBS session deletion request, exits a multicast transmission group indicated by the multicast transmission address IP1 allocated by the father user plane node of the F-UP12, and returns a user plane MBS session deletion response to the F-CP1 (this process is not identified in the figure).

In step S2317, after the F-CP1 receives the MBS session start responses fed back by all the son control plane nodes of the F-CP1, the F-CP1 transmits an MBS session start response to the father control plane node of the F-CP1 according to the MBS session start responses fed back by all the son control plane nodes of the F-CP1.

Similar to step S1609, the MBS session start response replied by the F-CP1 to the father control plane node of the F-CP1 includes a UP ID (the UP ID is an identifier of a user plane node having a same level as the father control plane node of the F-CP1) and may further include a list of F-TEIDfup and Multicast Enable.

It can be known from step S2301 to step S2315 that in the embodiments of the present disclosure, the F-CP1 has two son control plane nodes S-CP1 and S-CP2, the F-CP1 selects the I-SMF, and the I-SMF selects the I-UPF11, the I-UPF12, the I-UPF21, and the I-UPF22. In addition, the S-CP1 selects the S-UP11 for the I-UPF11, the S-UP12 for the I-UPF12, the S-UP21 for the I-UPF21, and the S-UP22 for the I-UPF22; the S-CP2 selects the S-UP31 and the S-UP32 for the F-UP12.

During the user plane MBS session establishment process, an intermediate user plane node may receive two user plane MBS session establishment requests at the same time (of course, the intermediate user plane node may receive more than two user plane MBS session establishment requests, and the receiving of two user plane MBS session establishment requests are taken as an example). For example, one I-SMF transmits two user plane MBS session establishment requests (corresponding to the case where different control plane nodes select the same I-SMF), or two different I-SMFs each transmit a user plane MBS session establishment request (corresponding to the case where different control plane nodes select different I-SMFs). In this case, the intermediate user plane node may normally respond to one of the user plane MBS session establishment requests, and reject the other control plane node in a response message to the other user plane MBS session establishment request, to indicate that the user plane node has been selected.

If an intermediate user plane node already having a father user plane node through one user plane MBS session establishment request receives another user plane MBS session establishment request transmitted by another control plane node, the intermediate user plane node rejects the another control plane node in a response message to the another user plane MBS session establishment request, to indicate that this user plane node has been selected.

After this MBS session transmission tree is established, the following steps may be performed.

In step S2318*a*, the F-UP11 receives downlink MBS data transmitted by the father user plane node of the F-UP11. Subsequently, the received downlink MBS data received in step S2319*a* is transmitted to the I-UPF11 and the I-UPF12, and the downlink MBS service data received in step S2319*b* is transmitted to the I-UPF21 and the I-UPF22. Subsequently, in step S2320*a*, the I-UPF11 transmits the downlink MBS data to the S-UP11, and the I-UPF12 transmits the downlink MBS data to the S-UP12. In step S2320*b*, the I-UPF21 transmits the downlink MB S data to the S-UP21, and the I-UPF22 transmits the downlink MBS data to the S-UP22. Each user plane node transmits the MBS data in the multicast transmission manner or the peer-to-peer transmis- sion manner determined in the foregoing steps, and each user plane node receives the MBS data in the multicast transmission manner or the peer-to-peer transmission manner determined in the foregoing steps.

In step S2318*b*, the F-UP12 receives downlink MBS data transmitted by the father user plane node of the F-UP12. Subsequently, the received downlink MBS data is transmitted to the S-UP31 and the S-UP32 in step S2319*c*. Each user plane node transmits the MBS data in the multicast transmission manner or the peer-to-peer transmission manner determined in the foregoing steps, and each user plane node receives the MBS data in the multicast transmission manner or the peer-to-peer transmission manner determined in the foregoing steps.

In the technical solution of the foregoing embodiments of this disclosure, F-CP represents a father control plane node, F-UP represents a father user plane node, S-CP represents a son control plane node, and S-UP represents a son user plane node. In the system architecture shown in FIG. 10, the SMF may be replaced by the F-CP, and the UPF may be replaced by the F-UP. In this case, the S-CP and the S-UP are combined to replace the access network node.

In the system architecture shown in FIG. 11, the MBSF may be replaced by the F-CP, and the MBSU may be replaced by the F-UP. In this case, the MB-SMF may be replaced by the S-CP, and the MB-UPF may be replaced by the S-UP. Alternatively, the MB-SMF may be replaced by the F-CP, and the MB-UPF may be replaced by the F-UP. In this case, the S-CP and the S-UP are combined to replace the NG-RAN.

FIG. 10 and FIG. 11 show two 5G MBS basic architectural diagrams. In the basic architectural diagrams, enhancement processing may be performed. For example, for the architecture shown in FIG. 10, there may be a plurality of UPFs and a plurality of SMFs. For the architecture shown in FIG. 11, there may be a plurality of MB-SMFs and a plurality of MB-UPFs respectively. When there is an additional UPF or MB-UPF, the user plane MBS session tree may be established by using the technical solution shown in FIG. 21 and FIG. 22. When there is an additional MB-SMF or SMF (in this case, there is an additional UPF), the user plane MBS session tree may be established by using the technical solution shown in FIG. 23.

The user plane MBS session establishment process is implemented in the technical solution of the foregoing embodiments of this disclosure, the occurrence of a transmission ring in the user plane MBS session may be avoided, and a problem of a broken branch in the user plane MBS session transmission tree may be avoided. In addition, a problem that when the control plane is separated from the user plane in the user plane MBS session establishment process, a same father control plane provides a plurality of father user plane nodes simultaneously may be resolved. In addition, transmission between father and son may be formed by a same control plane node by managing different user plane nodes, to optimize the user plane transmission resource. In addition, when a direct connection for user plane transmission cannot be established between the father user plane node and the base station during the user plane MBS session establishment process, an I-SMF and an I-UPF may be found and added, to implement the establishment of the user plane MBS session transmission tree, thereby effectively optimizing user plane transmission resources.

The following describes apparatus embodiments of this disclosure, and the apparatus embodiments may be used for performing the communication method for a multicast broadcast service in the foregoing embodiment of this disclosure. For details that are not disclosed in the apparatus embodiments of this disclosure, reference may be made to the above embodiments of the communication method for a multicast broadcast service in this disclosure.

Figure 24:
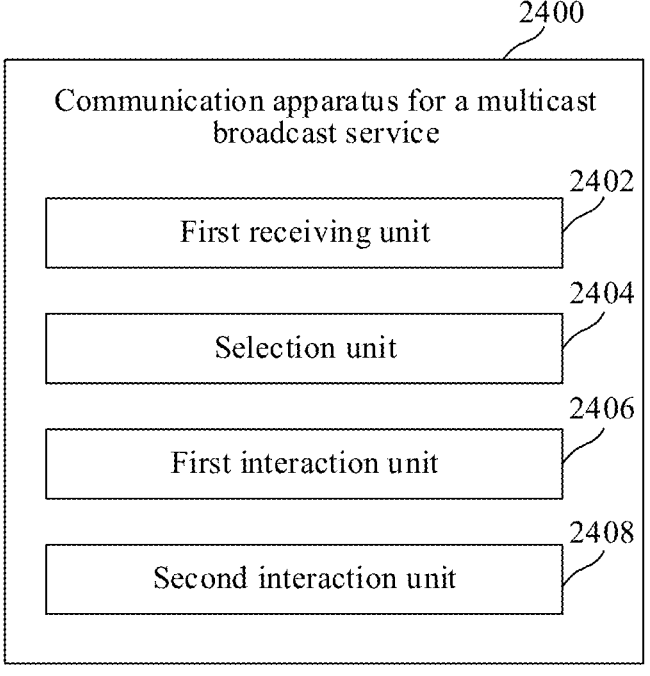
FIG. 24 is a block diagram of a communication apparatus for a multicast broadcast service according to an embodiment of this disclosure.

FIG. 24 is a block diagram of a communication apparatus for a multicast broadcast service according to an embodiment of this disclosure. The communication apparatus for a multicast broadcast service may be disposed in an I-SMF.

Referring to FIG. 24, a communication apparatus 2400 for a multicast broadcast service according to an embodiment of this disclosure includes: a first receiving unit 2402, a selection unit 2404, a first interaction unit 2406, and a second interaction unit 2408. One or more modules, submodules, and/or units of the apparatus can be implemented by processing circuitry, software, or a combination thereof, for example.

The first receiving unit 2402 is configured to receive a first MBS session start request transmitted by an ith level control plane node in an MBS session transmission tree, the first MBS session start request including information of a son control plane node provided by the ith level control plane node, identification information of an ith level user plane node corresponding to the ith level control plane node, and a first MBS IP multicast transmission address and a first C-TEID used for transmitting MBS data through multicast that are allocated by the ith level user plane node, i=1, . . . , N, N being a positive integer. The selection unit 2404 is configured to select an intermediate user plane node according to the information of the ith level control plane node and the information of the son control plane node provided by the ith level control plane node, the intermediate user plane node being capable of establishing a connection with a user plane function entity managed by the ith level user plane node and with a user plane function entity managed by the son control plane node. The first interaction unit 2406 is configured to transmit a first user plane MBS session establishment request to the intermediate user plane node, and receive a first user plane MBS session establishment response fed back by the intermediate user plane node, the first user plane MBS session establishment request including a first MBS IP multicast transmission address and a first C-TEID, the first MBS IP multicast transmission address being used for the intermediate user plane node to join a multicast transmission group corresponding to the first MBS IP multicast transmission address to receive MBS data transmitted by the ith level user plane node through multicast. The second interaction unit 2408 is configured to transmit a second MBS session start request to the son control plane node provided by the ith level control plane node, to instruct the son control plane node provided by the ith level control plane node to allocate son user plane nodes to the intermediate user plane node, the second MBS session start request including identification information of the intermediate user plane node ad a second MBS IP multicast transmission address and a second C-TEID that are allocated by the intermediate user plane node, the second MBS IP multicast transmission address being used for the son user plane nodes to join a multicast transmission group corresponding to the second MBS IP multicast transmission address to receive MBS data transmitted by the intermediate user plane node through multicast.

In some embodiments of this disclosure, based on the foregoing solution, the first user plane MBS session establishment request includes indication information used for instructing the intermediate user plane node to allocate new MBS IP multicast distribution information; and the first user plane MBS session establishment response includes the second MBS IP multicast transmission address and the second C-TEID that are allocated by the intermediate user plane node.

In some embodiments of this disclosure, based on the foregoing solution, in a case that the intermediate user plane node supports receiving the MBS data of the ith level user plane node through peer to peer rather than through multicast, the first user plane MBS session establishment request includes indication information for requesting to allocate a full qualified tunnel endpoint identifier (F-TEID) to the intermediate user plane node, the first user plane MB S session establishment response includes the F-TEID allocated to the intermediate user plane node, and the F-TEID is used for causing the intermediate user plane node to receive, through peer to peer, the MBS data transmitted by the ith level user plane node; or the first user plane MBS session establishment response indicates that the intermediate user plane node supports receiving the MBS data of the ith level user plane node through peer to peer rather than through multicast and includes an F-TEID allocated to the intermediate user plane node.

In some embodiments of the present disclosure, based on the foregoing solution, the second interaction unit 2408 is further configured to: after transmitting the second MBS session start request to the son control plane node provided by the ith level control plane node, receive a second MBS session start response fed back by the son control plane node for the second MBS session start request, the second MBS session start response including first indication information;

the first indication information including the identification information of the intermediate user plane node, first F-TEID list information, and first field information used for indicating that multicast transmission is started, the first field information indicating that a son user plane node that supports receiving, through multicast, the MBS data transmitted by the intermediate user plane node exist in the son user plane nodes allocated by the son control plane node to the intermediate user plane node, and the first F-TEID list information including F-TEIDs of son user plane nodes that support receiving, through peer to peer rather than through multicast, the MBS data transmitted by the intermediate user plane node; or in a case that the first indication information includes the identification information of the intermediate user plane node and does not include the first F-TEID list information and the first field information, the first indication information being used for indicating that all the son user plane nodes allocated by the son control plane node to the intermediate user plane node support receiving, through multicast, the MBS data transmitted by the intermediate user plane node; or in a case that the first indication information includes the identification information of the intermediate user plane node and the first F-TEID list information and does not include the first field information, the first indication information being used for indicating that all the son user plane nodes allocated by the son control plane node to the intermediate user plane node support receiving, through peer to peer rather than through multicast, the MBS data transmitted by the intermediate user plane node; or in a case that the first indication information includes the identification information of the intermediate user plane node and field information indicating that multicast transmission is stopped and does not include the first F-TEID list information, the first indication information being used for indicating that the son control plane node does not allocate the son user plane nodes to the intermediate user plane node.

In some embodiments of this disclosure, based on the foregoing solution, in a case that at least two intermediate user plane nodes are selected, the second MBS session start response includes a first indication information list, and the first indication information list includes the first indication information respectively corresponding to all the intermediate user plane nodes.

In some embodiments of this disclosure, based on the foregoing solution, the second MBS session start response further includes a failed identification information list, and the failed identification information list is used for indicating a target intermediate user plane node to which son user plane nodes are not allocated.

In some embodiments of the present disclosure, based on the foregoing solution, the first interaction unit 2406 is further configured to: in a case that a target intermediate user plane node to which son user plane nodes are not allocated exists is determined according to the second MBS session start response, transmit a user plane MBS session deletion request to the target intermediate user plane node.

In some embodiments of the present disclosure, based on the foregoing solution, the first interaction unit 2406 is further configured to: receive a user plane MBS session deletion response fed back by the target intermediate user plane node, the user plane MBS session deletion response being transmitted by the target intermediate user plane node after receiving the user plane MB S session deletion request, and in a case that the target intermediate user plane node has joined a multicast transmission group corresponding to the first MBS IP multicast transmission address, the target intermediate user plane node exiting the multicast transmission group corresponding to the first MBS IP multicast transmission address after receiving the user plane MBS session deletion request.

In some embodiments of this disclosure, based on the foregoing solution, in a case that the ith level control plane node provides at least two son control plane nodes, the first interaction unit 2406 is configured to: determine, after second MBS session start responses respectively fed back by all the son control plane nodes provided by the ith level control plane node are received, whether the target intermediate user plane node to which the son user plane nodes are not allocated exists.

In some embodiments of the present disclosure, based on the foregoing solution, the first interaction unit 2406 is further configured to: after receiving the second MBS session start response fed back by the son control plane node for the second MBS session start request, transmit, in a case that the first indication information includes the first F-TEID list information, a user plane MBS session modification request to the intermediate user plane node according to the identification information of the intermediate user plane node included in the first indication information, to instruct the intermediate user plane node to respectively transmit, through peer to peer, the MBS data to son user plane nodes corresponding to the F-TEIDs included in the first F-TED list information, in a case that the first indication information further includes the first field information, the user plane MBS session modification request being further used for instructing the intermediate user plane node to transmit the MBS data to a son user plane node of the intermediate user plane node through multicast transmission simultaneously; and in a case that the first indication information does not include the first field information, the user plane MBS session modification request being further used for instructing the intermediate user plane node to transmit the MBS data to the son user plane node of the intermediate user plane node without using multicast transmission.

In some embodiments of the present disclosure, based on the foregoing solution, the first interaction unit 2406 is further configured to: in a case that at least two intermediate user plane nodes are selected, transmit, according to first indication information corresponding to each of the intermediate user plane nodes included in the second MBS session start response, the user plane MBS session modification request to an intermediate user plane node to which the user plane MBS session modification request needs to be transmitted.

In some embodiments of the present disclosure, based on the foregoing solution, the second interaction unit 2408 is further configured to: after receiving the second MBS session start response fed back by the son control plane node for the second MBS session start request, feed back a first MBS session start response for the first MBS session start request to the ith level control plane node according to the second MBS session start response fed back by the son control plane node.

In some embodiments of the present disclosure, based on the foregoing solution, the second interaction unit 2408 is configured to: in a case that the ith level control plane node provides at least two son control plane nodes, after second MBS session start responses respectively fed back by all the son control plane nodes provided by the ith level control plane node are received, feed back the first MBS session start response to the ith level control plane node.

In some embodiments of this disclosure, based on the foregoing solution, the first MBS session start response includes second indication information;

the second indication information including the identification information of the ith level user plane node, second F-TEID list information, and second field information used for indicating that multicast transmission is started, the second field information indicating that an intermediate user plane node that supports receiving, through multicast, the MBS data transmitted by the ith level user plane node exists, and the second F-TEID list information including F-TEIDs of intermediate user plane nodes that support receiving, through peer to peer rather than through multicast, the MBS data transmitted by the ith level user plane node; or in a case that the second indication information includes the identification information of the ith level user plane node and does not include the second F-TEID list information and the second field information, the second indication information being used for indicating that all the intermediate user plane nodes support receiving, through multicast, the MBS data transmitted by the ith level user plane node; or in a case that the second indication information includes the identification information of the ith level user plane node and the second F-TEID list information and does not include the second field information, the second indication information being used for indicating that all the intermediate user plane nodes support receiving, through peer to peer rather than through multicast, the MBS data transmitted by the ith level user plane node;

In some embodiments of this disclosure, based on the foregoing solution, in a case that the ith level control plane node selects at least two ith level user plane nodes, the first MB S session start response includes a second indication information list, and the second indication information list includes the second indication information respectively corresponding to all the ith level user plane nodes.

In some embodiments of this disclosure, based on the foregoing solution, in a case that the ith level control plane node selects at least two ith level user plane nodes, the first MB S session start request includes identification information of each of the ith level user plane nodes and a first MBS IP multicast transmission address and a first C-TEID that are allocated by each of the ith level user plane nodes; and first MBS IP multicast transmission addresses allocated by different ith level user plane nodes are different.

Figure 25:
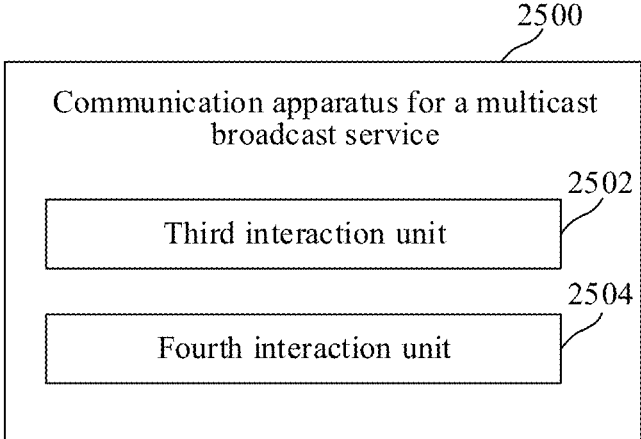
FIG. 25 is a block diagram of a communication apparatus for a multicast broadcast service according to an embodiment of this disclosure.

FIG. 25 is a block diagram of a communication apparatus for a multicast broadcast service according to an embodiment of this disclosure. The communication apparatus for a multicast broadcast service may be disposed in an ith level control plane node.

Referring to FIG. 25, a communication apparatus 2500 for a multicast broadcast service according to an embodiment of this disclosure includes: a third interaction unit 2502 and a fourth interaction unit 2504. One or more modules, submodules, and/or units of the apparatus can be implemented by processing circuitry, software, or a combination thereof, for example.

The third interaction unit 2502 is configured to transmit a second user plane MBS session establishment request to an ith level user plane node selected by an ith level control plane node, and receive a second user plane MBS session establishment response fed back by the ith level user plane node, the ith level control plane node being any level control plane node other than a last level control plane node in an MBS session transmission tree, i=1, . . . , N, N being a positive integer. The fourth interaction unit 2504 is configured to select an intermediate session management function (I-SMF), and transmit a first MBS session start request to the I-SMF, the first MBS session start request including information of a son control plane node provided by the ith level control plane node, identification information of the ith level user plane node, and a first MBS IP multicast transmission address and a first C-TEID that are allocated by the ith level user plane node; the first MBS session start request being used for instructing the I-SMF to select an intermediate user plane node capable of establishing a connection with a user plane function entity managed by the ith level user plane node and with a user plane function entity managed by the son control plane node, and establish a user plane MBS session with the intermediate user plane node, so that the intermediate user plane node joins a multicast transmission group corresponding to the first MBS IP multicast transmission address to receive MBS data transmitted by the ith level user plane node through multicast, and being used for instructing the I-SMF to transmit a second MBS session start request to the son control plane node, the second MBS session start request being used for instructing the son control plane node to allocate son user plane nodes to the intermediate user plane node, and enable the son user plane nodes to receive MBS data transmitted by the intermediate user plane node.

In some embodiments of the present disclosure, based on the foregoing solution, the fourth interaction unit 2504 is further configured to: after transmitting the first MBS session start request to the I-SMF, receive a first MBS session start response fed back by the I-SMF for the first MBS session start request; and determine, according to a content included in the first MBS session start response, whether to transmit a user plane MBS session modification request to the ith level user plane node.

In some embodiments of the present disclosure, based on the foregoing solution, the fourth interaction unit 2504 is configured to: in a case that it is determined, according to the information of the son control plane node provided by the ith level control plane node, that a user plane function entity managed by the ith level control plane node is incapable of directly establish a transmission path with a user plane function entity managed by the son control plane node, selecting an SMF capable of communicating with the ith level control plane node and the son control plane node as the I-SMF.

Figure 26:
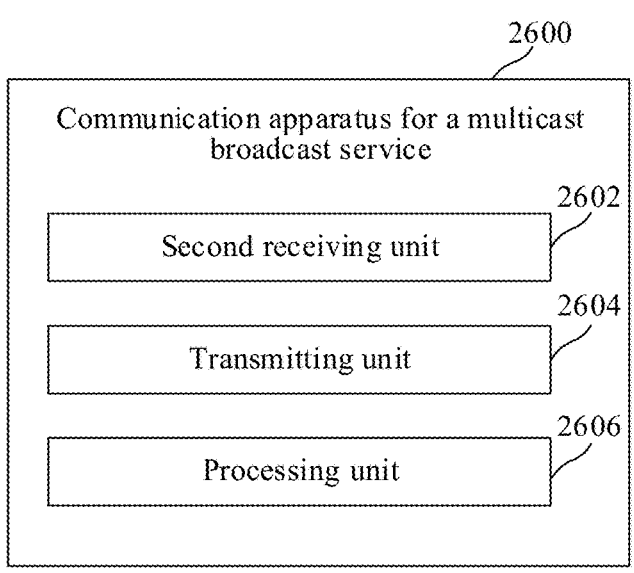
FIG. 26 is a block diagram of a communication apparatus for a multicast broadcast service according to an embodiment of this disclosure.

FIG. 26 is a block diagram of a communication apparatus for a multicast broadcast service according to an embodiment of this disclosure. The communication apparatus for a multicast broadcast service may be disposed in an intermediate user plane node.

Referring to FIG. 26, a communication apparatus 2600 for a multicast broadcast service according to an embodiment of this disclosure includes: a second receiving unit 2602, a transmitting unit 2604, and a processing unit 2606. One or more modules, submodules, and/or units of the apparatus can be implemented by processing circuitry, software, or a combination thereof, for example.

The second receiving unit 2602 is configured to receive a first user plane MBS session establishment request transmitted by an I-SMF, the first user plane MBS session establishment request including a first MBS IP multicast transmission address and a first C-TEID that are allocated by an ith level user plane node, i=1, . . . , N, N being a positive integer. The transmitting unit 2604 is configured to feed back a first user plane MBS session establishment response to the I-SMF, the first user plane MBS session establishment response including a second MBS IP multicast transmission address and a second C-TEID that are allocated by an intermediate user plane node, the second MBS IP multicast transmission address being used for a son user plane node of the intermediate user plane node to join a multicast transmission group corresponding to the second MBS IP multicast transmission address to receive MBS data transmitted by the intermediate user plane node through multicast. The second processing unit 2606 is configured to join a multicast transmission group corresponding to a first MBS IP multicast transmission address in a case that the intermediate user plane node supports receiving MBS data transmitted by the ith level user plane node through multicast, to receive the MBS data transmitted by the ith level user plane node through multicast.

In some embodiments of the present disclosure, based on the foregoing solution, the processing unit 2606 is further configured to: allocate, in a case that the intermediate user plane node supports receiving, through peer to peer rather than through multicast, the MBS data transmitted by the ith level user plane node, an F-TEID for receiving, through peer to peer, the MB S data transmitted by the ith level user plane node.

In some embodiments of the present disclosure, based on the foregoing solution, the second receiving unit 2602 is further configured to: after the transmitting unit 2604 feeds back the first user plane MBS session establishment response to the I-SMF, receive a user plane MBS session modification request transmitted by the I-SMF, the user plane MBS session modification request including first F-TEID list information, and the first F-TEID list information including F-TEIDs of son user plane nodes that support receiving, through peer to peer rather than through multicast, MBS data transmitted by the intermediate user plane node.

The processing unit 2606 is further configured to: respectively transmit, through peer to peer based on the first F-TEID list information, MBS data to son user plane nodes corresponding to the F-TEIDs included in the first F-TEID list information, and determining, according to the user plane MBS session modification request, whether the MBS data is also transmitted to a son user plane node of the intermediate user plane node through multicast transmission.

In some embodiments of the present disclosure, based on the foregoing solution, the transmitting unit 2604 is further configured to: transmit a user plane MBS session deletion response to the I-SMF in a case that a user plane MBS session deletion request transmitted by the I-SMF is received, in a case that the intermediate user plane node has joined the multicast transmission group corresponding to the first MBS IP multicast transmission address, the intermediate user plane node exiting the multicast transmission group corresponding to the first MBS IP multicast transmission address after receiving the user plane MBS session deletion request.

In some embodiments of the present disclosure, based on the foregoing solution, the processing unit 2606 is further configured to: in a case that a plurality of user plane MBS session establishment requests are received, feeding back a user plane MBS session establishment response for a user plane MBS session establishment request among the plurality of user plane MBS session establishment requests, and feeding back rejection messages for other user plane MBS session establishment requests among the plurality of user plane MBS session establishment requests, to indicate that the user plane node has been selected; or after the feeding back a first user plane MBS session establishment response to the I-SMF, in a case that a user plane MBS session establishment request for selecting the intermediate user plane node as a son user plane node of another user plane node is received again, feeding back a rejection message for the user plane MBS session establishment request received again, to indicate that the user plane node has been selected.

Figure 27:
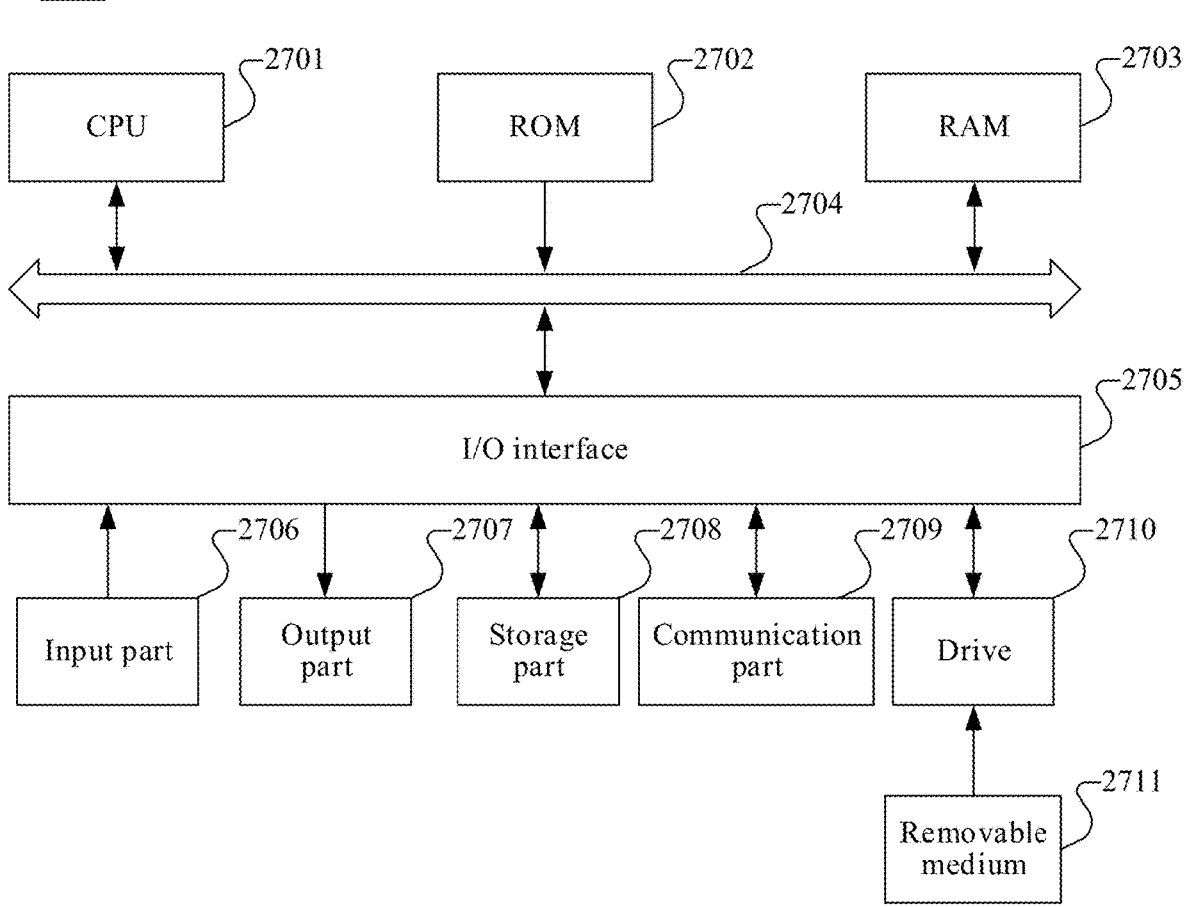
FIG. 27 is a schematic structural diagram of a computer system adapted to implement an electronic device according to an embodiment of this disclosure.

FIG. 27 is a schematic structural diagram of a computer system adapted to implement an electronic device according to an embodiment of this disclosure.

The computer system 2700 of the electronic device shown in FIG. 27 is merely an example, and does not constitute any limitation on functions and use ranges of the embodiments of this disclosure.

As shown in FIG. 27, the computer system 2700 includes a central processing unit (CPU) 2701, which may perform various suitable actions and processing based on a program stored in a read-only memory (ROM) 2702 or a program loaded from a storage part 2708 into a random access memory (RAM) 2703, for example, perform the method described in the foregoing embodiments. The RAM 2703 further stores various programs and data required for system operations. The CPU 2701, the ROM 2702, and the RAM 2703 are connected to each other through a bus 2704. An input/output (I/O) interface 2705 is also connected to the bus 2704.

The following components are connected to the I/O interface 2705: an input part 2706 including a keyboard, a mouse, or the like; an output part 2707 including a cathode ray tube (CRT), a liquid crystal display (LCD), a speaker, or the like; a storage part 2708 including hard disk, etc.; and a communication part 2709 including a network interface card such as a local area network (LAN) card, a modem, or the like. The communication part 2709 performs communication processing by using a network such as the Internet. A driver 2710 is also connected to the I/O interface 2705 as required. A removable medium 2711, such as a disk, an optical disc, a magneto-optical disc, or a semiconductor memory, is installed on the drive 2710 as required, so that a computer program read from the removable medium is installed in the storage portion 2708 as required.

Particularly, according to an embodiment of this disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 2709, and/or installed from the removable medium 2711. When the computer program is executed by the CPU 2701, the various functions defined in the system of this disclosure are executed.

The computer-readable medium shown in the embodiments of this disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, apparatus, or device. In this disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of this disclosure may be implemented in a software manner, or may be implemented in a hardware manner, and the unit described can also be set in a processor. Names of the units do not constitute a limitation on the units in a specific case.

In another aspect, this disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this disclosure.

This disclosure is intended to cover any variations, uses, or adaptive changes of this disclosure following the general principles of this disclosure.

It is to be understood that this disclosure is not limited to the precise structures described above and shown in the accompanying drawings, and various modifications and changes may be made without departing from the scope of this disclosure. The scope of this disclosure is subject only to the appended claims.

What is claimed is:

1. A method for a multicast broadcast service, comprising:
receiving a first multicast broadcast service (MBS) session start request, by an intermediate-session management function (I-SMF) of a core network, transmitted by an $i^{th}$ level control plane node in a MBS session transmission tree, the $i^{th}$ level control plane node being an intermediate level control plane node in the MBS session transmission tree, the first MBS session start request comprising information of a son control plane node, the son control plane node being a sub-control plane node of the $i^{th}$ level control plane node in the core network such that the information of the son control plane node is provided by the $i^{th}$ level control plane node, identification information of an $i^{th}$ level user plane node in the core network, and first MBS Internet Protocol (IP) multicast distribution information that includes at least a first MBS IP multicast transmission address that is allocated by the $i^{th}$ level user plane node for a first multicast transmission group, i being a positive integer;

selecting, by the I-SMF of the core network, an intermediate user plane node according to a service area of the $i^{th}$ level control plane node and a service area of the son control plane node, the intermediate user plane node being capable of establishing a connection with a user plane function entity managed by the $i^{th}$ level user plane node and with a user plane function entity managed by the son control plane node;

transmitting a first user plane MBS session establishment request, by the I-SMF of the core network, to the intermediate user plane node, the first user plane MBS session establishment request comprising the first MBS IP multicast distribution information for the intermediate user plane node to join the first multicast transmission group to receive MBS data transmitted by the $i^{th}$ level user plane node;

receiving a first user plane MBS session establishment response fed back by the intermediate user plane node; and transmitting a second MBS session start request, by the I-SMF of the core network, to the son control plane node to instruct the son control plane node to allocate son user plane nodes to the intermediate user plane node, the second MBS session start request comprising identification information of the intermediate user plane node, and second MBS IP multicast distribution information including at least a second MBS IP multicast transmission address for the son user plane nodes to join a second multicast transmission group associated with the second MBS IP multicast transmission address to receive MBS data transmitted by the intermediate user plane node through multicast.

2. The method according to claim 1, wherein the first user plane MBS session establishment request comprises indication information for instructing the intermediate user plane node to allocate new MBS IP multicast distribution information; and the first user plane MBS session establishment response comprises the second MBS IP multicast distribution information including at least the second MBS IP multicast transmission address that is allocated by the intermediate user plane node.

3. The method according to claim 1, wherein:

in response to the intermediate user plane node receiving the MBS data of the $i^{th}$ level user plane node through peer to peer, the first user plane MBS session establishment request comprises indication information for requesting an allocation of a full qualified tunnel endpoint identifier (F-TEID) to the intermediate user plane node, the first user plane MBS session establishment response comprises the F-TEID allocated to the intermediate user plane node, and the F-TEID is used for causing the intermediate user plane node to receive, through peer to peer, the MBS data transmitted by the $i^{th}$ level user plane node; or the first user plane MBS session establishment response indicates that the intermediate user plane node supports receiving the MBS data of the $i^{th}$ level user plane node through peer to peer and comprises an F-TEID allocated to the intermediate user plane node.

4. The method according to claim 1, further comprising:

receiving a second MBS session start response fed back by the son control plane node in response to the second MBS session start request, the second MBS session start response comprising first indication information, wherein the first indication information comprises identification information of the intermediate user plane node, first full qualified tunnel endpoint identifier (F-TEID) list information, and first field information for a start of multicast transmission, the first field information indicates that at least a first son user plane node that supports receiving, through multicast, the MBS data transmitted by the intermediate user plane node exists in the son user plane nodes, and the first F-TEID list information comprises F-TEIDs of a subset of the son user plane nodes that support receiving, through peer to peer rather than through multicast, the MBS data transmitted by the intermediate user plane node.

5. The method according to claim 1, further comprising:

receiving a second MBS session start response fed back by the son control plane node in response to the second MBS session start request, the second MBS session start response comprising first indication information, wherein the first indication information comprises the identification information of the intermediate user plane node and first field information for a start of multicast transmission, a lack of first full qualified tunnel endpoint identifier (F-TEID) list information in the first indication information indicates that all the son user plane nodes allocated by the son control plane node to the intermediate user plane node support receiving, through multicast, the MBS data transmitted by the intermediate user plane node.

6. The method according to claim 1, further comprising:

receiving a second MBS session start response fed back by the son control plane node in response to the second MBS session start request, the second MBS session start response comprising first indication information, wherein:

the first indication information comprises the identification information of the intermediate user plane node and first full qualified tunnel endpoint identifier (F-TEID) list information, a lack of first field information for indicating a start of multicast transmission in the first indication information indicates that all the son user plane nodes allocated by the son control plane node to the intermediate user plane node support receiving, through peer to peer rather than through multicast, the MBS data transmitted by the intermediate user plane node.

7. The method according to claim 1, further comprising:

receiving a second MBS session start response fed back by the son control plane node in response to the second MBS session start request, the second MBS session start response comprising first indication information, wherein the first indication information comprises the identification information of the intermediate user plane node and field information indicating a stop of multicast transmission and lacks first full qualified tunnel endpoint identifier (F-TEID) list information, the first indication information indicates that the son control plane node does not allocate the son user plane nodes to the intermediate user plane node.

8. The method according to claim 1, wherein a list of intermediate user plane nodes including the intermediate user plane node and at least another intermediate user plane node are selected, and the method comprises:

receiving a second MBS session start response fed back by the son control plane node in response to the second MBS session start request, the second MBS session start response comprising a list of first indication information respectively for the list of intermediate user plane nodes.

9. The method according to claim 8, wherein the second MBS session start response further comprises a failed identification information list, and the failed identification information list indicates a specific intermediate user plane node in the list of intermediate user plane nodes to which son user plane nodes are not allocated.

10. The method according to claim 9, further comprising:

transmitting a user plane MBS session deletion request to the specific intermediate user plane node.

11. The method according to claim 10, further comprising:

receiving a user plane MBS session deletion response in response to the user plane MBS session deletion request, the user plane MBS session deletion response indicating that the specific intermediate user plane node exits the first multicast transmission group corresponding to the first MBS IP multicast transmission address after receiving the user plane MBS session deletion request.

12. The method according to claim 1, wherein the first MBS session start request indicates at least two son control plane nodes, the method further comprises:

selecting a list of intermediate user plane nodes including the intermediate user plane node and at least another intermediate user plane node respectively for the at least two son control plane nodes;

receiving second MBS session start responses in response to second MBS session start requests respectively to the at least two son control plane nodes; and determining whether a specific intermediate user plane node to which no son user plane node is allocated exists based on the second MBS session start responses.

13. The method according to claim 4, further comprising:

transmitting, in response to the first F-TEID list information in the first indication information, a user plane MBS session modification request to the intermediate user plane node according to the identification information of the intermediate user plane node in the first indication information, to instruct the intermediate user plane node to respectively transmit, through peer to peer, the MBS data to the subset of son user plane nodes corresponding to the F-TEIDs in the first F-TEID list information.

14. The method according to claim 4, further comprising:

feeding back a first MBS session start response to the $i^{th}$ level control plane node according to the second MBS session start response fed back by the son control plane node, the first MBS session start response being a response for the first MBS session start request.

15. The method according to claim 1, wherein the first MBS session start request indicates at least two son control plane nodes, and the method further comprises:

receiving second MBS session start responses respectively from the at least two son control plane nodes in response to second MBS session start requests respectively to the at least two son control plane nodes; and feeding back a first MBS session start response to the $i^{th}$ level control plane node in response to the second MBS session start responses.

16. The method according to claim 14, wherein the first MBS session start response comprises second indication information, the second indication information comprises the identification information of the $i^{th}$ level user plane node, second F-TEID list information, and second field information for indicating a start of multicast transmission, the second field information indicating that at least one intermediate user plane node that supports receiving, through multicast, the MBS data transmitted by the $i^{th}$ level user plane node exists, and the second F-TEID list information comprising F-TEIDs of a subset of intermediate user plane nodes that support receiving, through peer to peer rather than through multicast, the MBS data transmitted by the $i^{th}$ level user plane node.

17. The method according to claim 14, wherein the first MBS session start response comprises second indication information, and the second indication information comprises the identification information of the $i^{th}$ level user plane node and the second field information for indicating a start of multicast transmission, and lacks F-TEID list information, the second indication information indicates that all the intermediate user plane nodes support receiving, through multicast, the MBS data transmitted by the $i^{th}$ level user plane node.

18. The method according to claim 14, wherein the first MBS session start response comprises second indication information, and the second indication information comprises the identification information of the $i^{th}$ level user plane node and second F-TEID list information and lacks second field information for indicating a start of multicast transmission, the second indication information indicates that all the intermediate user plane nodes support receiving, through peer to peer rather than through multicast, the MBS data transmitted by the $i^{th}$ level user plane node.

19. The method according to claim 1, wherein the first MBS session start request comprises respective identification information of at least two $i^{th}$ level user plane nodes, and first MBS IP multicast transmission addresses that are respectively allocated by the at least two $i^{th}$ level user plane nodes, the first MBS IP multicast transmission addresses are different.

20. An apparatus, comprising processing circuitry configured to:

receive a first multicast broadcast service (MBS) session start request, by an intermediate-session management function (I-SMF) of a core network in the apparatus, transmitted by an $i^{th}$ level control plane node in a MBS session transmission tree, the $i^{th}$ level control plane node being an intermediate level control plane node in the MBS session transmission tree, the first MBS session start request comprising information of a son control plane node, the son control plane node being a sub-control plane node of the $i^{th}$ level control plane node in the core network such that the information of the son control plane node is provided by the $i^{th}$ level control plane node, identification information of an $i^{th}$ level user plane node in the core network, and first MBS Internet Protocol (IP) multicast distribution information that includes at least a first MBS IP multicast transmission address that is allocated by the $i^{th}$ level user plane node for a first multicast transmission group, i being a positive integer;

select, by the I-SMF of the core network, an intermediate user plane node according to a service area of the $i^{th}$ level control plane node and a service area of the son control plane node, the intermediate user plane node being capable of establishing a connection with a user plane function entity managed by the $i^{th}$ level user plane node and with a user plane function entity managed by the son control plane node;

transmit a first user plane MBS session establishment request, by the I-SMF of the core network in the apparatus, to the intermediate user plane node, the first user plane MBS session establishment request comprising the first MBS IP multicast distribution information for the intermediate user plane node to join the first multicast transmission group to receive MBS data transmitted by the $i^{th}$ level user plane node;

receive a first user plane MBS session establishment response fed back by the intermediate user plane node; and transmit a second MBS session start request, by the I-SMF of the core network in the apparatus, to the son control plane node to instruct the son control plane node to allocate son user plane nodes to the intermediate user plane node, the second MBS session start request comprising identification information of the intermediate user plane node, and second MBS IP multicast distribution information including at least a second MBS IP multicast transmission address for the son user plane nodes to join a second multicast transmission group associated with the second MBS IP multicast transmission address to receive MBS data transmitted by the intermediate user plane node through multicast.

*    *    *    *    *